US012664498B2

(12) United States Patent
Dhillon et al.

(10) Patent No.: US 12,664,498 B2
(45) Date of Patent: Jun. 23, 2026

(54) OBJECT-BASED PROCESS MANAGEMENT

(71) Applicant: Palantir Technologies Inc., Denver, CO (US)

(72) Inventors: Alex Dhillon, Brooklyn, NY (US); Alec Schneider, San Francisco, CA (US); Casey Patton, Wheat Ridge, CO (US); Ka-Wing Courtney Tam, New York, NY (US); Harshil Mattoo, New York, NY (US); Oliver Madine, London (GB)

(73) Assignee: Palantir Technologies Inc., Aventura, FL (US)

( * ) Notice: Subject to any disclaimer, the term of this patent is extended or adjusted under 35 U.S.C. 154(b) by 0 days.

(21) Appl. No.: 18/655,675

(22) Filed: May 6, 2024

(65) Prior Publication Data

US 2024/0386347 A1      Nov. 21, 2024

Related U.S. Application Data

(60) Provisional application No. 63/558,000, filed on Feb. 26, 2024, provisional application No. 63/584,448, filed on Sep. 21, 2023, provisional application No. 63/509,508, filed on Jun. 21, 2023, provisional application No. 63/502,822, filed on May 17, 2023.

(51) Int. Cl.
*G06Q 10/0633* (2023.01)
(52) U.S. Cl.
CPC ................................. *G06Q 10/0633* (2013.01)
(58) Field of Classification Search
CPC .......................................... G06Q 10/00–50/00

USPC ................................................ 705/7.11–7.42
See application file for complete search history.

(56) References Cited

U.S. PATENT DOCUMENTS

| | | | |
|---|---|---|---|
| 7,076,779 B2 | 7/2006 | Breunese | |
| 8,073,731 B1 | 12/2011 | Rajasenan | |
| 9,990,429 B2 | 6/2018 | Nie et al. | |
| 10,826,776 B2 | 11/2020 | Singh | |
| 11,481,399 B1 * | 10/2022 | Juelich | G06F 16/90335 |
| 11,630,826 B2 | 4/2023 | Neil | |
| 11,954,112 B2 | 4/2024 | Siebel et al. | |

(Continued)

OTHER PUBLICATIONS

U.S. Appl. No. 18/655,680, Object-Based Process Management, May 6, 2024.

(Continued)

*Primary Examiner* — Alan S Miller
(74) *Attorney, Agent, or Firm* — Knobbe, Martens, Olson & Bear, LLP

(57)            ABSTRACT

A system may receive a representation of a process, wherein the representation of the process includes: a plurality of states, and one or more transitions among states of the plurality of states. A system may receive a plurality of data objects, wherein each of the data objects is associated with a respective set of properties. A system may determine for each of the plurality of data objects, respective state information associated with the data objects. A system may cause generation of an interactive graphical user interface including: a graph-based visualization of at least a portion of the plurality of states and the one or more transitions, wherein the graph-based visualization is generated based at least in part on at least a portion of the plurality of data objects and associated properties and state information.

20 Claims, 38 Drawing Sheets

(56)                References Cited

U.S. PATENT DOCUMENTS

| | | | | |
|---|---|---|---|---|
| 2006/0235811 | A1* | 10/2006 | Fairweather | G06K 13/0825 |
| | | | | 706/12 |
| 2009/0265634 | A1* | 10/2009 | Beringer | G06F 8/38 |
| | | | | 709/204 |
| 2013/0035976 | A1* | 2/2013 | Buffett | G06F 17/40 |
| | | | | 705/7.26 |
| 2013/0151463 | A1* | 6/2013 | Ritter | G06N 5/022 |
| | | | | 706/55 |
| 2014/0114629 | A1* | 4/2014 | Jojgov | G06Q 10/0633 |
| | | | | 703/6 |
| 2014/0164050 | A1* | 6/2014 | Jojgov | G06Q 10/0633 |
| | | | | 705/7.27 |
| 2020/0134037 | A1 | 4/2020 | Mankovskii et al. | |
| 2021/0117051 | A1* | 4/2021 | McRaven | G06F 3/0482 |
| 2021/0264332 | A1* | 8/2021 | Pingali | G06N 3/04 |
| 2022/0075515 | A1 | 3/2022 | Floren et al. | |
| 2022/0100554 | A1* | 3/2022 | Vityaz | G06Q 20/14 |
| 2022/0236965 | A1 | 7/2022 | Rahill-Marier et al. | |
| 2022/0327006 | A1* | 10/2022 | Makhija | G06N 3/042 |
| 2022/0327351 | A1* | 10/2022 | Barello | G06Q 10/0633 |
| 2023/0112921 | A1 | 4/2023 | Cai et al. | |
| 2023/0125026 | A1 | 4/2023 | Rickard et al. | |
| 2023/0385085 | A1* | 11/2023 | Singh | G06N 7/01 |
| 2024/0265036 | A1* | 8/2024 | Viswanathan | G06F 16/904 |
| 2024/0385885 | A1 | 11/2024 | Dhillon et al. | |

OTHER PUBLICATIONS

Wikipedia: "Large language model", Internet article, May 15, 2023, XP093209602, retrieved from the internet on Sep. 27, 2024, https://www.en.wikipedia.org/w/index.php?title=Large_language_model&oldid=1154967861, pp. 1-2, 4-pp. 5, 8-10.

Wu et al., "AI Chains: Transparent and controllable human-AI interation by chaining large language model prompts", Arxiv.Org, Cornell University Library, XP091069877, pp. 1-8 (2021).

Xu et al., "Mirror: A natural language interface for data querying, summarization, and visualization", Architectural Support for Programming Languages and Operating Systems, IEEE Computer Society Press, XP059077142, pp. 49-52 (2023).

Official Communication for European Patent Application No. 24176168 dated Oct. 11, 2024, 11 pages.

* cited by examiner

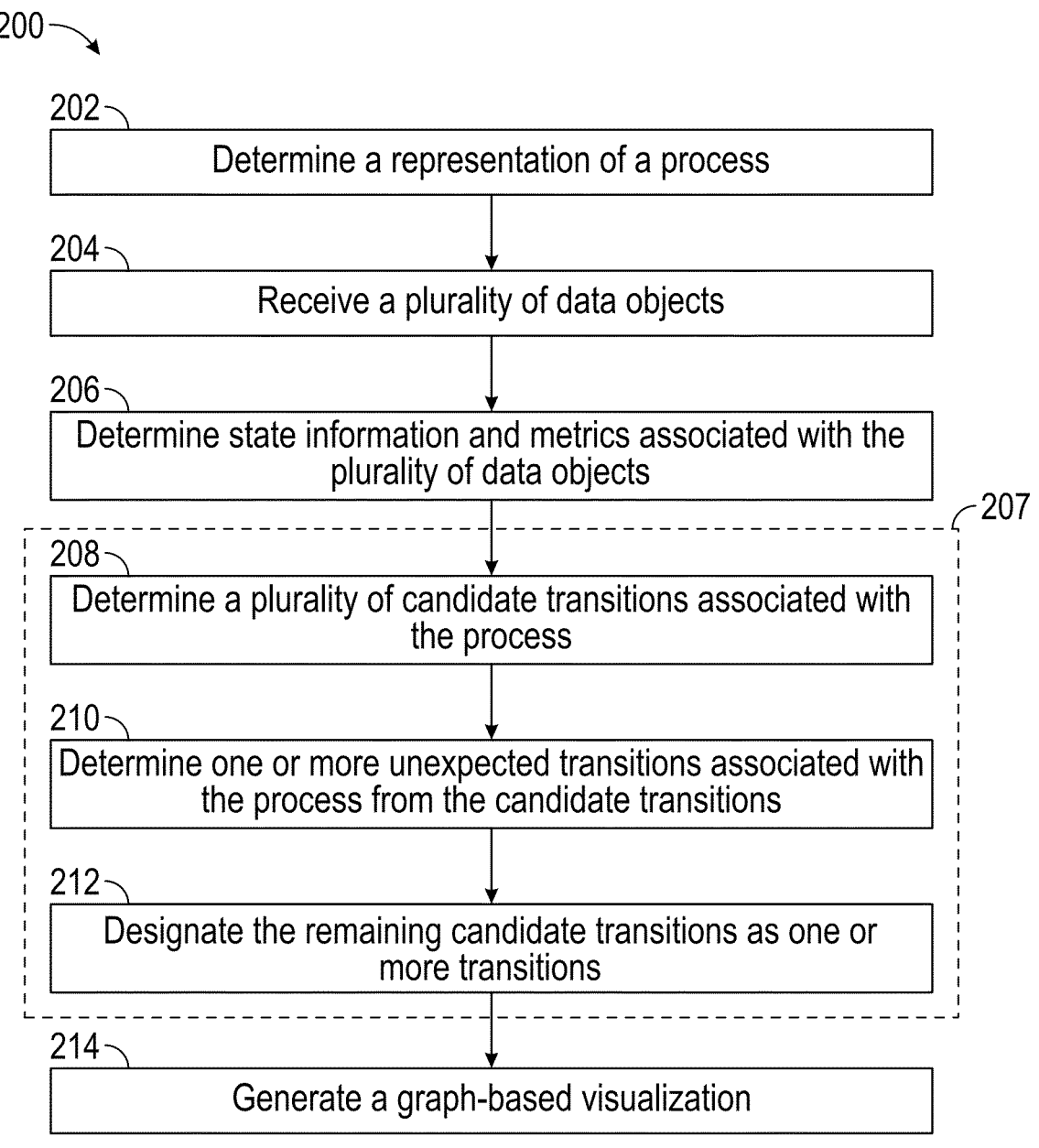

200

202
Determine a representation of a process

204
Receive a plurality of data objects

206
Determine state information and metrics associated with the plurality of data objects

207

208
Determine a plurality of candidate transitions associated with the process

210
Determine one or more unexpected transitions associated with the process from the candidate transitions 212
Designate the remaining candidate transitions as one or more transitions 214
Generate a graph-based visualization

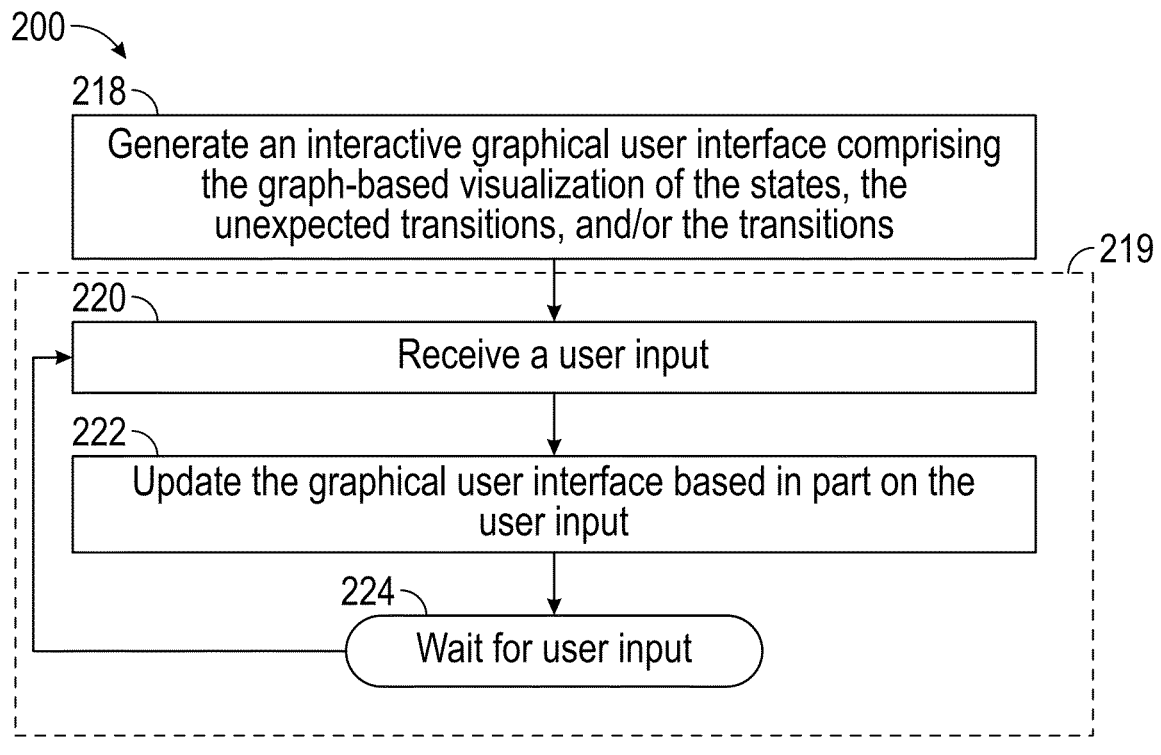

218

Generate an interactive graphical user interface comprising the graph-based visualization of the states, the unexpected transitions, and/or the transitions

219

220

Receive a user input

222

Update the graphical user interface based in part on the user input

224

Wait for user input

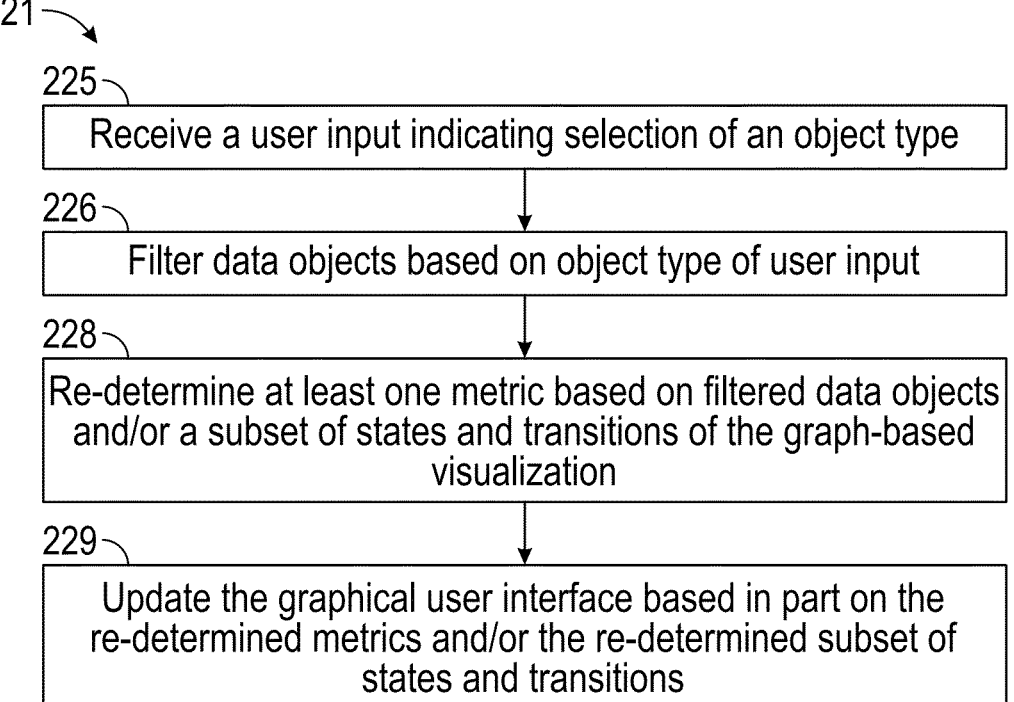

225

Receive a user input indicating selection of an object type

226

Filter data objects based on object type of user input

228

Re-determine at least one metric based on filtered data objects and/or a subset of states and transitions of the graph-based visualization

229

Update the graphical user interface based in part on the re-determined metrics and/or the re-determined subset of states and transitions

FIG. 2C

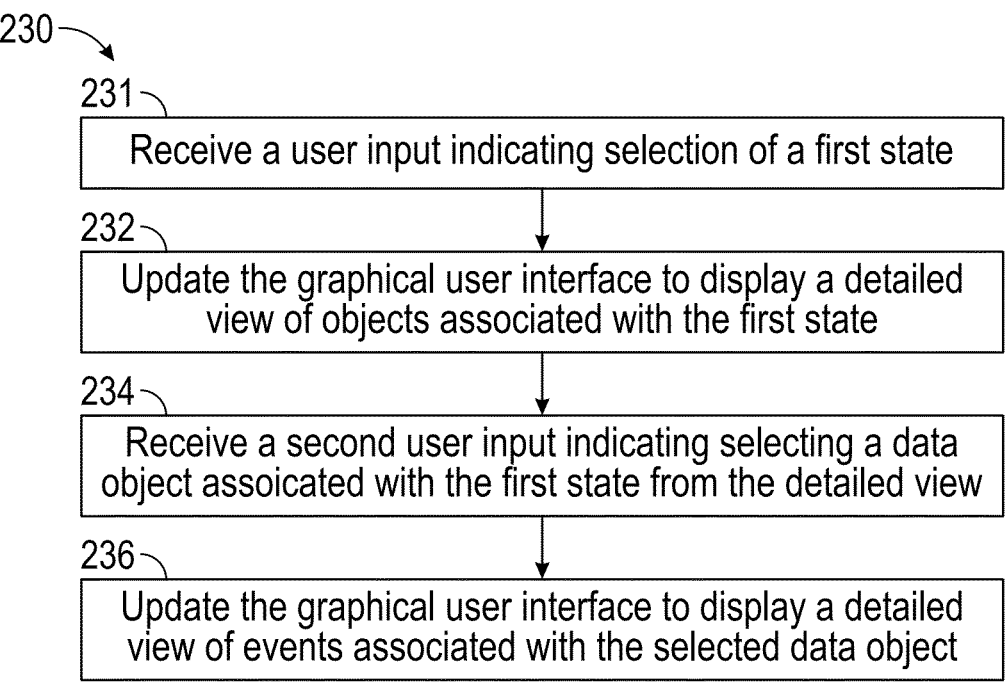

230

231
Receive a user input indicating selection of a first state

232
Update the graphical user interface to display a detailed view of objects associated with the first state 234
Receive a second user input indicating selecting a data object assoicated with the first state from the detailed view 236
Update the graphical user interface to display a detailed view of events associated with the selected data object

FIG. 2D

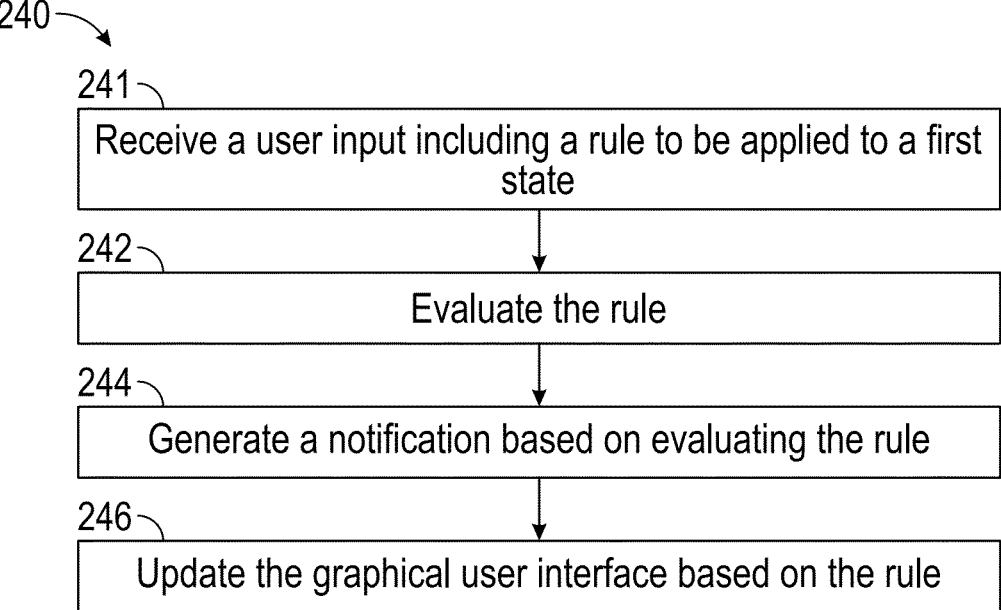

240

241
Receive a user input including a rule to be applied to a first state

242
Evaluate the rule

244
Generate a notification based on evaluating the rule

246
Update the graphical user interface based on the rule

FIG. 2E

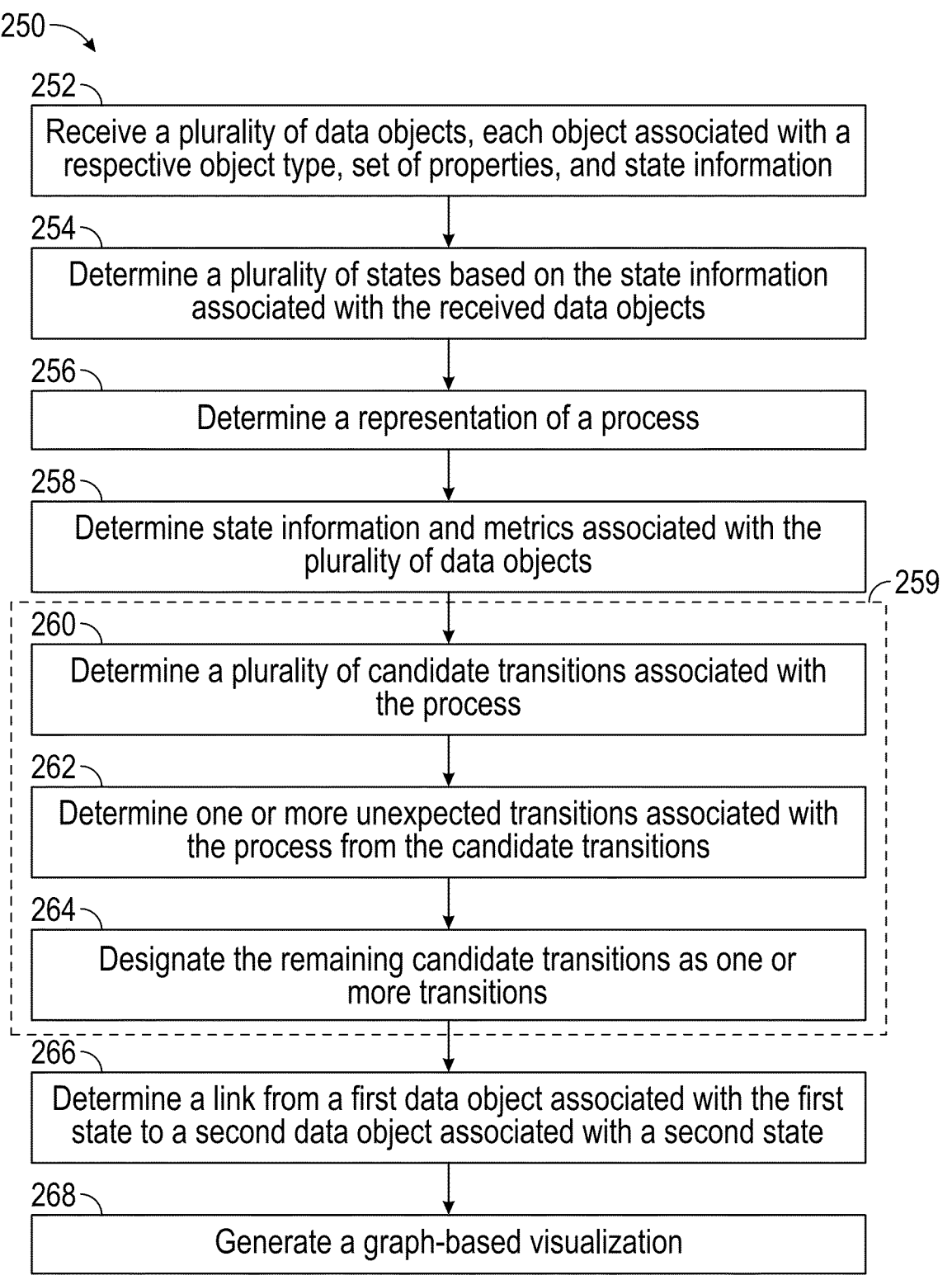

250

252
Receive a plurality of data objects, each object associated with a respective object type, set of properties, and state information 254
Determine a plurality of states based on the state information associated with the received data objects 256
Determine a representation of a process 258
Determine state information and metrics associated with the plurality of data objects

259

260
Determine a plurality of candidate transitions associated with the process

262
Determine one or more unexpected transitions associated with the process from the candidate transitions 264
Designate the remaining candidate transitions as one or more transitions 266
Determine a link from a first data object associated with the first state to a second data object associated with a second state 268
Generate a graph-based visualization

Receive a user input indicating at least a first state

274

Determine prior and/or subsequent states of the data objects associated with the first state

276

Update the graph-based visualization to include the prior and/or subsequent states and transitions between the states

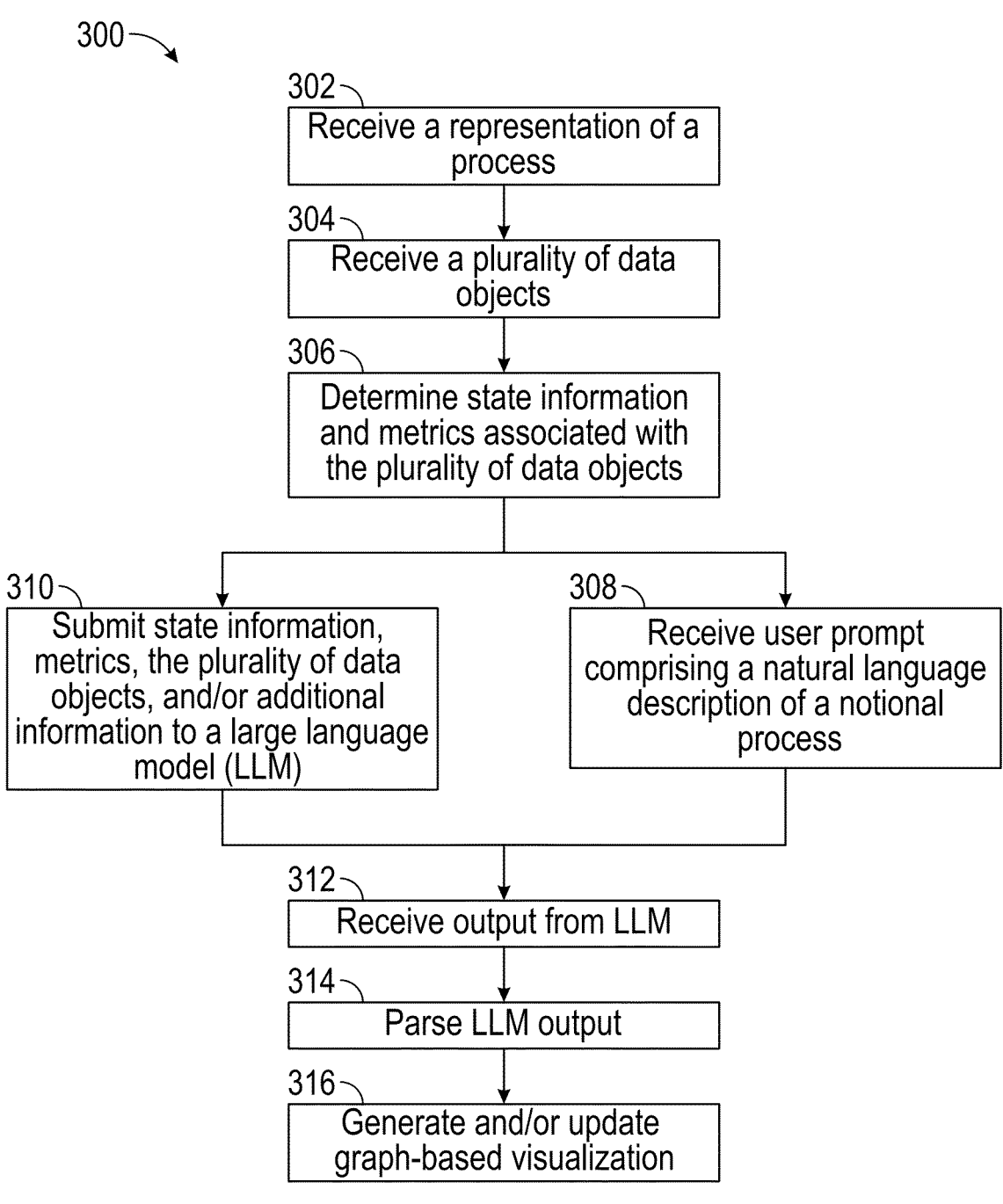

300

302 — Receive a representation of a process

304 — Receive a plurality of data objects

306 — Determine state information and metrics associated with the plurality of data objects 310 — Submit state information, metrics, the plurality of data objects, and/or additional information to a large language model (LLM)

308 — Receive user prompt comprising a natural language description of a notional process 312 — Receive output from LLM 314 — Parse LLM output 316 — Generate and/or update graph-based visualization

ⓘ Details for the Selected Friction Point ⚠ Maverick Buying - Purchasing Team

1252 — For purchasing team 3, the maverick buying ratio is 35.1% with €480.23 million impacted, and an assumed negotiation effectiveness of 10%, reducing maverick buying to the target of 1.0% could save €46.66 million per year

Affected Purchase Order Items     🔔 Alert Purchasing Team Lead   ! Auto-Block Future POs without PR for this PurchasingTeam

1260

1262

| Purchase Order | Product | Supplier | Order Date | Last Status Updates | Process Path Length | Process Duration | Net Order Value ₀↓1 |
|---|---|---|---|---|---|---|---|
| ☑ 4500009539 | Solar panels | SKF Kugelmeter KGaA | Jul 26,2022 | Jan 23,2023,1:05 PM | 8 | 181 | €121M |
| ☑ 4500009539 | Solar panels | SKF Kugelmeter KGaA | Jul 26,2022 | Jan 23,2023,1:05 PM | 8 | 181 | €108M |
| ☑ 4500009539 | Construction services | SKF Kugelmeter KGaA | Jul 26,2022 | Jan 23,2023,1:05 PM | 8 | 181 | €54M |
| ☑ 4500009529 | Construction services | AluCast | Jul 26,2022 | Jan 23,2023,1:05 PM | 7 | 181 | €9.8M |

1264 — Process Flow for Purchase Order ☑ 4500009539     Ideal Path No   Maverick Buying yes   Cash Discount yes   Throughput Time 181 days

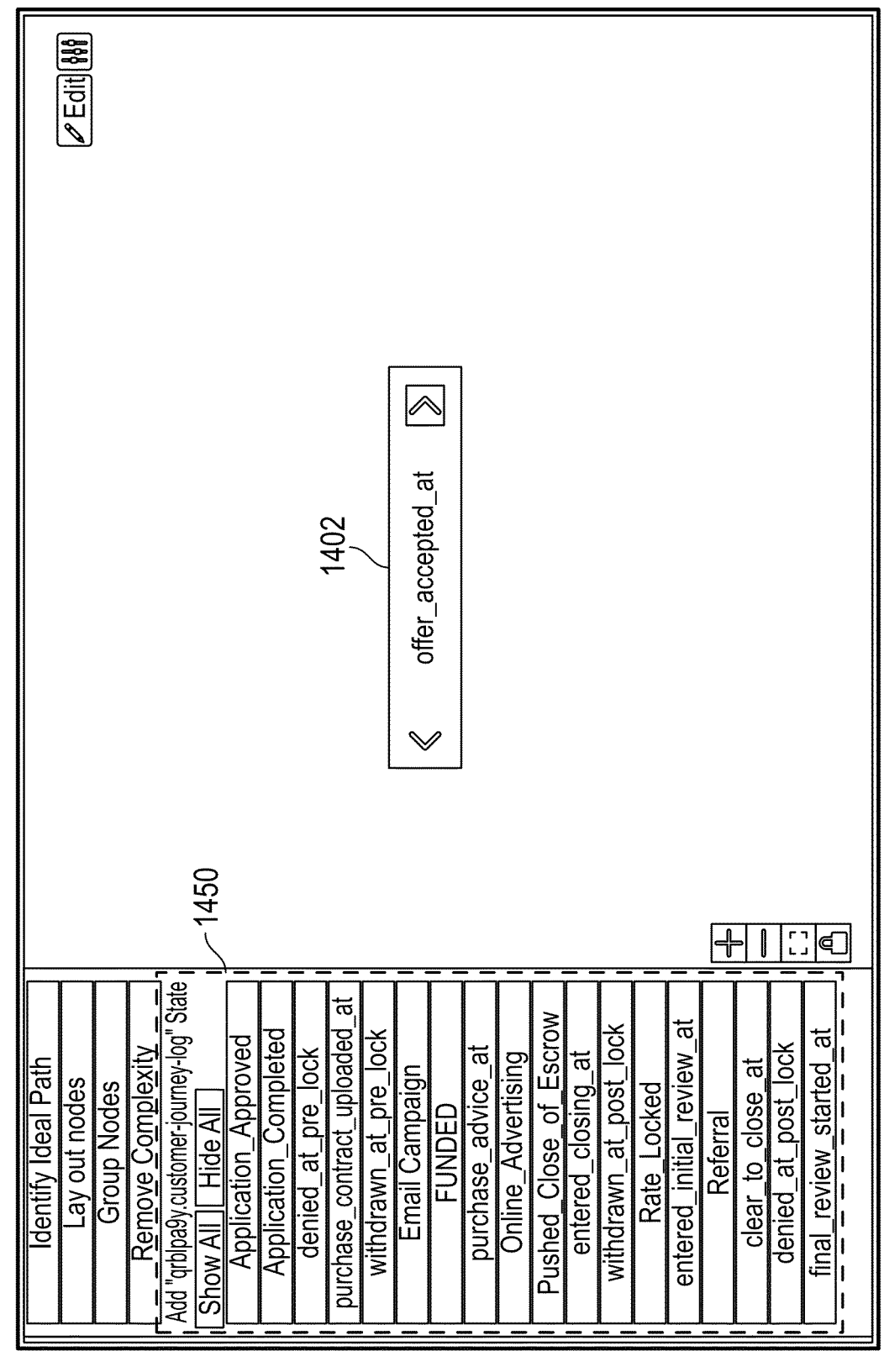

1400

1450

Identify Ideal Path
Lay out nodes
Group Nodes
Remove Complexity
Add "qrblpa9y.customer-journey-log" State
Show All | Hide All
Application_Approved
Application_Completed
denied_at_pre_lock
purchase_contract_uploaded_at
withdrawn_at_pre_lock
Email Campaign
FUNDED
purchase_advice_at
Online_Advertising
Pushed_Close_of_Escrow
entered_closing_at
withdrawn_at_post_lock
Rate_Locked
entered_initial_review_at
Referral
clear_to_close_at
denied_at_post_lock
final_review_started_at

1402 offer_accepted_at

Edit

FIG. 14A

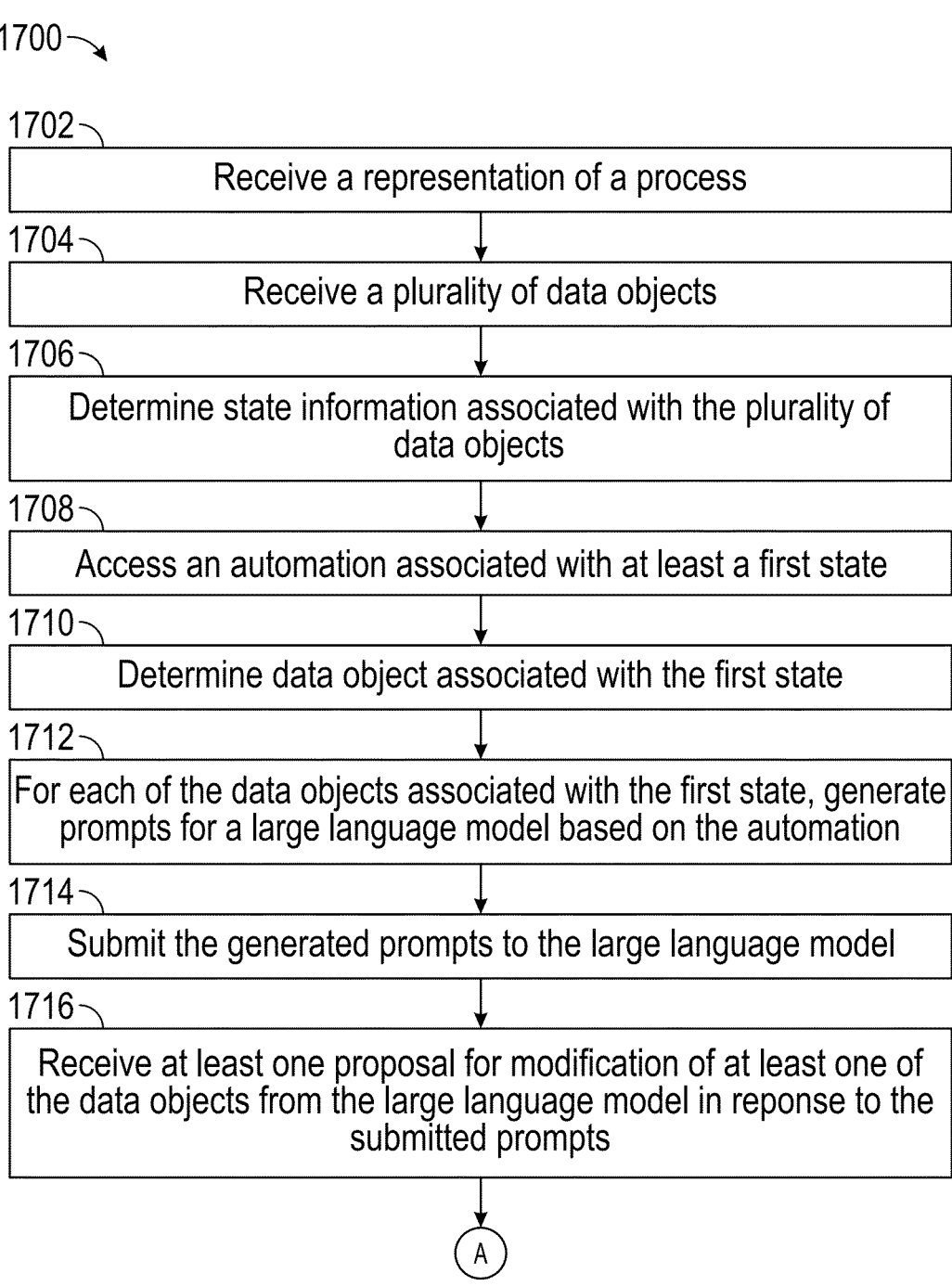

1700

1702
Receive a representation of a process

1704
Receive a plurality of data objects

1706
Determine state information associated with the plurality of data objects

1708
Access an automation associated with at least a first state

1710
Determine data object associated with the first state

1712
For each of the data objects associated with the first state, generate prompts for a large language model based on the automation 1714
Submit the generated prompts to the large language model 1716
Receive at least one proposal for modification of at least one of the data objects from the large language model in reponse to the submitted prompts

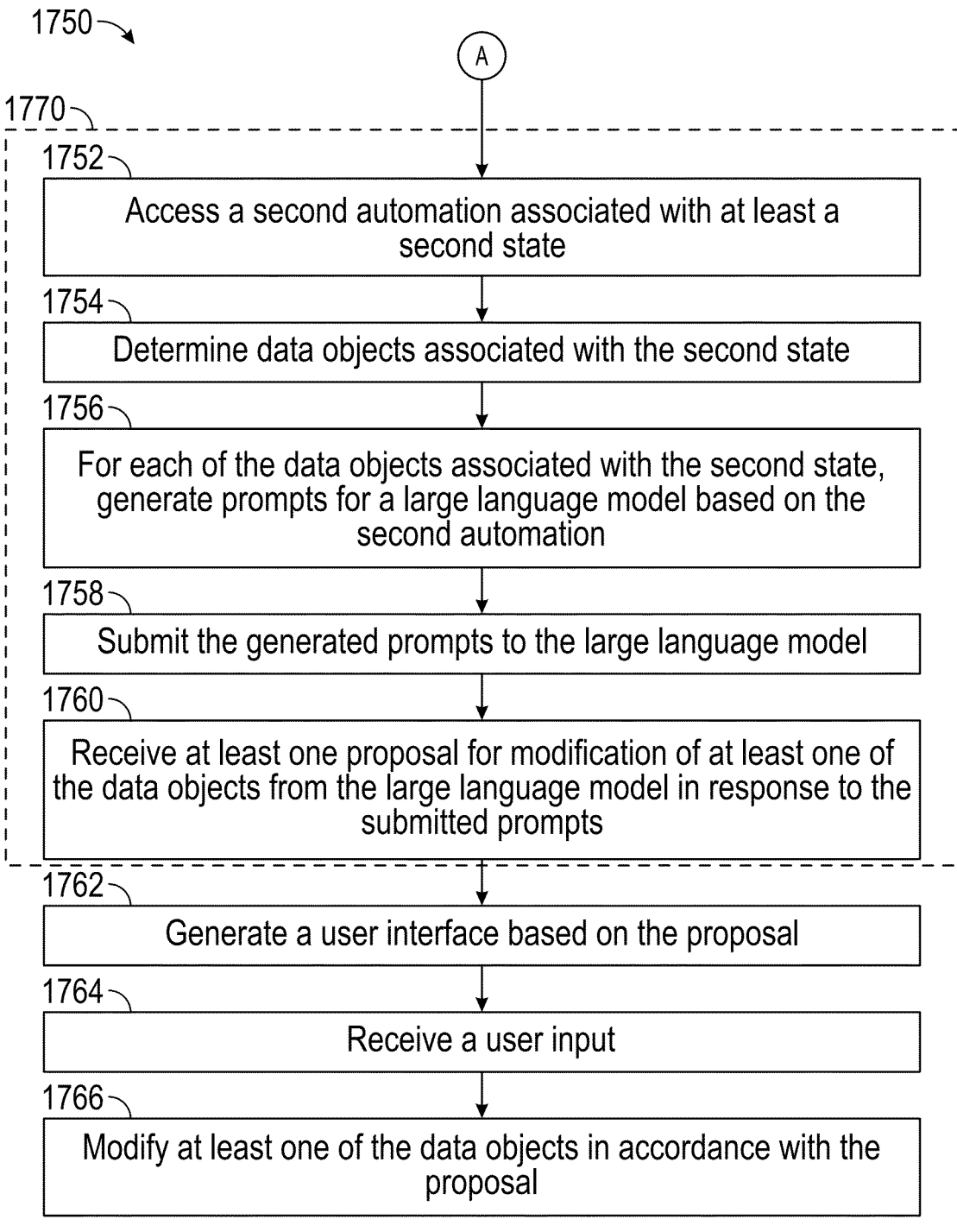

1770

1752

Access a second automation associated with at least a second state

1754

Determine data objects associated with the second state

1756

For each of the data objects associated with the second state, generate prompts for a large language model based on the second automation

1758

Submit the generated prompts to the large language model

1760

Receive at least one proposal for modification of at least one of the data objects from the large language model in response to the submitted prompts

1762

Generate a user interface based on the proposal

1764

Receive a user input

1766

Modify at least one of the data objects in accordance with the proposal

FIG. 17B

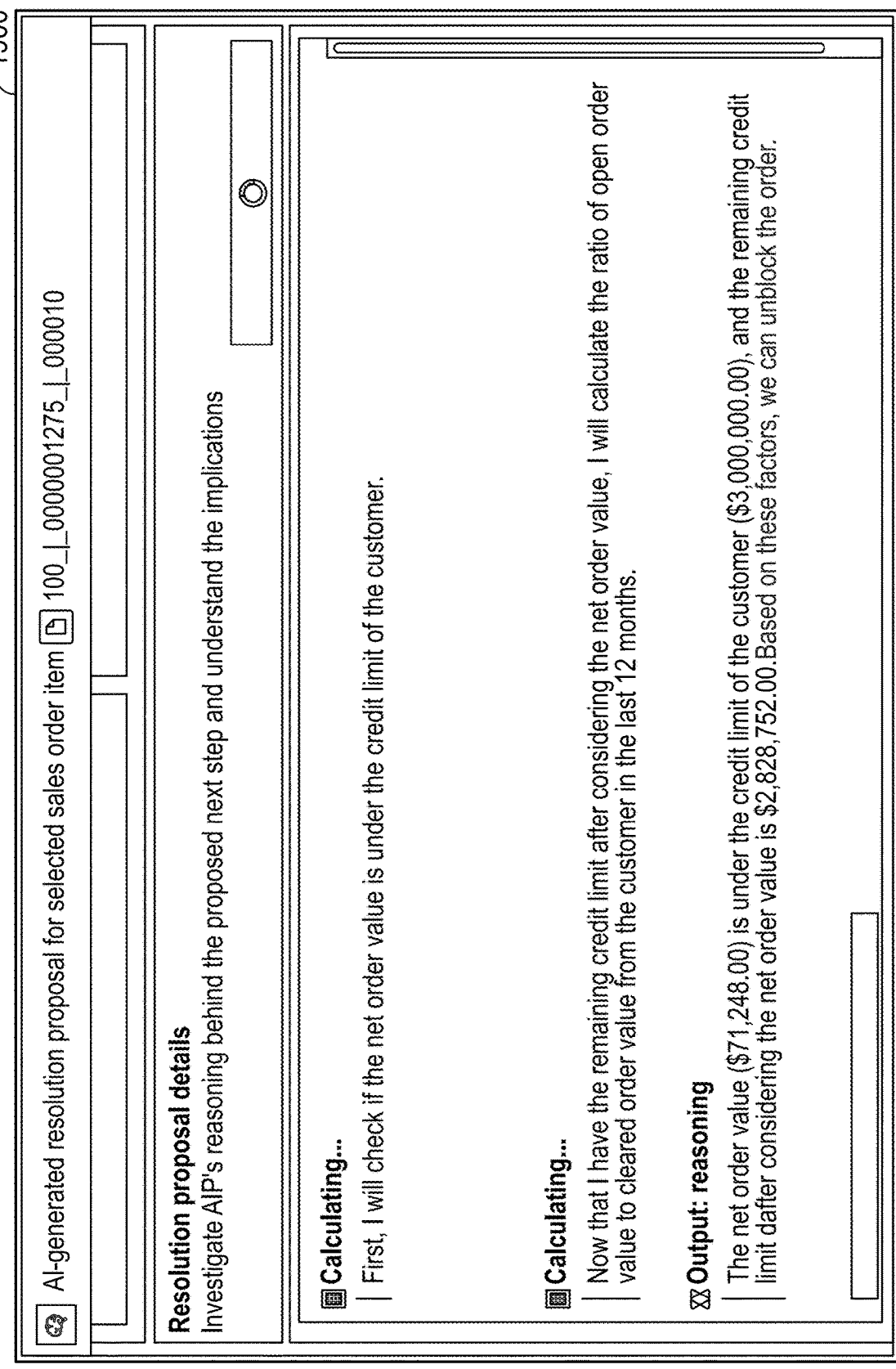

1900

AI-generated resolution proposal for selected sales order item ⬜ 100_|_0000001275_|_000010

Resolution proposal details
Investigate AIP's reasoning behind the proposed next step and understand the implications

▦ Calculating...
| First, I will check if the net order value is under the credit limit of the customer.

▦ Calculating...
| Now that I have the remaining credit limit after considering the net order value, I will calculate the ratio of open order
| value to cleared order value from the customer in the last 12 months.

⬚ Output: reasoning
| The net order value ($71,248.00) is under the credit limit of the customer ($3,000,000.00), and the remaining credit
| limit dafter considering the net order value is $2,828,752.00.Based on these factors, we can unblock the order.

FIG. 19

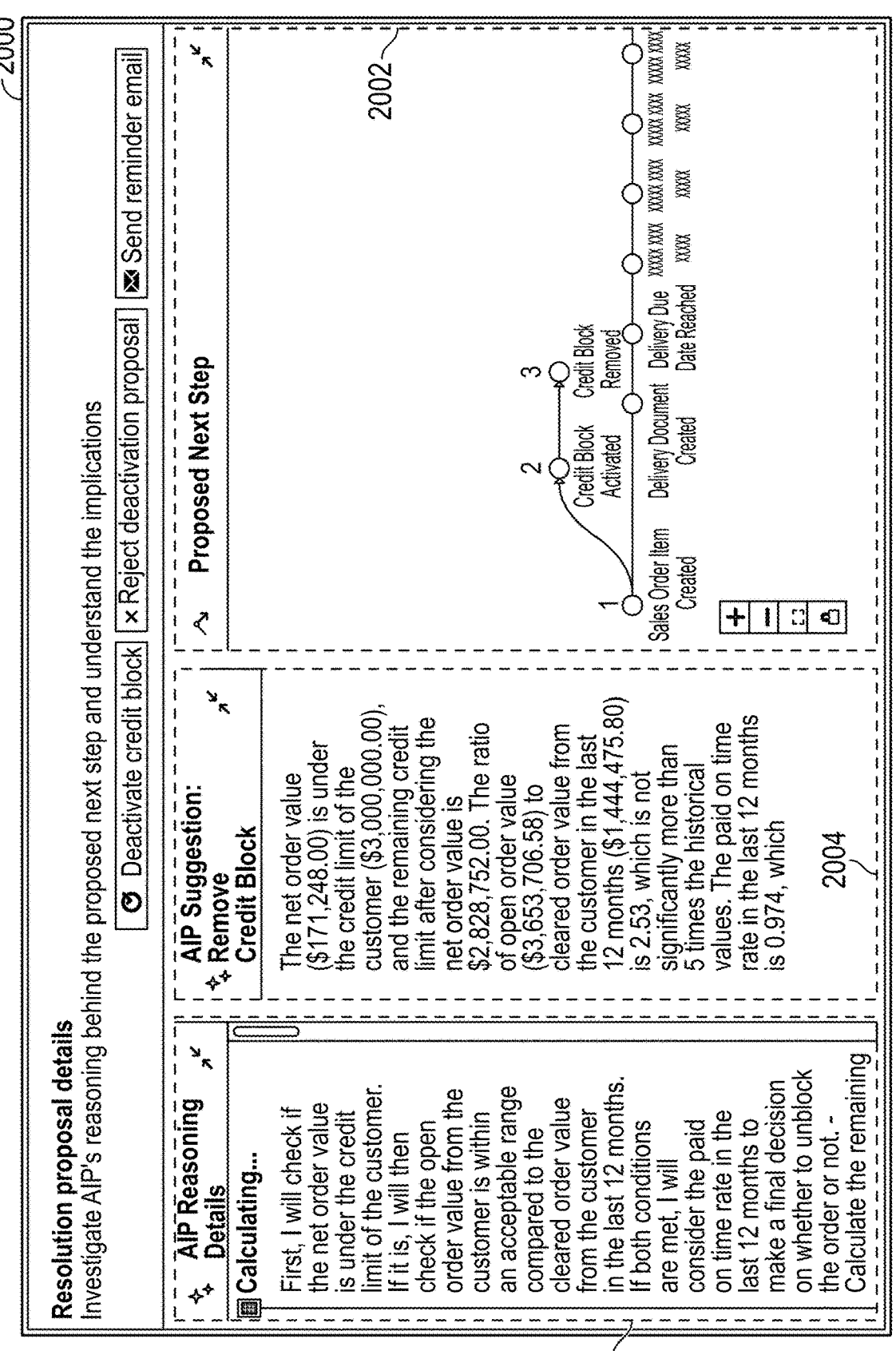

Resolution proposal details
Investigate AIP's reasoning behind the proposed next step and understand the implications

[⟳ Deactivate credit block] [✕ Reject deactivation proposal] [✉ Send reminder email]

AIP Reasoning Details ↗

📋 Calculating...

First, I will check if the net order value is under the credit limit of the customer. If it is, I will then check if the open order value from the customer is within an acceptable range compared to the cleared order value from the customer in the last 12 months. If both conditions are met, I will consider the paid on time rate in the last 12 months to make a final decision on whether to unblock the order or not. - Calculate the remaining

AIP Suggestion:
✛ Remove Credit Block ↗

The net order value ($171,248.00) is under the credit limit of the customer ($3,000,000.00), and the remaining credit limit after considering the net order value is $2,828,752.00. The ratio of open order value ($3,653,706.58) to cleared order value from the customer in the last 12 months ($1,444,475.80) is 2.53, which is not significantly more than 5 times the historical values. The paid on time rate in the last 12 months is 0.974, which

2004

Proposed Next Step ↗

1 — Sales Order Item Created
2 — Credit Block Activated / Delivery Document Created
3 — Credit Block Removed / Delivery Due Date Reached

XXXX XXXX XXXX XXXX XXXX XXXX XXXX XXXX XXXX XXXX XXXX XXXX XXXX XXXX

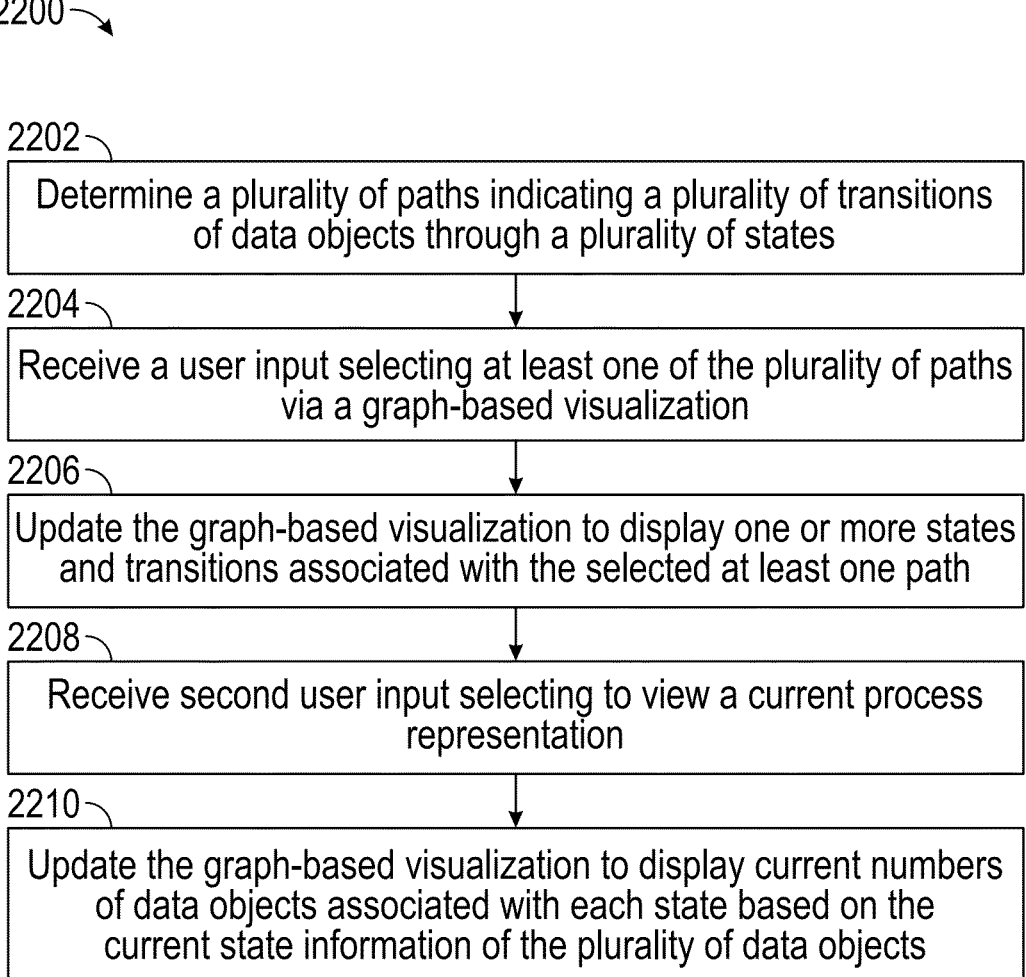

2202

Determine a plurality of paths indicating a plurality of transitions of data objects through a plurality of states

2204

Receive a user input selecting at least one of the plurality of paths via a graph-based visualization

2206

Update the graph-based visualization to display one or more states and transitions associated with the selected at least one path

2208

Receive second user input selecting to view a current process representation

2210

Update the graph-based visualization to display current numbers of data objects associated with each state based on the current state information of the plurality of data objects

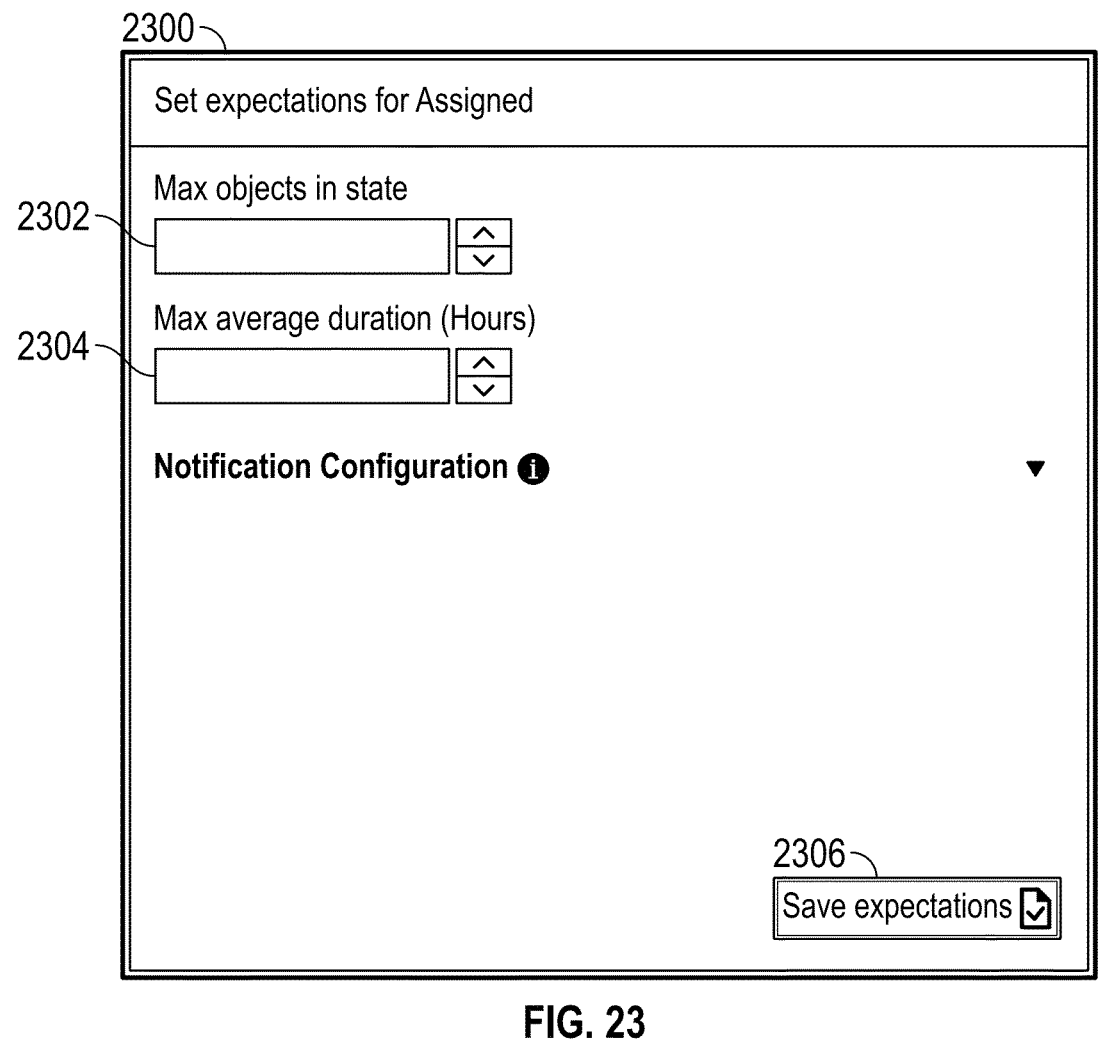

Set expectations for Assigned

Max objects in state

2302

Max average duration (Hours)

2304

Notification Configuration ⓘ                                    ▼

2306

Save expectations ☑

FIG. 23

OBJECT-BASED PROCESS MANAGEMENT

CROSS-REFERENCE TO RELATED APPLICATIONS

This application claims benefit of U.S. Provisional Patent Application No. 63/502,822, filed May 17, 2023, and titled "OBJECT-BASED PROCESS MANAGEMENT AND VISUALIZATION," U.S. Provisional Patent Application No. 63/509,508, filed Jun. 21, 2023, and titled "OBJECT-BASED PROCESS MANAGEMENT AND VISUALIZA-TION," U.S. Provisional Patent Application No. 63/584,448, filed Sep. 21, 2023, and titled "OBJECT-BASED PROCESS MANAGEMENT AND VISUALIZATION," and U.S. Provisional Patent Application No. 63/558,000, filed Feb. 26, 2024, and titled "OBJECT-BASED PROCESS MANAGEMENT AND VISUALIZATION." This application also relates to U.S. patent application Ser. No. 18/655,680, filed May 6, 2024, and titled "OBJECT-BASED PRO-CESS MANAGEMENT." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Implementations of the present disclosure relate to systems and techniques for process management. More specifically, implementations of the present disclosure relate to computerized systems and techniques for using an object model and/or ontology to store process information and generate interactive visualizations.

BACKGROUND

Computerized systems may be used to log data associated with processes. Static visualizations of a process may be generated based on the logged data.

SUMMARY

The systems, methods, and devices described herein each have several aspects, no single one of which is solely responsible for its desirable attributes. Without limiting the scope of this disclosure, several non-limiting features will now be described briefly.

Process mining can be a useful tool for providing an understanding of the complex processes affecting an entity's production capacity, workflows, costs, and revenues. Various process mining systems may be designed to receive and analyze log data about an entity's production timeline and associated costs. For example, these systems may accept log data from various machinery within an entity's (e.g., an organization's) production pipeline (e.g., milling machines, assembly tools, etc.) indicating a time when an operation begins and a time when an operation ends. These systems may also be capable of associating a cost with the information in the log data. The log data and costs may then be analyzed to produce a visual representation representing the flow of inventory and money through each step of produc-tion. The system may then receive input, such as user interaction, with the visual representation. Examples of input which may be received by the system include adjusting input values or associated costs. The system may then project outcomes based on the received input. Some systems may be limited in their ability to provide useful projections due to limited information regarding the various process steps when using log data and cost information alone. The system may be unable to account for additional aspects of a process step, for example minimum staffing requirements, due to these limitations on available data. Additionally, due to the limitations presented by using log data, the system's projected outcomes may diverge from actual outcomes. Incorporating additional information into the system to enable more informed decision-making is a non-trivial prob-lem for which such systems are not suited. Further, the system may incorporate current process step information for various objects (e.g., machinery, purchase orders, and/or the like) indicating a process step the objects are currently in. In some cases, an object may currently be in a blocking step which prevents the object from moving forward in the process. A set of rules may exist for allowing the object to proceed to a next step in the process, however the applica-tion of the rules may be limited such that some objects remain in the blocking step unnecessarily. Due to the limi-tations of rules-based systems, the system may be unable to move objects out of the blocking step without additional information or manual intervention, reducing the overall efficiency of the process.

The present disclosure relates to a system for object-based process management and visualization (generally referred to herein as "the graph-based visualization system" or "the system"). The present disclosure further includes various processes, functionality, and interactive graphical user inter-faces related to the system. According to various implemen-tations, the system (and related processes, functionality, and interactive graphical user interfaces) can advantageously provide for visualization and management of process pipe-lines or workflows, and model the result of alterations to such existing process pipelines or workflows. Various imple-mentations of the present disclosure can advantageously overcome various of the technical challenges mentioned above, among other technical challenges. For example, the system may receive and/or store information about states of a process, associations between the states, and transitions between the states, in the form of data objects. Data objects associated with the process may be determined and/or received by the system based on various elements involved in the process including items, goods, equipment, employ-ees, timekeeping devices, transportation equipment, or any other element (e.g., equipment or personnel) involved in the process. Additionally, the system can advantageously pro-vide for the generating an automation for at least a portion of a process (e.g., a process node) managed by the system. The system provides improved methods of representing processes by using data objects that may transition between states. This allows improvements in simulations and analy-sis of complex time-dependent processes represented by data objects. The simulation and analysis of process in accordance with the present disclosure can allow automation of processes that would not be possible in accordance with known methods.

The system can advantageously be applied and/or adapted to support and analyze processes of various sizes and types, and that involve large volumes of various types of entities that can be represented as data objects. The system can further advantageously provide various technical benefits and features such as, for example, transparency by way of visualizations of how processes are executed in reality rather than just what is hoped; process analytics that can uncover inefficient process paths to help prevent them from occurring in the future; identification of friction points by identifying ontological entities (e.g., as represented by data objects) in the process creating delays or other issues; and performance improvement by identifying actions that can drastically improve various metrics.

According to various implementations, large amounts of data are automatically and dynamically calculated interactively in response to user inputs, and the calculated data is efficiently and compactly presented to a user by the system. Thus, in some implementations, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces that are useable and easily learned by humans is a non-trivial problem for software developers. The present disclosure describes various implementations of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, processes and process-related data, and may enable a user to more quickly and accurately access, navigate, assess, and digest the process-related data than previous systems.

Further, the interactive and dynamic user interfaces described herein are enabled by innovations in efficient interactions between the user interfaces and underlying systems and components. For example, disclosed herein are improved methods of receiving user inputs (including methods of interacting with, managing, and integrating processes), translation and delivery of those inputs to various system components, automatic and dynamic execution of complex processes in response to the input delivery, automatic interaction among various components and processes of the system, and automatic and dynamic updating of the user interfaces (to, for example, display the process-related data). The interactions and presentation of data via the interactive user interfaces described herein may accordingly provide cognitive and ergonomic efficiencies, among various additional technical advantages over previous systems.

Further, as described herein, the system may be configured to respond to various user interactions with the interactive user interface. For example, the system may, in response to input, generate or update state graphs associated with one or more states of a process displayed by the user interface such as by displaying additional information associated with a selected state. In some implementations, the system may, based on user input, display candidate transitions and identify unexpected transitions therein, allow the adjustment of a threshold for displaying transitions between states of a process, filter information displayed by the GUI based on an object type, allow for the setting of custom rules causing the system to update the user interface or present an additional user interface, present a detailed view of a selected state and/or data object, and/or generate a multi-object process view using information of data objects of different types indicating connections between the different object types.

Thus, various implementations of the present disclosure can provide improvements to various technologies and technological fields, and practical applications of various technological features and advancements. For example, as described above, existing computer-based process management and integration technology is limited in various ways, and various implementations of the disclosure provide significant technical improvements over such technology. Additionally, various implementations of the present disclosure are inextricably tied to computer technology. In particular, various implementations rely on operation of technical computer systems and electronic data stores, automatic processing of electronic data, and the like. Such features and others (e.g., processing and analysis of large amounts of electronic data, management of data migrations and integrations, and/or the like) are intimately tied to, and enabled by, computer technology, and would not exist except for computer technology. For example, the interactions with, and management of, computer-based processes described below in reference to various implementations cannot reasonably be performed by humans alone, without the computer technology upon which they are implemented. Further, the implementation of the various implementations of the present disclosure via computer technology enables many of the advantages described herein, including more efficient management of various types of electronic data (including computer-based processes).

Various combinations of the above and below recited features, embodiments, implementations, and aspects are also disclosed and contemplated by the present disclosure.

Additional implementations of the disclosure are described below in reference to the appended claims, which may serve as an additional summary of the disclosure.

In various implementations, systems and/or computer systems are disclosed that comprise a computer-readable storage medium having program instructions embodied therewith, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising a computer-readable storage medium are disclosed, wherein the computer-readable storage medium has program instructions embodied therewith, the program instructions executable by one or more processors to cause the one or more processors to perform operations comprising one or more aspects of the above- and/or below-described implementations (including one or more aspects of the appended claims).

BRIEF DESCRIPTION OF THE DRAWINGS

The following drawings and the associated descriptions are provided to illustrate implementations of the present disclosure and do not limit the scope of the claims. Aspects and many of the attendant advantages of this disclosure will become more readily appreciated as the same become better understood by reference to the following detailed description, when taken in conjunction with the accompanying drawings.

FIGS. 2A-2G are flowcharts illustrating example routines that may be performed by a graph-based visualization system.

FIG. 3 is a flowchart illustrating an example routine incorporating a large language model into a graph-based visualization system.

FIGS. 12A-12B depict example user interfaces for identifying and analyzing friction points associated with a graph-based process visualization.

FIGS. 14A-14C depict example user interfaces for generating and modifying multi object graph-based process visualizations.

FIGS. 17A-17B are flowcharts illustrating example routines that may modify data objects based on automations.

FIG. 19 depicts an example user interface for presenting details of a proposal generated based on an automation.

FIG. 20 depicts an example user interface for displaying a proposal and reasoning for the proposal based on an automation.

FIG. 22 is a flowchart illustrating an example routine for interacting with a graph-based process visualization.

FIG. 23 depicts an example user interface for modifying expectations for a state in a process.

DETAILED DESCRIPTION

Figure 1A:
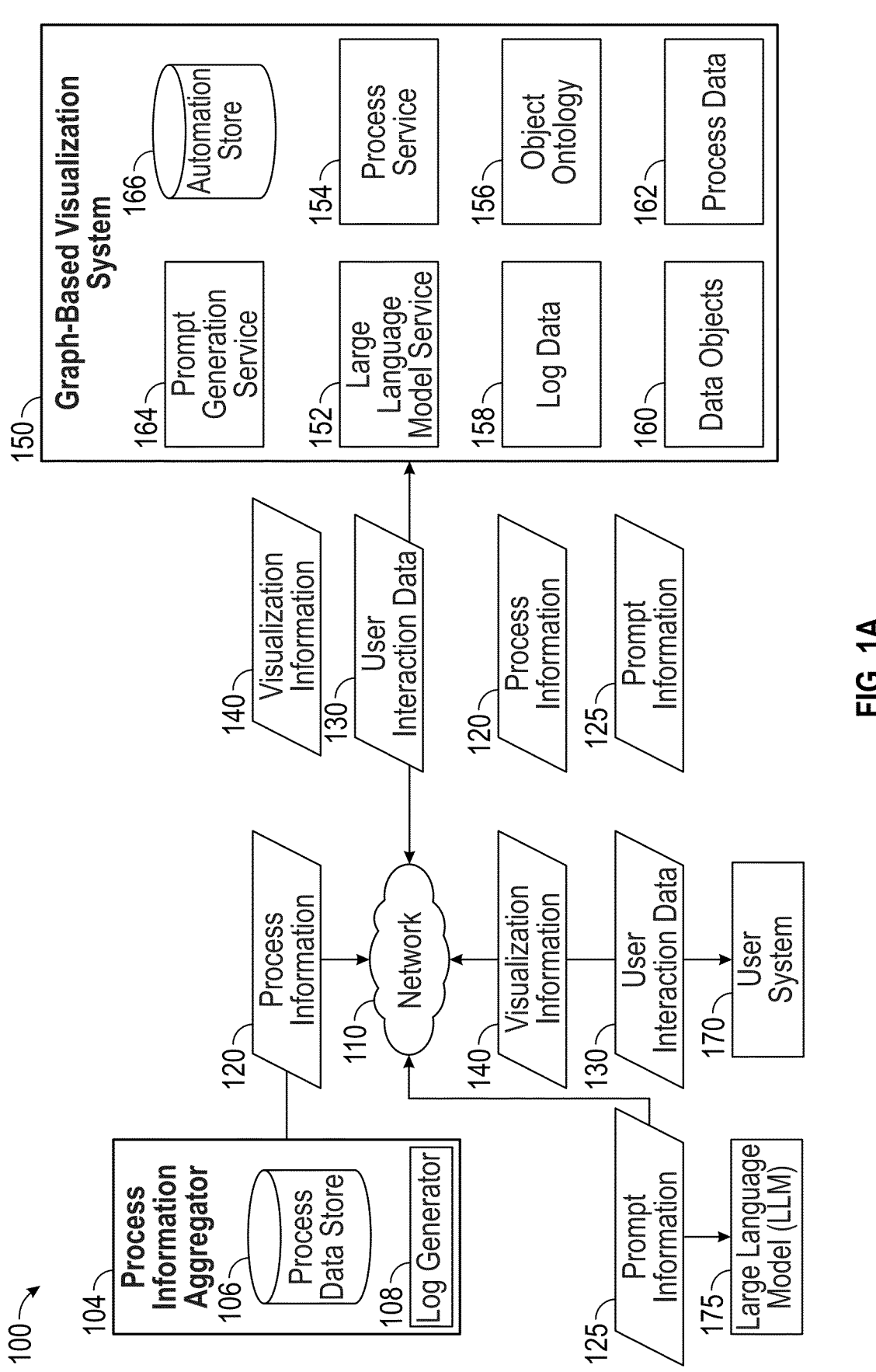
FIG. 1A is a block diagram illustrating an example graph-based visualization system in an example computing environment.

Although certain preferred implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

I. Overview

As mentioned above, process mining can be a useful tool for providing an understanding of the complex processes affecting an entity's production capacity, workflows, costs, and revenues. Various process mining systems may be designed to receive and analyze log data about an entity's production timeline and associated costs. For example, these systems may accept log data from various machinery within an entity's (e.g., an organization's) production pipeline (e.g., milling machines, assembly tools, etc.) indicating a time when an operation begins and a time when an operation ends. These systems may also be capable of associating a cost with the information in the log data. The log data and costs may then be analyzed to produce a visual representation representing the flow of inventory and money through each step of production. The system may then receive input, such as user interaction, with the visual representation. Examples of input which may be received by the system include adjusting input values or associated costs. The system may then project outcomes based on the received input. Some systems may be limited in their ability to provide useful projections due to limited information regarding the various process steps when using log data and cost information alone. The system may be unable to account for additional aspects of a process step, for example minimum staffing requirements, due to these limitations on available data. Additionally, due to the limitations presented by using log data, the system's projected outcomes may diverge from actual outcomes. Incorporating additional information into the system to enable more informed decision-making is a non-trivial problem for which such systems are not suited.

As also mentioned above, the present disclosure relates to a system for object-based process management and visualization (generally referred to herein as "the graph-based visualization system" or "the system"). The present disclosure further includes various processes, functionality, and interactive graphical user interfaces related to the system. According to various implementations, the system (and related processes, functionality, and interactive graphical user interfaces) can advantageously provide for visualization and management of process pipelines or workflows, and model the result of alterations to such existing process pipelines or workflows. Various implementations of the present disclosure can advantageously overcome various of the technical challenges mentioned above, among other technical challenges. For example, the system may receive and/or store information about states of a process, associations between the states, and transitions between the states, in the form of data objects. Data objects associated with the process may be determined and/or received by the system based on various elements involved in the process including items, goods, equipment, employees, timekeeping devices, transportation equipment, or any other element (e.g., equipment or personnel) involved in the process.

The system can advantageously be applied and/or adapted to support and analyze processes of various sizes and types, and that involve large volumes of various types of entities that can be represented as data objects. The system can further advantageously provide various technical benefits and features such as, for example, transparency by way of visualizations of how processes are executed in reality rather than just what is hoped; process analytics that can uncover inefficient process paths to help prevent them from occurring in the future; identification of friction points by identifying ontological entities (e.g., as represented by data objects) in the process creating delays or other issues; and performance improvement by identifying actions that can drastically improve various metrics.

The system (and related processes, functionality, and interactive graphical user interfaces) can further advantageously provide for the generating an automation for at least a portion of a process (e.g., a process node) managed by the system. The system can generate an input to a large language model ("LLM") which may facilitate the LLM analyzing objects and/or information associated with the process node, and providing a suggestion for automating the process node. Automating the process node may include implementing a procedure for processing objects that reach the process node to advance the objects to a next process node. A user, or an automated process, may then accept the suggestion, and the automated process will be performed on such objects. Further, the present disclosure provides for additional functionality of a process explorer user interface. For example, the user interface may allow a user to view an expected path through a process and to then select various alternative paths through the process to view in addition to, or in place of, the expected path. The user may, for example, view all paths connected to a selected state, and/or show metrics in a process graph for objects which are currently following a path but have no reached an end of a path.

The system may additionally comprise one or more interactive graphical user interfaces ("GUI") configured to present a graph-based visualization of the process based on a plurality of data objects associated with the process. A GUI of the system may present to a user an option to automate one or more nodes of the graph-based visualization of the process. When a process node is associated with an automation, the system may then generate a prompt for an LLM based on the automation, which may cause the LLM to generate proposals for modifying data objects in the process node. The proposals generated by the LLM may be written in natural language to more easily allow a user to understand the proposals. The proposals may then be presented to the user via the GUI, and the user may choose to accept a proposal. When a proposal is accepted, one or more data objects associated with the process node may be modified based on the accepted proposal. Alternatively, the system may automatically accept a proposal generated by the LLM, and in response to automatically accepting the proposal modify one or more data objects associated with the process node based on the accepted proposal. When a proposal has been accepted, the GUI may be updated to indicate the process node associated with the proposal is associated with an automation. For example, an icon used to represent the process node in the graph-based visualization may be altered or replaced with an automation indicator.

Further, the system may generate a virtual layer representing at least a portion of the process, for example by recreating one or more process nodes and data objects associated with the one or more process nodes in the virtual layer. The system may then provide an option, for example via the GUI, for the user to simulate the outcome of accepting a proposal generated by the LLM in the virtual layer. Advantageously, this may allow the user to determine any potential impacts of accepting the proposal without affecting any data objects in the live process.

The system may further comprise one or more interactive GUIs configured to display information about some or all of the data objects associated with the process. The GUI may display the information in the form of a graph-based visualization. The GUI may be presented by a display to a user. The GUI may present various visualizations of the data of the system, for example the data objects stored in the database, state information of a data object, or the result of analyses performed on the data objects by the system. For example, the GUI may present a series of nodes, where each node may represent an associated state of a process. The GUI may further present one or more paths taken by objects through the process, for example as an ordered list based on a number of objects which have taken each path through the process. The user may filter the process displayed by the GUI by selecting one or more paths from the ordered list. Additionally, the GUI may present an option to view a number of objects at each process node of the displayed process. The GUI may then allow a user to select a view of the process path which includes an indication of the number of objects currently at a node of the process, but which have not yet reached an end of the process. Further, the user may be presented with an option to assign colors to nodes of the process, where the colors are based on a number of objects currently in the process node, or a number of objects which have passed through the process node (e.g., a heat map). Such a display may be useful for indicating to the user the frequency with which objects reach a process node and/or proceed through particular paths in the process, and for assisting in the identification of potential bottlenecks in the process.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

The term "model," as used in the present disclosure, can include any computer-based models of any type and of any level of complexity, such as any type of sequential, functional, or concurrent model. Models can further include various types of computational models, such as, for example, artificial neural networks ("NN"), language models (e.g., large language models ("LLMs")), artificial intelligence ("AI") models, machine learning ("ML") models, multimodal models (e.g., models or combinations of models that can accept inputs of multiple modalities, such as images and text), and/or the like. A "nondeterministic model" as used in the present disclosure, is any model in which the output of the model is not determined solely based on an input to the model. Examples of nondeterministic models include language models such as LLMs, ML models, and the like.

A Language Model is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, and the like). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model ("LLM") is any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. LLMs may work by taking an input text and repeatedly predicting the next word or token (e.g., a portion of a word, a combination of one or more words or portions of words, punctuation, and/or any combination of the foregoing and/or the like). An LLM may be of any type, including a Question Answer ("QA") LLM that may be optimized for generating answers from a context, a multimodal LLM/model, and/or the like. An LLM (and/or other models of the present disclosure) may include, for example, a NN trained using self-supervised learning and/or semi-supervised learning, a feedforward NN, a recurrent NN, and/or the like. An LLM (and/or other models of the present disclosure) may further include, for example, attention-based and/or transformer architecture or functionality.

While certain aspects and implementations are discussed herein with reference to use of a language model, LLM, and/or AI, those aspects and implementations may be performed by any other language model, LLM, AI model, generative AI model, generative model, ML model, NN, multimodal model, and/or other algorithmic processes. Similarly, while certain aspects and implementations are discussed herein with reference to use of a ML model, those aspects and implementations may be performed by any other AI model, generative AI model, generative model, NN, multimodal model, and/or other algorithmic processes.

In various implementations, the LLMs and/or other models (including ML models) of the present disclosure may be locally hosted, cloud managed, accessed via one or more Application Programming Interfaces ("APIs"), and/or any combination of the foregoing and/or the like. Additionally, in various implementations, the LLMs and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LLaMA (Large Language Model Meta AI), and BigScience Large Open-science Open-access Multilingual Language Model (BLOOM).

A data store can be any computer-readable storage medium and/or device (or collection of data storage mediums and/or devices). Examples of data stores include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. Another example of a data store is a hosted storage environment that includes a collection of physical data storage devices that may be remotely accessible and may be rapidly provisioned as needed (commonly referred to as "cloud" storage).

A database can be any data structure (and/or combinations of multiple data structures) for storing and/or organizing data, including, but not limited to, relational databases (e.g., Oracle databases, PostgreSQL databases, MySQL databases and the like), non-relational databases (e.g., NoSQL databases, and the like), in-memory databases, spreadsheets, as comma separated values ("CSV") files, extensible markup language ("XML") files, TEXT ("TXT") files, flat files, spreadsheet files, and/or any other widely used or proprietary format for data storage. Databases are typically stored in one or more data stores. Accordingly, each database referred to herein (e.g., in the description herein and/or the figures of the present application) can be understood as being stored in one or more data stores. Additionally, although the present disclosure may show or describe data as being stored in combined or separate databases, in various implementations such data may be combined and/or separated in any appropriate way into one or more databases, one or more tables of one or more databases, and/or the like.

An ontology as discussed herein may refer to stored information that provides a data model for storage of data in one or more databases/data stores. For example, the stored data may include definitions for data object types and respective associated property types. An ontology may also include respective link types/definitions associated with data object types, which may include indications of how data object types may be related to one another. An ontology may also include respective actions associated with data object types or data object instances. The actions may include defined changes to values of properties based on various inputs. An ontology may also include respective functions, or indications of associated functions, associated with data object types, which functions may be executed when a data object of the associated type is accessed. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types.

A data object or object (also referred to herein as data entities or entities) can be a data container for information representing a specific thing in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g., metadata about the object) may be represented in one or more properties. Attributes may include, for example, a geographic location associated with the item, a value associated with the item, a probability associated with the item, an event associated with the item, and so forth.

An object type is a type of a data object (e.g., person, event, document, and/or the like). Object types may be defined by an ontology and may be modified or updated to include additional object types. An object definition (e.g., in an ontology) may include how the object is related to other objects, such as being a sub-object type of another object type (e.g., an agent may be a sub-object type of a person object type), and the properties the object type may have.

A link is connection between two (or more) data objects, based on, for example, a relationship, an event, and/or matching properties. Links may be directional, such as one representing a payment from person A to B, or bidirectional.

The system may comprise one or more interactive graphical user interfaces ("GUI") configured to present a graph-based visualization of the process based on a plurality of data objects associated with the process. As described in further detail herein, each data object is associated with related properties and state information. The nodes of the graph-based visualization may be generated based on state information of one or more data objects, where the nodes represent states of the process. The nodes may display information about the states of data objects within the process, derived from information (e.g., properties and/or state information) associated with the data objects. The edges of the graph-based visualization may also be generated based on the state information of the data objects, and may indicate data object transitions between states.

Organizing the data objects into associated nodes (e.g., representing states) and edges (e.g., representing transitions) of a graph has several advantages. Organizing the data objects may, in some implementations, comprise determining respective quantities of data objects associated with each of a plurality of states. For example, information of two or more data objects may be associated based on a shared association with a node representing a state. This association may allow for deeper analysis of factors affecting the functioning of the process being represented, such as by allowing analysis of a process state where various equipment and resources, each represented by different data objects, impacts the process state. In another example, data objects may comprise more detailed information than would be accessible from, for example, log data associated with the process alone. The system may then process this richer data set to generate insights into the functioning of the process which would otherwise not be apparent from analyzing the log information alone.

In another example, a plurality of data objects may be associated with a first state. A first portion of the plurality of data objects may comprise transition information indicating transitions to a second state, and a second portion of the plurality of data objects may comprise transition information indicating transitions to a third state. The system may process this transition information of the plurality of data objects and determine, for example, a frequency of a transition, a likelihood of a transition (e.g., a percent of data objects in the process moving across a transition), an average length of time for a transition, and the like. In some implementations, information associated with a transition may be stored in a transition object. Log information alone, for example, may not contain such additional information, and so a system that only has log information may be unable to determine some useful transition information, such as when a transition is unexpected as discussed in further detail below.

After the system has organized data objects into associated states and transitions, various information about the states and transitions may be displayed through the GUI. Additionally, metrics may be generated by the system for the states and transitions. Metrics generally comprise information which may be used to determine the functioning of a process. Metrics may include, for example, maximum duration, minimum duration, average revenue, average cost, or average duration. The metrics, once determined, may be presented through the GUI, e.g., associated with each of the states of the process.

Additionally, due to the object-based nature of the system, the data objects used for generating the graph-based visualization advantageously may be filtered based on various criteria, including data object type. When data objects are filtered, the system can re-determine the graph-based visualization, the state-specific metrics, and/or the overall metrics, based on the filtered set of data object. The system can thus, advantageously, identify areas for process improvement associated with particular data object types that would otherwise not be visible when considering all data objects of a process together.

As discussed above, the system may comprise one or more interactive GUIs configured to display information about some or all of the data objects associated with the process. The GUI may display the information in the form of a graph-based visualization. The GUI may be presented by a display to a user. The GUI may present various visualizations of the data of the system, for example the data objects stored in the database, state information of a data object, or the result of analyses performed on the data objects by the system. For example, the GUI may present a series of nodes, where each node may represent an associated state of a process. A node of the example GUI may be any shape (e.g., a square, circle, triangle, etc.). The shape of the node may be associated with a type of equipment, a type of information associated with the display block, a type of process, a state of a data object, or may be consistent across the GUI. The size or shape of the node may indicate additional information about the state represented by the node, for example the size may be associated with a number of data objects associated with the state represented by the node.

Edges connecting the nodes, representing transitions between states, may also be displayed on the GUI. The edges may comprise dashed lines, solid lines, curved lines, straight lines, lines of varying thicknesses, lines of varying colors, or any other indication of a connection between two display blocks to represent information about the transition associated with the edge. For example, the thickness of an edge may represent the proportion of data objects transitioning between nodes connected by the edge (e.g., an edge representing 80% of transitions out of a first state is thicker than an edge representing 20% of transitions out of the first state). In another example, solid lines may be used to represent expected transitions between states, and dashed or dotted lines may represent unexpected transitions between states. The displayed edges may indicate additional information, for example, that the connection represents an expected transition, an unexpected transition, a percentage likelihood of a transition, a value or cost associated with a transition, a length of time associated with a transition, a probability of a transition, a number data objects that traverse the transition. Such information may be shown visually in various ways, including with numbers, edge thicknesses, and/or the like. In some implementations, a verb may be associated with a transition, and/or a transition may indicate data object types associated by or linked via the transition. For example, an edge connecting a first state associated with preparing an item for shipping and a second state associated with receiving a shipped item may be assigned the verb "shipping," or an edge connecting a first state associated with an "order" data object and a second state associated with an "invoice" data object that is linked to the "order" data object, may indicate "order to invoice."

The GUI may be interactive and/or adjustable by a user of the system, and the system may receive such requests for adjustment as user interaction data. For example, the system may receive a user interaction data representing a user selecting a node of the GUI to indicate a request to display additional or alternative information. In another example, the system may receive a user interaction data indication a click on a connection to indicate a request for additional or alternative information. Additionally, the system may receive a user interaction data based on an interaction between the user and the GUI. The user interaction data may indicate, for example, a request to update an existing process, generate a new process, or update a portion of the process (e.g., a first state, a second state, and a transition between the first and second states) by, for example, interacting with one or more nodes or data objects. The system may generate new log data based in part on the data objects associated with the user interaction and the user interaction data. In some cases, a user may interact with the GUI without indicating an adjustment or change to the information, such as by zooming in, adjusting a size of a display block, moving a display block, zooming out, or clicking on a display block to highlight the block. The system may receive such an interaction, and adjust the GUI display according to the user interaction.

In some examples, the system may receive a user interaction data indicating a user request to enter a detailed view, or altered display, of data objects associated with a state. In response to the system receiving such a request for a detailed view of a state, the system may cause the GUI to be updated to a detailed view display, may cause the GUI to be replaced by a second GUI presenting the detailed view, or the second GUI presenting the detailed view may be overlaid on some or all of the GUI. The detailed view may present a listing of data objects associated with the selected state, including detailed information associated with each of the data objects. In an example, the detailed information may include alerts indicating, e.g., that a data object has traversed an unexpected transition.

In some examples, the system may receive a user interaction data indicating a user request to enter a detailed view, or altered display, of events associated with a particular data object. In response to the system receiving such a request for a detailed view of a data object, the system may cause the GUI to be updated to a detailed view display, may cause the GUI to be replaced by a second GUI presenting the detailed view, or the second GUI presenting the detailed view may be overlaid on some or all of the GUI. The detailed view may present a simplified graph view configured to display, for example, a data object's traversal over the graph. The detailed view may, in some implementations, display or highlight unexpected transitions associated with the selected data object's traversal over the graph.

As noted above, a transition may be represented by a connection (e.g., an edge of the graph) between process states (e.g., nodes of the graph) displayed in the GUI. Information associated with a transition may be contained in one or more data objects associated with a step of the process, for example the log data associated with a data object may comprise information about the transitions the data object makes through the process. Alternatively, information associated with a transition may comprise a separate data object. The information associated with the transition may, for example, come from the data object representing the initiation of the transition and the data object representing the end of the transition. Multiple data objects may represent the same or related transitions. For example, one data object may contain information associated with the most likely transition from an output of a first step in the process, and a second data object may represent the least likely transition from the output of the first step in the process. Alternatively, a single data object may be used to represent every transition from the output of the first step and the probability of each transition. There may be a plurality of transitions from the first step and each of the plurality of transitions may terminate as the input to each of an associated plurality of subsequent steps.

As discussed previously herein, in some cases an unexpected transition in the process may occur. The system may process information associated with one or more states and the one or more transitions associated with each state to identify all transitions occurring with the process. In some implementations, the system may first identify a transition as a candidate transition. A candidate transition may then be determined automatically by the system to be, for example, an expected transition, an undesirable transition, or an unexpected transition. In some cases, an undesirable transition may be the same as an unexpected transition. In some implementations, the system may request, or may otherwise receive, user input information indicating a candidate transition is an unexpected transition. In some implementations, the system may request a user identify all unexpected or undesirable transitions from the candidate transitions, and the remainder of the transitions may be designated as expected transitions. Additionally, when the system has identified the transitions of the process, the system may then recommend transitions to a user, such as when one of a plurality of transitions is a most efficient transition for the process.

In some implementations, the system may receive a user interaction data, based on a user interaction with the GUI, indicating a request to view some but not all of the possible transitions in the process. For example, the user interaction data may comprise a request to set a threshold for displaying transitions on the GUI, such as transitions which occur over 10% of the time the process occurs. Thresholds may be used, for example, to hide less frequent or unexpected transitions to provide a simplified, or more readable, view of the process to a user. Thresholds for displaying transitions may be based on any metric associated with a transition, for example the total number of data objects associated with the transition, a length of time of a transition, a termination of the process following the transition, etc. In another example, the user interaction data may comprise a request to only view expected transitions. In some implementations, the system may generate an alert that an unexpected transition occurs between two or more process states. The alert may be presented to the user by an update to the GUI, or by a notification separate from the GUI.

In some implementations, the system may receive a user input information associated with a user request to view detailed information associated with an unexpected transition. In response to the user request to view detailed information of the unexpected transition, the GUI may be updated to display the portion of the unexpected transition. Such detailed information may include, for example, an absolute number of data objects associated with the unexpected transition, an average time a data object takes to move from an initial state of the unexpected transition to a final state of the unexpected transition, a percentage of total data objects associated with the unexpected transition, information indicating a cause of a data object becoming associated with the unexpected transition, and the like.

In some implementations, the system may allow a user to input custom expectations, or rules, for the GUI. In some implementations, rules may be based on metrics associated with data objects. For example, a user interaction data received by the system from the GUI may indicate a user has defined a rule for the color of nodes displayed in the graph view. In this example, a user may be presented with a window embedded in the GUI into which custom expectations may be entered. The user may then enter a custom expectation that, for example, process states which require over five hours to complete should be colored red, and process states which require five or less hours to complete should be colored green. The system may receive this custom expectation as user input information, and based on an evaluation of the custom expectation update the GUI such that process states (e.g., nodes of the graph) are colored according to the custom expectation. In some implementations, the custom expectation may indicate a situation in which an alert should be presented to the user by the system, such as by displaying an alert in the GUI. The system may evaluate the custom expectation at automatically determined, or user defined, intervals and generate a notification based on the evaluation of the custom expectation.

In some implementations, a rule may be associated with a data object and/or a data object type, e.g., in the object ontology. The system may then evaluate the rule associated with the data object (or data objects of the data object type), and a state change may be triggered (e.g., and added to the data object(s)) based on the rule. In response to the state change triggered by the rule, the state information associated with the first data object may be updated by the system. In some implementations, a rule may be received by the system as user input information. The rule may then be applied to one or more states or transitions of the process. The system may generate a notification, based on the evaluation of the rule, where the notification is associated with the first state.

For each data object, the system may receive state information associated with the data object and metrics associated with the data object. The state information may contain, for example, information acquired from a variety of sources such as equipment logs, employee logs, maintenance logs, or timekeeping information. Additionally, the state information may include live information associated with an element of the process, where the element is associated with a data object. State information may further include a history of states associated with a data object. Metrics may comprise information about the average cost, average revenue, peak cost, peak revenue, minimum or marginal cost, maximum duration, minimum duration, a number of employees associated with a step, average duration associated with step or transition, and/or the like. In some cases, metrics may be received from one or more of accounting software, equipment management software, a user input, or any other source capable of indicating a value of a metric.

Additionally, the system may analyze state information of multiple data objects to enrich one or more data objects. Enriching a data object associated with a state or transition may include combining state information from multiple data objects related to the same state or transition, for example the time an inventory item is sent from a production element and the time the inventory item is received by a receiving element may be transmitted to the system by each device, and these times may then be used by the system to determine the length of the transition between the sending and receiving steps in the process where no such data exists in the data objects associated with the individual steps or transition. This determined information may then be incorporated, for example, into the data object associated with the transition between steps as state information.

The system can advantageously identify "friction points" of a process for potential efficiency improvements. For example, such friction points may include particular types of objects where various metrics are low, portions or states of the process where various metrics are low, and/or the like. Such "friction points" can be displayed in order based on an impact assessment, such as points with the greatest efficiency or savings potential impact.

In response to selection of a particular "friction point" from the list, the system can display details of the reasons for the assessment, and enable the user to take immediate action (e.g., contacting or alerting a user with authority to take action, blocking certain actions by the process, and/or the like) to mitigate the "friction point" to improve the process. Via such GUIs and functionality, the system can additionally display details associated with specific data objects and/or types of data objects that may be selected by the user.

The system can include machine learning and/or other AI models to provide recommendations for process changes to mitigate the reasons for the alerts. The system can then enable the user to take immediate action based on the recommendations.

While various references herein have been made to a single data object type associated with a process, in some implementations data objects of two or more distinct types may be used as input to the system from which a graph-based view may be generated. Each data object type may be associated with a respective set of properties and respective set of state information. The system may determine, based on the respective state information associated with two or more distinct object types and/or linking information associated with the data object types, relationships between the two or more data object types. The system may then use the properties, state information, and/or data object type for each of the data objects to determine a plurality of states associated with a process. The system may then analyze this multi-object process to provide additional insights which may not have been available from an analysis of the process associated with each data object type individually.

For example, the system may receive a first plurality of data objects of a first data object type, and a second plurality of data objects of a second data object type. The system may determine, for example, that the first data object type is "order data" associated with a process, based on the properties and state information associated with the data object representing the first data object type. The system may further determine, for example, that the second data object type is "invoice data" associated with the process. The system may then generate a set of states associated with the process including the first data object type and the second data object type, and determine the steps in the process where the first data object type and the second data object type interact (e.g., when an invoice is generated based on an order status). Additionally, the system may display the states associated only with each data object type, for example a state of receiving an order may not be associated with the invoice. Such information may be useful, for example, for determining that a manufacturing process has a bottleneck associated with a stage of construction causing delays between when an order is placed and when an invoice is generated. This insight may not have been available without the ability to view process steps associated with each data object type and the combined analysis of the first data object type and the second data object type in the same process.

In some implementations, an initial process may first be generated based on a first data object type. The system may then receive user interaction data indicating a first state to be selected. The system may then determine, based on the user interaction data and the data objects associated with the first state that a subsequent state is to be added to the process. The system may then update the process to incorporate the subsequent state, and update the GUI to indicate that the subsequent state has been added. Updating the GUI may further comprise updating one or more edges of the graph-based visualization, such as to indicate an updated number of data objects transitioning between states connected by the one or more edges. In some implementations, the initial process may have been generated for data objects of a first data object type. The system may then receive user interaction data, and/or access information, indicating a link from a first data object of the first data object type to a second data object of a second data object type, the second object type different from the first data object type. The system may then determine, based on state information associated with the first data object or the second data object, an additional state (e.g., a subsequent state or a prior state of either the first data object or the second data object) associated with a first state of the first data object. The system may then update the graph-based visualization to include the additional state, and at least a transition between the first state and the additional state. In this way, users may interact with the system to add additional states to the process, where those additional states may be associated with object types already included in the initial process or object types not yet included in the initial process, but which interact with the initial process (e.g., the object type is an input, output, or blocking event for a step of the process).

In the example GUI above, the light green nodes represent states with data objects that are of a different type from the data objects of prior states. The transitions between these states can be determined based on a link between different data objects of different data object types, state information associated with the data objects, and/or timestamp information associated with the data objects.

In some implementations, the system may further comprise a Large Language Model ("LLM") to allow for more flexible interaction, such as through receiving natural language instructions, with a user of the system. In some implementations, the system may receive a request from a user to generate a new process. The request may be in natural language form. The system may then apply the request to the LLM to generate a new process. In some implementations, generating a new process may additionally comprise receiving incomplete log information (e.g., log information where the states are not named, log information where state transitions are omitted, etc.) and an instruction from the user indicating a request to update the process to hide incomplete information. The LLM may then generate a graph-based visualization of the process, determine incomplete log information (e.g., identifying a data object moving from the first process step to the final process step immediately), and hide the visual representation of incomplete log information in the GUI.

In some implementations, the system may receive a request from a user (e.g., a prompt from the user), comprising a natural language description of a notional process. The system may then, using the LLM, generate the notional process comprising one or more states and one or more transitions. The system may then present the notional process by the GUI using a graph-based visualization. In some implementations, the system may receive a request from the user in natural language form and requesting the system to group existing process states into a simplified process view. The system may then, by applying the request and information associated with the existing process states to the LLM, generate a set of groupings, where each grouping comprises one or more existing process states. The system may additionally, based on the output of the LLM, assign a name to each of the grouped process states. In some implementations, the system may receive a request from the user, in the form of a natural language request, to provide an insight into the process. For example, the user may request the system display a preferred path, identify outliers in the object data, or recommend an adjustment to the process. The system may then apply the request and the information associated with the process to the LLM to generate a result. The system may then update the GUI, such as by generating a pop-up notification, additional dialogue box, or updating the graph-based view to provide a response to the user request based on the generated result of the LLM. In some implementations, the system may receive a user request to assign a verb to one or more transitions of the process represented be a respective edge of the graph-based visualization. The system may then apply the information associated with the process and the user request to the LLM to generate a set of verbs, each verb associated with a transition. The system may then display the verb associated with each transition, for example by overlaying the verb on the associated edge of the graph-based visualization. In various additional implementations, the system may submit process information (e.g., indicative of a plurality of states and transitions), along with prompt information, to the LLM to receive, from the LLM, one or more of: a preferred path through one or more states of the plurality of states of the process, a spatial layout of one or more states of the plurality of states of the process, a grouping of one or more states of the plurality of states of the process, a combining of one or more states of the plurality of states of the process, an identification of outliers of one or more states of the plurality of states or at least one transition of the one or more transitions of the process, and/or one or more insights or recommendations associated with the process. In the various examples and implementations mentioned above, the system can then parse the output from the LLM and update the dynamic graph-based visualization to provide a representation based on the output.

II. Example System and Related Computing Environment

With reference to an illustrative example, FIG. 1A shows an example computing environment 100 for object-based process management and visualization. The computing environment 100 may comprise a process information aggregator 104, a graph-based visualization system 150 (also referred to herein as "system 150"), a network 110, a large language model (LLM) 175, and a user system 170.

The process information aggregator 104 may, for example, be a computing system (e.g., a server computing device, desktop computing device, a computing device associated with a real-world object associated with a process, etc.). The process information aggregator 104 may be used to aggregate log data from various machinery or entities, as described herein. In some implementations, the process information aggregator 104 may comprise a process data store 106 and a log generator 108. In some implementations, the process data store 106 may be a database or other data storage system used to store data associated with various aspects of the process being performed by the system the process information aggregator 104 is in communication with. The log generator 108 may collect information, for example timestamp information associated with the steps of a process, from various machinery, computing devices, and/or other resources performing aspects of the process and convert the collected information into a log format. In some implementations the log generator 108 may collect cost information and use the collected cost information in generating the logs in the log format. In some implementations, the log generator 108 may be a separate computing system in communication with the process information aggregator 104. The process information aggregator 104 generates process information 120 and may transmit the process information 120 over the network 110 to the graph-based visualization system 150.

The graph-based visualization system 150 is an aspect of the computing environment 100 configured to generate a graph-based visualization of a process and allow modification of the graph-based visualization, such as by a user via the user system 170. In some implementations, the graph-based visualization system 150 may comprise a large language model service 152, a process service 154, log data 158, object ontology 156, data objects 160, process data 162, a prompt generation service 164, and an automation store 166. The large language model service 152 may store one or more large language models of the graph-based visualization system 150, as further described above herein. Alternatively, the large language model service 152 may facilitate interaction between the graph-based visualization system 150 and the LLM 175, which may enable the graph-based visualization system to use the LLM 175 to perform the various functions attributed to a large language model and described herein. In some implementations, the LLM 175 may be a plurality of LLMs. Additionally, in some implementations, one or more LLMs may be internal to the graph-based visualization system 150, and one or more LLMs may be external to the graph-based visualization system 150 (e.g., an LLM provided by a provider separate from the graph-based visualization system 150). The data objects 160 may comprise one or more data objects as described below with respect to FIGS. 5 and 6. The object ontology 156 comprises an object ontology providing a data model for storage of data in one or more databases/data stores as described above herein and below with respect to FIGS. 5 and 6. The log data 158 may comprise log data generated or collected by the process information aggregator 104 and received by the graph-based visualization system 150, such as by the process information 120 received by the graph-based visualization system 150, and/or log data generated by another component of the graph-based visualization system 150. The prompt generation service 164 can generate prompt information 125 for a language model, such as LLM 175. As described in further detail below with respect to FIGS. 17A-17B, the prompt generation service 164 may generate the prompt information 125 based on the user interaction data 130, the process information 120, one or more automations stored in the automation store 166, and/or the visualization information 140. The automation store 166 can store one or more automations to be used as described below with respect to FIGS. 17A and 17B to generate a proposal to modify a state of a data object in a process.

In some implementations, the process data 162 is the received process information 120 from the process information aggregator 104. The process data 162 may, in some implementations, be additional process data generated by graph-based visualization system 150, for example by the process service 154. The process service 154 may use the log data 158, object ontology 156, data objects 160, and/or process data 162 to generate additional process data representing states, transitions, associations between data objects, metrics, and other information associated with generating and managing the graph-based visualization of the process. In some implementations, the process service 154 may receive user interaction data 130, for example from the user system 170, and incorporate the user interaction data 130 into the generated process, such as by updating process data 162 or generating new process data.

In some implementations, the graph-based visualization system 150 generates visualization information 140 based at least in part on an output of the process service 154, log data 158, data objects 160, the object ontology 156, and/or the process data 162. The visualization information 140 may then be transmitted via the network to the user system 170 for presentation to a user.

The large language model service 152 can provide various LLM-related functionality of the system 150. The large language model service 152 may, for example, receive inputs to, and provide outputs from, one or more internal or external LLMs (e.g., LLM 175) for various LLM function-ality of the system described herein. In various implemen-tations, the large language model service 152, and/or one or more LLMs accessible via the large language model service 152, may be locally hosted, cloud managed, accessed via one or more APIs, and/or any combination of the foregoing and/or the like. For example, a user may interact with a user interface provided by the system 150, and request to query information associated with a defined modeling objective. The large language model service 152 may receive the query, and transmit results based on the query to a user interface of the system 150.

The user system 170 may be one or more computing devices configured to receive visualization information 140 from the graph-based visualization system 150 and present the visualization information 140 as an interactive graph-based visualization to a user. For example, the user system 170 may comprise a display component or be in communi-cation with a display component. Additionally, the user system 170 may comprise an input component or be in communication with an input component such that user interaction data 130 may be received by the user system 170 and transmitted via the network 110 to the graph-based visualization system 150 for processing by the process service 154 or another component of the graph-based visu-alization system 150, such as the large language model service 152.

Figure 4:
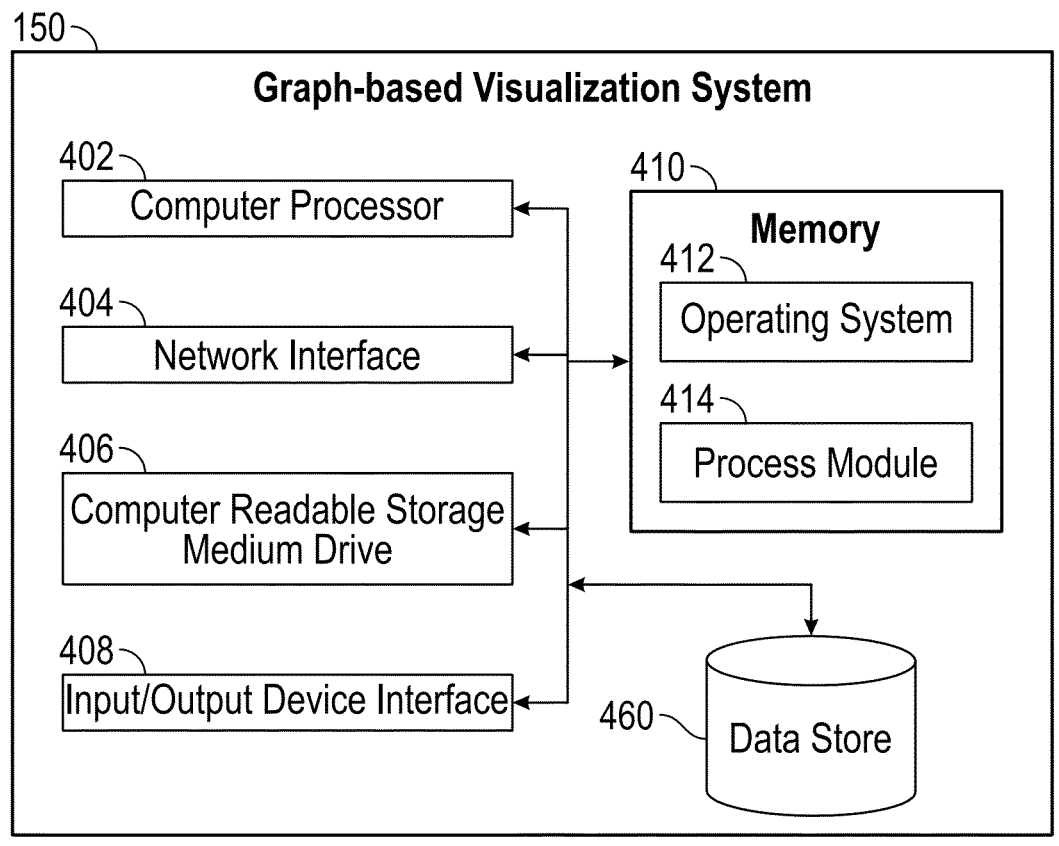
FIG. 4 is a block diagram illustrating an example execution environment for a graph-based visualization system and/or other aspects of various implementations of the present disclosure.

The network 110 can include any one or more commu-nications networks, such as the Internet. The network 110 may be any combination of local area network ("LAN") and/or a wireless area network ("WAN") or the like. Accord-ingly, various components of the computing environment 100, including the graph-based visualization system 150 and the user system 170, can communicate with one another directly or indirectly via any appropriate communications links and/or networks, such as network 110 (e.g., one or more communications links, one or more computer net-works, one or more wired or wireless connections, the Internet, any combination of the foregoing, and/or the like). Similarly, the various components (e.g., as described below) of the computing environment 100 may, in various imple-mentations, communicate with one another directly or indi-rectly via any appropriate communications links (e.g., one or more communications links, one or more computer net-works, one or more wired or wireless connections, the Internet, any combination of the foregoing, and/or the like). FIG. 4, described below, provides additional examples of aspects of implementations of such components of the computing environment 100, the graph-based visualization system 150, and the like.

Figure 1B:
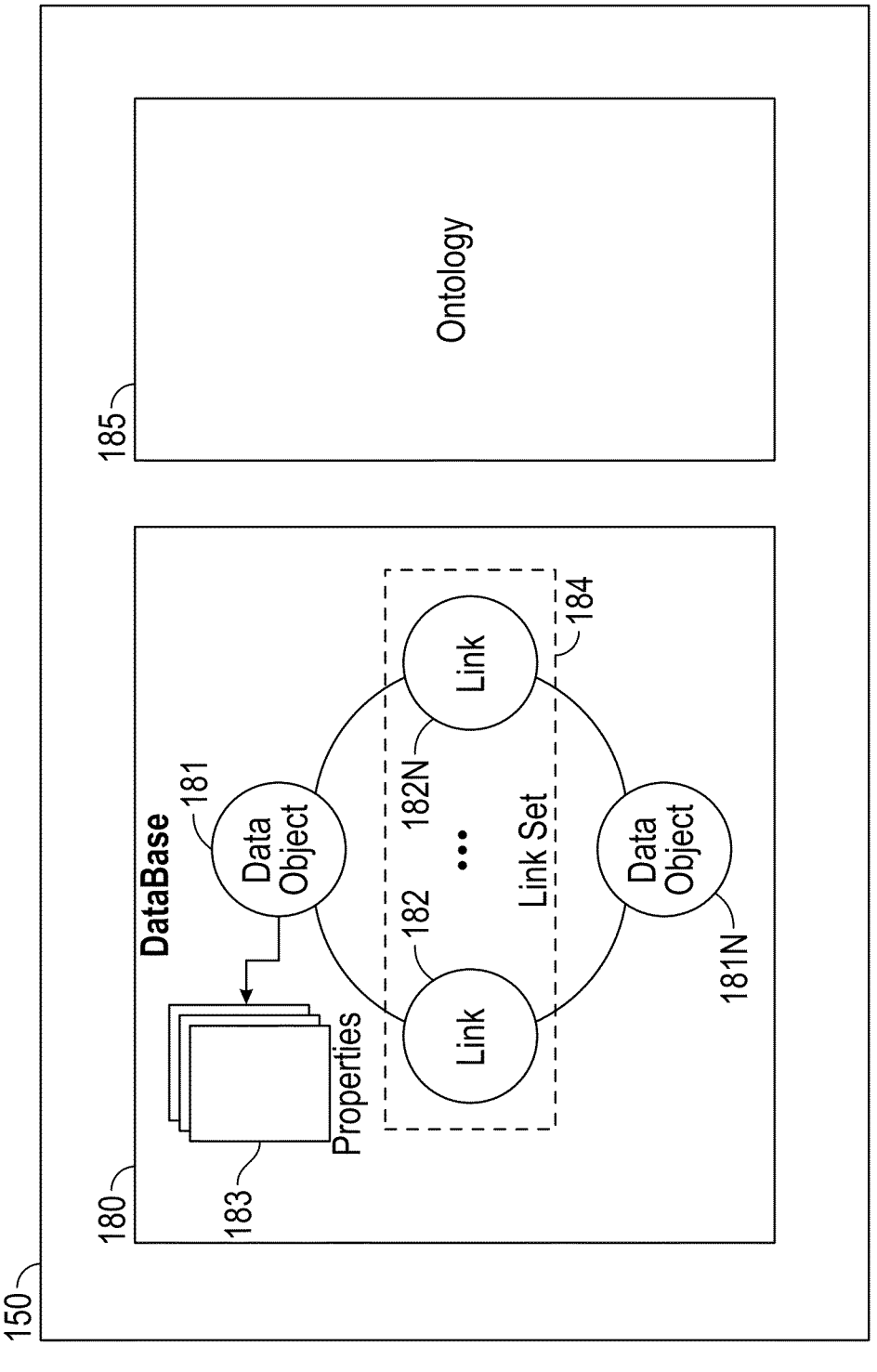
FIG. 1B is a block diagram of an example implementation of a graph-based visualization system.

FIG. 1B illustrates an object-centric conceptual data model according to an implementation of an example graph-based visualization system 150 using an ontology 185. This description is provided for the purpose of providing an example and is not intended to limit the techniques to the example data model, the example database system, or the example database system's use of an ontology to represent information. In some implementations, the ontology 185 may be the object ontology 156 of the graph-based visual-ization system 150.

In one implementation, a body of data is conceptually structured according to an object-centric data model repre-sented by the ontology 185. The conceptual data model is independent of any particular database used for durably storing one or more database(s) 180 based on the ontology 185. For example, each object of the conceptual data model may correspond to one or more rows in a relational database or an entry in Lightweight Directory Access Protocol (LDAP) database, or any combination of one or more databases. In some implementations, the database 180 may comprise one or more of the log data 158, data objects 160, and/or the process data 162.

An ontology 185, as noted above, may include stored information providing a data model for storage of data in the database 180. The ontology 185 may be defined by one or more object types, which may each be associated with one or more property types. At the highest level of abstraction, data object 181 is a container for information representing things in the world. In some examples, data object 181 may be a data object of the data objects 160. For example, data object 181 can represent an entity such as a person, a place, an organization, a market instrument, or other noun. Data object 181 can represent an event that happens at a point in time or for a duration. Data object 181 can represent a document or other unstructured data source such as an e-mail message, a news report, or a written paper or article. Each data object 181 is associated with a unique identifier that uniquely identifies the data object within the database system.

Different types of data objects may have different prop-erty types. For example, a "Person" data object might have an "Eye Color" property type and an "Event" data object might have a "Date" property type. Each property 183 as represented by data in the graph-based visualization system 150 may have a property type defined by the ontology 185 used by the database 180.

Objects may be instantiated in the database 180 in accor-dance with the corresponding object definition for the par-ticular object in the ontology 185. For example, a specific monetary payment (e.g., an object of type "event") of US$30.00 (e.g., a property of type "currency") taking place on Mar. 27, 2009 (e.g., a property of type "date") may be stored in the database 180 as an event object with associated currency and date properties as defined within the ontology 185. The data objects defined in the ontology 185 may support property multiplicity. In particular, a data object 181 may be allowed to have more than one property 183 of the same property type. For example, a "Person" data object might have multiple "Address" properties or multiple "Name" properties.

Each link 182 represents a connection between two data objects 181. In one implementation, the connection is either through a relationship, an event, or through matching prop-erties. A relationship connection may be asymmetrical or symmetrical. For example, "Person" data object A may be connected to "Person" data object B by a "Child Of" relationship (where "Person" data object B has an asym-metric "Parent Of" relationship to "Person" data object A), a "Kin Of" symmetric relationship to "Person" data object C, and an asymmetric "Member Of" relationship to "Orga-nization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one implementation, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one implementation, a link between two data objects may be established based on similar or matching properties (e.g., property types and/or property values) of the data objects. These are just some examples of the types of connections that may be represented by a link and other types of connections may be represented; implementations are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 181 can have multiple links with another data object 181 to form a link set 184. For example, two "Person" data objects representing a husband and a wife could be linked through a "Spouse Of" relationship, a matching "Address" property, and one or more matching "Event" properties (e.g., a wedding). Each link 182 as represented by data in a database may have a link type defined by the database ontology used by the database.

III. Example Routines Implementing a Graph-Based Visualization System

The example routines below illustrate various implementations of aspects of the graph-based visualization system 150. The blocks of the routines illustrate example implementations, and in various other implementations various blocks may be rearranged, and/or rendered optional. Further, various blocks may be omitted from and/or added to the example routines below, and blocks may be moved between the various example routines. In various implementations, the example operations of the system illustrated in FIGS. 2A-2G and 3 may be implemented, for example, by one or more of the aspects of the graph-based visualization system 150, various other aspects of the example computing environment 100, and/or the like.

FIGS. 2A-2F illustrate example routines for implementing a graph-based visualization system, e.g., the system 150 and/or various other aspects of the example computing environment 100, according to various implementations.

FIG. 2A illustrates example routine 200 for generating a graph-based visualization of a process. At block 202, a representation of a process is determined, for example by the process service 154 of the graph-based visualization system 150. In some implementations, the representation may be received, for example from the process information aggregator 104. In some implementations, the representation may be generated by the graph-based visualization system 150 based on existing or received information. In some implementations, the representation may be accessed from a location storing one or more representations of one or more processes. The representation may comprise a plurality of states associated with the process, and one or more transitions between states of the plurality of states of the process. The representation may be stored, for example, as process data 162.

At block 204, a plurality of data objects, for example data objects 160 are received or accessed. For example, the plurality of data objects may be accessed by the graph-based visualization system 150 from another system in communication with the graph-based visualization system 150, and/or accessed from a component of the graph-based visualization system 150 by another component therein. In some implementations, the data objects 160 are determined and/or stored by the graph-based visualization system 150 based on the process information 120 received from the process information aggregator 104. The plurality of data objects may be associated with various real-world objects as described previously herein.

At block 206, the graph-based visualization system 150 determines state information and metrics associated with the plurality of data objects, for example by the process service 154 of the graph-based visualization system 150. In some embodiments, the state information and metrics may be accessed and/or received from a system in communication with the graph-based visualization system 150. In some embodiments, the state information and metrics may be determined, for example based on accessed and/or received process information 120. The state information and metrics may, in some implementations, be stored as process data 162. For example, state information may be associated with one or more of the data objects 160. The state information may comprise a state of the associated data objects 160 in the process, for example a state of "polishing" may be associated with data objects 160 representing real-world objects which are polished as part of the process being represented herein. Additionally at block 206, metrics associated with the data objects 160 may be determined by, for example, a component of the graph-based visualization system 150 and stored as process data 162. Metrics generally comprise information which may be used to determine the functioning of a process. Metrics may include, for example, maximum duration, minimum duration, average revenue, average cost, or average duration.

Sub-routine 207 includes block 208. At block 208, a plurality of candidate transitions associated with the process are determined. In some implementations, the plurality of candidate transitions may be determined by the process service 154 or one or more components of the graph-based visualization system 150. A candidate transition may represent a possible transition between two of states of a process. The plurality of candidate transitions may be determined based on the state information associated with the plurality of data objects determined at block 206. For example, log data 158 of the data objects 160 may comprise information indicating the transition between two states by a real-world object, and this information may be converted by the graph-based visualization system 150 into a candidate transition associated with the process. The plurality of candidate transitions may be stored, for example, as process data 162 in the graph-based visualization system 150.

At block 210, the graph-based visualization system 150 determines one or more of the candidate transitions associated with the process are unexpected transitions. In some cases, an unexpected transition may be an undesirable transition and/or a transition that is relatively less frequently utilized than other transitions. In some implementations, the graph-based visualization system 150 may automatically determine a candidate transition is an unexpected transition. In some implementations, the system may request a user identify all unexpected transitions from the candidate transitions and receive a user indication in response to the request, for example as user interaction data 130 received from the user system 170. In some implementations, the system may request a user identify one or more unexpected transitions, and the graph-based visualization system 150 may then determine a remaining one or more unexpected transitions. In some cases, there may be no unexpected transitions in the process. The graph-based visualization system 150 may in some cases indicate that no unexpected transitions associated with the process have been found, for example by an indication on an interactive graphical user interface presented to a user by the user system 170.

At block 212, the remaining candidate transitions not indicated as unexpected transitions at block 210 are designated as one or more transitions of the process. Where no candidate transitions are indicated as unexpected transitions, at least one transition will be designated as the one or more transitions of the process. The one or more transitions of the process designated at block 212 may represent common, or expected, transitions between the plurality of states of the process. In some implementations, the graph-based visualization system 150 may store the one or more transitions as process data 162. In some implementations, the graph-based visualization system 150 may determine based on the one or more transitions, the one or more unexpected transitions, and the plurality of states a most efficient transition for the process between two states, and further designate the most efficient transitions between two or more states as most efficient transitions.

At block 214, a graph-based visualization of the process is generated. The graph-based visualization may be generated by the process service 154 or another component of the graph-based visualization system 150. In some implementations, the graph-based visualization will be represented as visualization information 140 for transmission over the network 110 to the user system 170. The graph-based visualization may comprise visual representations of the state information and metrics associated with the plurality of data objects determined at block 206. In some implementations, the graph-based visualization may comprise visual representations of some or all of the transitions and/or unexpected transitions of the process. For example, the state information may be represented as nodes on a graph of the graph-based visualization. The nodes may indicate or represent an associated state, and may in some implementations further indicate metrics, data objects, or other information associated with the state represented by the node. In some examples, the transitions between states may be represented as edges of the graph-based visualization and the edges may further indicate, for example, a percentage frequency with which the represented transition occurs, whether the transition is expected or unexpected, or other information associated with the transition represented by the edge. Examples of graph-based visualizations of the system are also described herein in reference to various example user interfaces.

Referring now to FIG. 2B, routine 200 can further include, at block 218, the system generating a graphical user interface ("GUI") comprising the graph-based visualization. In some implementations, the GUI may be interactive and allow a user, for example a user of the user system 170, to provide input to the graph-based visualization system 150 as user interaction data 130. The user interaction data 130 may be received by the graph-based visualization system 150 from the user system 170 via the network 110. The graphical user interface may comprise some or all of the graph-based visualization. In some implementations, one or more of the states and/or one or more of the transitions, represented by nodes and edges respectively, may be hidden from the currently presented graph-based visualization. In some implementations, the GUI may further comprise areas allowing for user input, for example text input boxes, check boxes, interactive lists, and other means for allowing a user to provide input. In some implementations, nodes and edges of the graph presented by the GUI may be interactive and allow, for example, a user to select one or more of the edges or nodes to indicate a request for additional information associated with the selected one or more edges or nodes. For example, a user may select a first node associated with a first state of the process, and in response the graph-based visualization system 150 may provide data to update the GUI indicating metrics of the selected first state. Response to user input, for example user interaction data 130, is discussed in further detail in relation to FIGS. 2C-2E each of which expands on the operations of the user input section of routine 200 represented by sub-routine 219.

In general, sub-routine 219 comprises block 220, block 222, and block 224. At block 220, a user input is received, for example as user interaction data 130 received by the graph-based visualization system 150 via the network 110. At block 222, the GUI is updated based at least in part on the user input. At block 224 the graph-based visualization system 150 waits for further user input.

FIG. 2C illustrates an example of sub-routine 221 associated with user inputs indicating a request to filter the displayed graph-based visualization based on a selected object type. Sub-routine 221 may, in some implementations, perform functionality similar to that described in reference to sub-routine 219 previously herein. The sub-routine 221 here begins at block 225 where a user input is received. In this example, the user input received at block 225 indicates the selection of an object type. As described previously herein, an object type may be, for example, a person, item, good, event, or document. Object types may be determined for various data objects based on, for example, the log data 158 and object types may be stored as part of the object ontology 156. Block 225 here may perform functionality similar to that described previously in reference to block 220.

At block 226, the data objects 160 are filtered based on the object type indicated by the user input received at block 225. For example, if the user input indicated a request to display data objects having the object type "Person," the graph-based visualization system 150 may filter out all data objects not associated with the object type "Person."

At block 228, at least one metric and/or a subset of states and transitions is redetermined based on the filtered data generated at block 226. In some implementations, the at least one metric may be redetermined based on a subset of states and/or transitions of the graph-based visualization, where the subset of states is associated with data objects of the selected object type. In some implementations, a subset of states and transitions associated with data objects of the object type is updated, such as by hiding states and transitions not associated with data objects of the selected object type.

At block 229 of this example, the GUI is updated based in part on the re-determined metric and/or updated set of states and transitions. For example, where a subset of states and transitions are associated with data objects of the selected object type, states and transitions not of the subset of states and transitions may be hidden from the view presented by the GUI. In another example, where a metric has been re-determined, one or more display locations of the re-determined metric on the GUI may be updated to indicate the re-determined value. Block 229 here may perform functionality similar to that described previously in reference to block 222.

FIG. 2D illustrates an example of sub-routine 230 associated with a user input indicating the selection of a state. Sub-routine 230 may, in some implementations, perform functionality similar to that described in reference to sub-routine 219 previously herein. At block 231 of this example, a user input indicating the selection of a first state is received by the graph-based visualization system 150, for example as user interaction data 130. Block 231 here may perform functionality similar to that described previously in reference to block 220.

At block 232, the GUI is updated to display a detailed view of objects associated with the first state selected by the user. In some examples, the GUI may be updated to present a second window overlaying the existing GUI, the second window comprising the detailed view of the objects associated with the first state selected by the user. In some examples, the detailed view may comprise a portion of the GUI repurposed or updated to display information of the objects associated with the first state selected by the user. One example of an updated GUI may be seen in FIG. 7B discussed in further detail below.

At block 234, a second user input is received by the graph-based visualization system 150 indicating a selection of a data object associated with the first state from the detailed view, for example by selecting the data object from a list of data objects associated with the first state and indicated in the detailed view.

At block 236 of this example sub-routine 219, the GUI is updated to display a second detailed view comprising events associated with the selected data object. In some implementations, the detailed view associated with the first state is replaced by the second detailed view comprising events associated with the selected data object. In some implementations, the second detailed view may be presented overlaying a portion of the GUI. In some implementations, the second detailed view may be presented as a pop-up window separate from the GUI. An example second detailed view is shown in FIG. 7C. Block 236 here may perform functionality similar to that described previously in reference to block 222.

FIG. 2E illustrates an example sub-routine 240 where a user input indicates a rule to be applied to a state of the graph-based visualization. Sub-routine 240 may, in some implementations, perform functionality similar to that described in reference to sub-routine 219 previously herein. At block 241 of this example sub-routine 240, a user input comprising a rule to be applied to a first state of the graph-based visualization is received by the graph-based visualization system 150, for example as user interaction data 130 received via the network 110. Block 241 here may perform functionality similar to that described previously in reference to block 220. In some implementations, rules may be based on metrics associated with data objects. For example, a user interaction data received by the system from the GUI may indicate a user has defined a rule for the color of nodes displayed in the graph view. In some implementations, a rule may be associated with a data object and/or a data object type, e.g., in the object ontology. The system may then evaluate the rule associated with the data object (or data objects of the data object type), and a state change may be triggered (e.g., and added to the data object(s)) based on the rule.

At block 242, the graph-based visualization system 150 evaluates the rule received at block 241 of this example. The evaluation may be performed, for example, by the process service 154 or another component of the graph-based visualization system 150. The evaluation may comprise a determination by the graph-based visualization system 150 of one or more states and/or one or more data objects associated with the rule. For example, where a rule defines the color of nodes of the graph-based visualization, the rule may be evaluated by the graph-based visualization system 150 to determine one or more nodes affected by the implementation of the rule. In another example, where the rule relates to an object type, one or more data objects of the object type associated with the rule may be determined.

At block 244, a notification may be generated based on evaluating the rule. In some examples, such as where the rule is associated with a first state, the notification may be associated with the first state. In some examples, where the rule is associated with one or more data objects, the notification may provide information associated with the data objects identified by evaluating the rule at block 242. In some implementations, evaluation of a rule may not lead to the generation of a notification, and block 244 may be skipped.

At block 246, the GUI is updated based on the evaluation of the rule at block 242 and may additionally be updated to present the notification where a notification is generated at block 244. Block 246 here may perform functionality similar to that described previously in reference to block 222. For example, where the rule defines node colors based on the evaluation of the rule, node colors of the graph displayed by the GUI may be updated to conform to the evaluation of the rule. In another example, where a notification is generated, the GUI may be updated such that the notification comprises a second portion of the GUI separate from the existing GUI. Alternatively, the notification may overlay the existing GUI. In some implementations, a second window may be generated to present the notification, the second window separate from a first window comprising the graph-based visualization of the process. In some implementations, evaluation of a rule may result in a plurality of changes to the GUI and/or notifications being presented to the user.

The example sub-routine 219 of FIGS. 2B-2E are not exclusive of each other, and any individual sub-routine 219 of FIGS. 2B-2E may occur simultaneously with another sub-routine or in any order.

FIG. 2F illustrates an additional or alternative routine 250 for generating and visualizing a multi object process by a dynamic graph-based visualization of the multi object process, for example the multi object graph-based visualizations depicted in FIGS. 14A-14C described in further detail below. This example routine 250 begins at block 252 where a plurality of data objects, for example data objects 160, are received or accessed. For example, the plurality of data objects may be accessed by the graph-based visualization system 150 from another system in communication with the graph-based visualization system 150, and/or accessed from a component of the graph-based visualization system 150 by another component therein. In some implementations, the data objects 160 are determined and/or stored by the graph-based visualization system 150 based on the process information 120 received from the process information aggregator 104. The plurality of data objects may be associated with various real-world objects as described previously herein. Additionally, the graph-based visualization system 150 receives or accesses a set of properties and state information associated with each data object. In some implementations, one or more properties and/or state information for at least one of the data objects may be determined by the graph-based visualization system 150 based on the received process information 120.

At block 254, a plurality of states is determined, for example by the process service 154, based on the state information associated with the data objects received at block 252.

At block 256, a representation of a process is determined as described above in relation to block 202.

At block 258, the graph-based visualization system 150 may determine state information and metrics associated with the plurality of data objects as described above in relation to block 206.

Sub-routine 259 includes block 260. At block 260, a plurality of candidate transitions associated with the process are determined. Sub-routine 259 and block 260 function as described above in relation to sub-routine 207 and block 208 respectively.

At block 262, one or more unexpected transitions associated with the process are determined from among the candidate transitions, for example by a user input. Block 262 here functions as described above in relation to block 210.

At block 264, the remaining candidate transitions are designated as the one or more transitions of the process. Block 264 functions as described above in relation to block 212.

At block 266, a link from a first data object associated with a first state to a second data object associated with a second state is determined. In some implementations, the first data object and the second data object may each be of a different data object type, and each data object type may be associated with a respective set of properties and respective set of state information determined or accessed by the graph-based visualization system 150, for example at block 254. The graph-based visualization system 150 may then determine, based on the respective state information associated with two or more distinct object types and/or linking information associated with the data object types, relationships between the two or more data object types. For example, each of the first data object and the second data object may include a transition to a shared state. In this example, the first data object may transition to the shared state from a state unique to the first data object, and the second data object may transition to the shared state from a state unique to the second data object. The graph-based visualization system 150 may then determine the shared state links the first data object and the second data object, and may use additional information derived from analyzing the transition the first data object and the second data object take to the shared state to provide additional information in the graph-based visualization that would not be determinable from processing the first data object or the second data object alone. The system may then use the properties, state information, and/or data object type for each of the first data object and the second data object to determine a plurality of additional states associated with the first data object and the second data object, transitions between the states associated with each data object, and transitions between states associated with the first data object and states associated with the second data object. In some examples, the second state may not currently be displayed by the GUI and/or may not be part of the graph-based visualization of the multi object process. In some examples, the link may indicate a transition between the first state and the second state.

At block 268, a graph-based visualization is generated, for example by the graph-based visualization system 150. The graph-based visualization, as described previously herein with respect to block 214, represents the determined states as nodes, and transitions between the states as edges of a graph.

Figure 2G:
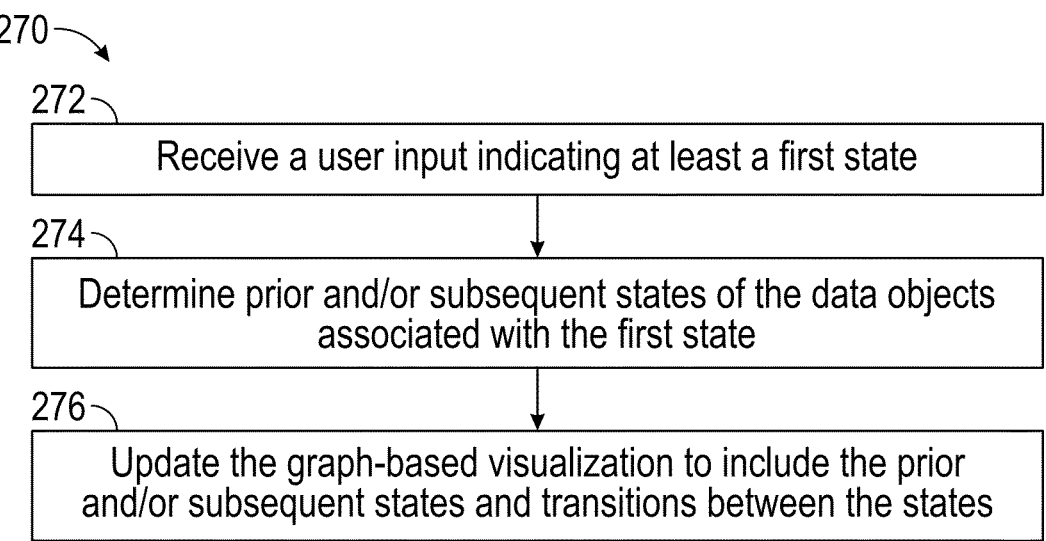

FIG. 2G illustrates an example sub-routine 270 for a graph-based visualization of a multi object process. Sub-routine 270 may, in some implementations, perform functionality similar to that described in reference to sub-routine 219 previously herein. This example sub-routine 270 includes block 272 when a user input indicating at least a first state an initial process is received by the graph-based visualization system 150, where the initial process may be generated, for example, by routine 250. Block 272 here may perform functionality similar to that described previously in reference to block 220. For example, a user input may indicate selection of a first state displayed by a GUI as part of an initial process, where the selection of the first state indicates that the graph-based visualization system 150 is to identify, determine, or access, based on information associated with the first state, a related state connected by a transition to or from the first state. In some implementations, the related state may be associated with a first data object type, where the first data object type is associated with the first state. In some implementations, the related state may be associated with a second data object type different from the first data object type associated with the first state.

At block 274, the graph-based visualization system 150 determines or accesses prior and/or subsequent states of the data objects associated with the first state selected by the user based on one or more of the state information associated with the first state, or information associated with the data objects associated with the selected first state. For example, the graph-based visualization system 150 may access data associated with each data object and/or each data object type associated with the first state to determine a related state connected by a transition to/from the first state. In some embodiments, the first state may be associated with a first data object type and a second data object type, and the second state may be associated with the second data object type. The graph-based visualization system 150 may access state information for the second data object type, and determine that the related state is associated with the second data object type but not the first data object type. The graph-based visualization system may then determine a transition between the related state and the first state based on information associated with data objects of the second data object type. In another example, the graph-based visualization system 150 may determine based on updated process information 120 associated with the first state and the user indication that a related state exists and is not currently displayed as part of the initial process. The graph-based visualization system 150 may then determine, for example, a transition between the related state and the first state based on the updated process information 120.

At block 276, the graph-based visualization presented by the GUI is updated by the graph-based visualization system 150. Block 276 here may perform functionality similar to that described previously in reference to block 222. The graph-based visualization may be updated to include a determined link, for example from block 258 of routine 250, and/or the determined prior and/or subsequent states (e.g., the related state discussed in relation to block 274) of the data objects associated with the selected first state of block 274. Updating the graph-based visualization may, in some implementations, include updating a displayed process to add additional nodes and transitions between the first state and the prior and/or subsequent states based on, for example, connections determined at block 274.

FIG. 3 illustrates an example routine 300 for implementing a graph-based visualization system comprising an LLM (e.g., large language model service 152), for example the graph-based visualizations and related functionality described in reference to FIGS. 15 and 16 below. The routine 300 begins at block 302 when the graph-based visualization system 150 receives a representation of a process. In some implementations, the routine 300 may begin at block 302 when the graph-based visualization system 150 has generated a representation of a process based on received data, for example, process information 120.

At block 304, a plurality of data objects, for example data objects 160 are received or accessed. For example, the plurality of data objects may be accessed by the graph-based visualization system 150 from another system in communication with the graph-based visualization system 150, and/or accessed from a component of the graph-based visualization system 150 by another component therein. In some implementations, the data objects 160 are determined and/or stored by the graph-based visualization system 150 based on the process information 120 received from the process information aggregator 104. The plurality of data objects may be associated with various real-world objects as described previously herein, for example in reference to block 204 of FIG. 2A.

At block 306, state information and metrics associated with the plurality of data objects are determined by the graph-based visualization system 150 as described previously herein with respect to FIG. 2A.

At block 308, the graph-based visualization system 150 receives a user prompt comprising a natural language description of a notional process and applies the user prompt to the large language model service 152.

At block 310, the graph-based visualization system 150 submits state information, metrics, the plurality of data objects, and/or additional information (e.g., process data 162) to the large language model service 152.

At block 312, an output of the large language model service 152 is received by the graph-based visualization system 150. Where the large language model service 152 is a component of the graph-based visualization system 150, the large language model service 152 may make available to other components of the graph-based visualization system 150 the large language model service 152 output. The output of the large language model service 152 may comprise, for example, a notional process, an altered process information, a grouping of states, or any other response the large language model service 152 may provide based on the user input applied to the large language model service 152 at block 308 or block 310. In some embodiments, it may be determined by the graph-based visualization system 150, or a user, that the output of the large language model service 152 is not correct, or otherwise not suitable for use (e.g., the large language model service 152 has failed to provide a complete output, has not provided an output, or has provided an incorrect output). The routine 300 may then return to an earlier block (e.g., block 306, block 308, or block 310) to cause generation of a new output from the large language model service 152. This may occur until the graph-based visualization system 150, or a user, determines that the output of the large language model service 152 is correct, or suitable for use.

At block 314, the graph-based visualization system 150 or a component of the graph-based visualization system 150 parses the output of the large language model service 152. Parsing the output may comprise comparing the output to an existing process and updating one or more state information associated with the existing process. In another example, parsing the output may comprise generating a process based on the output. In another example, parsing the output may comprise assigning one or more states to one or more aggregate states indicated in the output of the large language model service 152, for example as discussed in relation to FIG. 15 in further detail below. In another example, parsing the output may comprise updating one or more states and/or one or more transitions of a process, for example as discussed in relation to FIG. 16 below.

At block 316, a graph-based visualization of a process presented by a GUI to a user of the user system 170 is generated and/or updated, for example the GUIs of FIGS. 15 and 16 described in further detail below. For example, the GUI may be updated to present a graph-based visualization of a process generated based on the output of the LLM. In another example, an existing graph-based representation of a process previously presented by the GUI may be updated based on the output of the LLM.

IV. Additional Example Implementations and Details Related to the System and Computing Environment In an implementation the system (e.g., one or more aspects of the computing environment 100, one or more aspects of the graph-based visualization system 150, and/or the like) may comprise, or be implemented in, a "virtual computing environment". As used herein, the term "virtual computing environment" should be construed broadly to include, for example, computer-readable program instructions executed by one or more processors (e.g., as described in the example of FIG. 4) to implement one or more aspects of the modules and/or functionality described herein. Further, in this implementation, one or more services/modules/engines and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various implementations of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various implementations of the present disclosure. In this regard, each block in the flowchart or block diagrams may represent a service, module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such as application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above implementations may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 4 shows a block diagram that illustrates a computer system (graph-based visualization system 150) upon which various implementations and/or aspects (e.g., one or more aspects of the graph-based visualization system 150, one or more aspects of the computing environment 100, and/or the like) may be implemented, and which may provide various functionality described herein. Multiple such computer systems may be used in various implementations of the present disclosure.

In some implementations, the graph-based visualization system 150 may be implemented using any of a variety of computing devices, such as server computing devices, desktop computing devices, personal computing devices, mobile computing devices, mainframe computing devices, midrange computing devices, host computing devices, or some combination thereof.

In some implementations, the features and services provided by the graph-based visualization system 150 may be implemented as web services consumable via one or more communication networks. In further implementations, the graph-based visualization system 150 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some implementations, as shown, A graph-based visualization system 150 may include: one or more computer processors 402, such as physical central processing units ("CPUs"); one or more network interfaces 404, such as a network interface cards ("NICs"); computer readable storage medium 406, such as a high density disk ("HDDs"), solid state drives ("SSDs"), flash drives, and/or other persistent non-transitory computer readable media; one or more input/output device interfaces 408, such as a display, a speaker, a microphone, a camera, and/or other components configured to allow the input or output of information; a data store 460 comprising a data structure such as a database; and one or more computer-readable memories 410, such as random access memory ("RAM") and/or other volatile non-transitory computer readable media.

The computer-readable memory 410 may include computer program instructions that one or more computer processors 402 execute and/or data that the one or more computer processors 402 use in order to implement one or more implementations. For example, the computer-readable memory 410 can store an operating system 412 to provide general administration of the graph-based visualization system 150. As another example, the computer-readable memory 410 can store a process module 414 which may comprise one or more of the large language model service 152, the process service 154, the object ontology 156, the log data 158, and/or the data objects 160.

The references above to the graph-based visualization system 150 serve as an example only, and some or all of the above-referenced components may be included in any other computing device in communication with the graph-based visualization system 150.

V. Example Ontology Features

Figure 5:
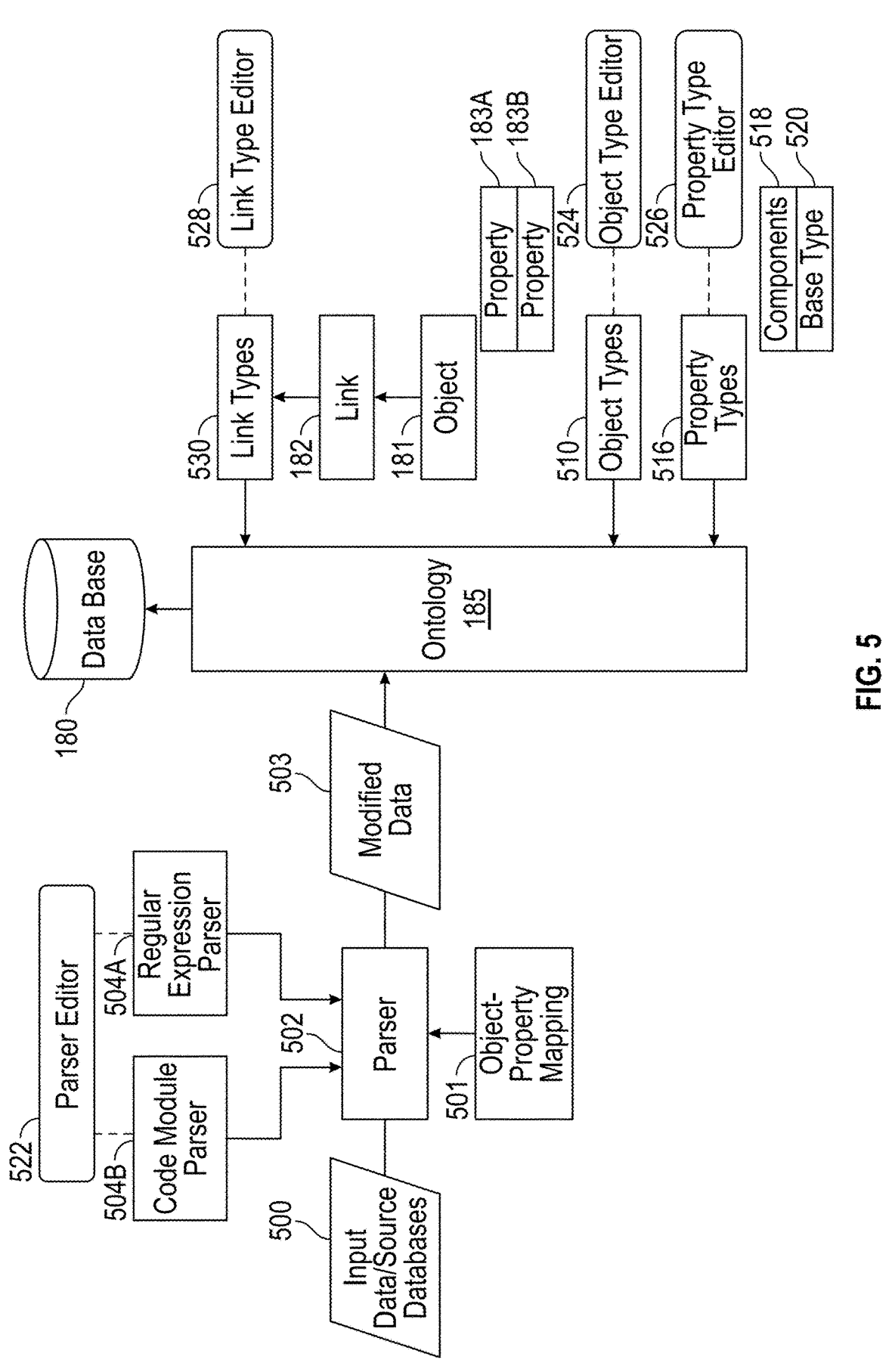
FIG. 5 is a block diagram illustrating example components and data that may be used in identifying and storing data according to an ontology.

FIG. 5 is a block diagram illustrating example components and data of the system 150 and/or other aspects of the computing environment 100 that may be used in identifying and storing data according to an ontology. In this example, the ontology may be configured, and data in the data model populated, by a system of parsers and ontology configuration tools. In the implementation of FIG. 5, input data 500 is provided to parser 502. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 502 is able to read a variety of source input data types and determine which type of data it is reading.

In accordance with the discussion above, the example ontology 185 comprises stored information providing the data model of data stored in database 180, and the ontology is defined by one or more object types 510, one or more property types 516, and one or more link types 530. Based on information determined by the parser 502 or other mapping of source input information to object type, one or more data objects 160 may be instantiated in the database 180 based on respective determined object types 510, and each of the objects 181 has one or more properties 183 that are instantiated based on property types 516. Two data objects 181 may be connected by one or more links 182 that may be instantiated based on link types 530. The property types 516 each may comprise one or more data types 518, such as a string, number, etc. Property types 516 may be instantiated based on a base property type 520. For example, a base property type 520 may be "Locations" and a property type 516 may be "Home."

In an implementation, a user of the system uses an object type editor 524 to create and/or modify the object types 510 and define attributes of the object types. In an implementation, a user of the system uses a property type editor 526 to create and/or modify the property types 516 and define attributes of the property types. In an implementation, a user of the system uses link type editor 528 to create the link types 530. Alternatively, other programs, processes, or programmatic controls may be used to create link types and property types and define attributes, and using editors is not required.

In an implementation, creating a property type 516 using the property type editor 526 involves defining at least one parser definition using a parser editor 522. A parser definition comprises metadata that informs parser 502 how to parse input data 500 to determine whether values in the input data can be assigned to the property type 516 that is associated with the parser definition. In an implementation, each parser definition may comprise a regular expression parser 504A or a code module parser 504B. In other implementations, other kinds of parser definitions may be provided using scripts or other programmatic elements. Once defined, both a regular expression parser 504A and a code module parser 504B can provide input to parser 502 to control parsing of input data 500.

Using the data types defined in the ontology, input data 500 may be parsed by the parser 502 determine which object type 510 should receive data from a record created from the input data, and which property types 516 should be assigned to data from individual field values in the input data. Based on the object-property mapping 501, the parser 502 selects one of the parser definitions that is associated with a property type in the input data. The parser parses an input data field using the selected parser definition, resulting in creating new or modified data 503. The new or modified data 503 is added to the database 180 according to ontology 185 by storing values of the new or modified data in a property of the specified property type. As a result, input data 500 having varying format or syntax can be created in database 180. The ontology 185 may be modified at any time using object type editor 524, property type editor 526, and link type editor 528, or under program control without human use of an editor. Parser editor 522 enables creating multiple parser definitions that can successfully parse input data 500 having varying format or syntax and determine which property types should be used to transform input data 500 into new or modified input data 503.

The properties, objects, and links (e.g., relationships) between the objects can be visualized using a graphical user interface (GUI). For example, FIG. 6 displays a user interface showing a graph representation 603 of relationships (including relationships and/or links 604, 605, 606, 607, 608, 609, 610, 611, 612, and 613) between the data objects (including data objects 621, 622, 623, 624, 625, 626, 627, 628, and 629) that are represented as nodes. In this implementation, the data objects include person objects 621, 622, 623, 624, 625, and 626; a flight object 627; a financial account 628; and a computer object 629. In this example, each person node (associated with person data objects), flight node (associated with flight data objects), financial account node (associated with financial account data objects), and computer node (associated with computer data objects) may have relationships and/or links with any of the other nodes through, for example, other objects such as payment objects.

Figure 6:
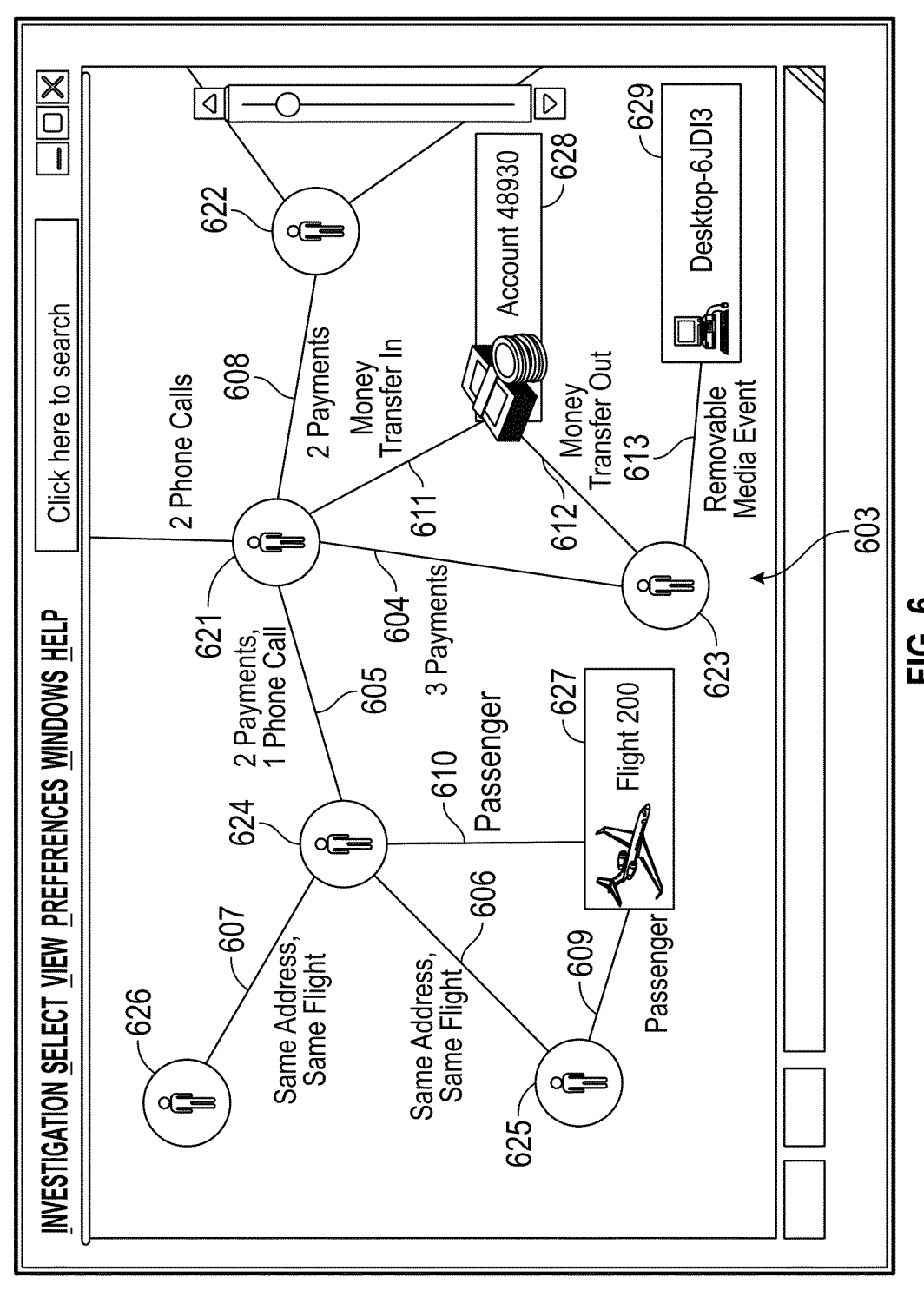
FIG. 6 illustrates an example graph representation of relationships between the data objects that are represented as nodes.

For example, in FIG. 6, relationship 604 is based on a payment associated with the individuals indicated in person data objects 621 and 623. The link 604 represents these shared payments (for example, the individual associated with data object 621 may have paid the individual associated with data object 623 on three occasions). The relationship is further indicated by the common relationship between person data objects 621 and 623 and financial account data object 628. For example, link 611 indicates that person data object 621 transferred money into financial account data object 628, while person data object 623 transferred money out of financial account data object 628. In another example, the relationships between person data objects 624 and 625 and flight data object 627 are indicated by links 606, 609, and 610. In this example, person data objects 624 and 625 have a common address and were passengers on the same flight data object 627. In an implementation, further details related to the relationships between the various objects may be displayed. For example, links 611 and 612 may, in some implementations, indicate the timing of the respective money transfers. In another example, the time of the flight associated with the flight data object 627 may be shown.

Relationships between data objects may be stored as links, or in some implementations, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, the user interface may allow various other manipulations. For example, the objects within database 180 may be searched using a search interface 650 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Advantageously, use of a dynamic ontology may allow a user to take advantage of an ontological data model, while not being constrained to a hard-coded ontology. Hard-coded ontologies can be overly simple (e.g., lacking detailed semantic properties, making classification difficult but limiting analysis) or overly complex (e.g., having overly detailed semantic properties, making classification difficult). Use of a dynamic ontology can allow a user to define the desired level of semantic granularity, making dynamic ontologies suitable for a plurality of different and diverse uses (e.g., fraud prevention, cyber security, governmental applications, capital markets, etc.). Using a data preparing and cleaning system prior to importing data into an ontology-based database system can provides the advantages of the dynamic ontology with the assurance that the data input is consistent, has no or minimal errors, and/or has been preprocessed in accordance with certain data analysis criteria to place the input data in better condition for further analysis.

VI. Further Example Aspects Related to Graph-Based and Object-Based Visualization The system may comprise one or more interactive graphical user interfaces ("GUI") configured to present a graph-based visualization of the process based on a plurality of data objects associated with the process. As described in further detail herein, each data object is associated with related properties and state information. The nodes of the graph-based visualization may be generated based on state information of one or more data objects, where the nodes represent states of the process. The nodes may display information about the states of data objects within the process, derived from information (e.g., properties and/or state information) associated with the data objects. The edges of the graph-based visualization may also be generated based on the state information of the data objects, and may indicate data object transitions between states.

Organizing the data objects into associated nodes (e.g., representing states) and edges (e.g., representing transitions) of a graph has several advantages. Organizing the data objects may, in some implementations, comprise determining respective quantities of data objects associated with each of a plurality of states. For example, information of two or more data objects may be associated based on a shared association with a node representing a state. This association may allow for deeper analysis of factors affecting the functioning of the process being represented, such as by allowing analysis of a process state where various equipment and resources, each represented by different data objects, impacts the process state. In another example, data objects may comprise more detailed information than would be accessible from, for example, log data associated with the process alone. The system may then process this richer data set to generate insights into the functioning of the process which would otherwise not be apparent from analyzing the log information alone.

In another example, a plurality of data objects may be associated with a first state. A first portion of the plurality of data objects may comprise transition information indicating transitions to a second state, and a second portion of the plurality of data objects may comprise transition information indicating transitions to a third state. The system may process this transition information of the plurality of data objects and determine, for example, a frequency of a transition, a likelihood of a transition (e.g., a percent of data objects in the process moving across a transition), an average length of time for a transition, and the like. In some implementations, information associated with a transition may be stored in a transition object. Log information alone, for example, may not contain such additional information, and so a system that only has log information may be unable to determine some useful transition information, such as when a transition is unexpected as discussed in further detail below.

For each data object 181, the system may receive state information associated with the data object and metrics associated with the data object. The state information may contain, for example, information acquired from a variety of sources such as equipment logs, employee logs, maintenance logs, or timekeeping information. Additionally, the state information may include live information associated with an element of the process, where the element is associated with a data object. State information may further include a history of states associated with a data object. Metrics may comprise information about the average cost, average revenue, peak cost, peak revenue, minimum or marginal cost, maximum duration, minimum duration, a number of employees associated with a step, average duration associated with step or transition, and/or the like. In some cases, metrics may be received from one or more of accounting software, equipment management software, a user input, or any other source capable of indicating a value of a metric.

Additionally, the system may analyze state information of multiple data objects to enrich one or more data objects. Enriching a data object associated with a state or transition may include combining state information from multiple data objects related to the same state or transition, for example the time an inventory item is sent from a production element and the time the inventory item is received by a receiving element may be transmitted to the system by each device, and these times may then be used by the system to determine the length of the transition between the sending and receiving steps in the process where no such data exists in the data objects associated with the individual steps or transition. This determined information may then be incorporated, for example, into the data object associated with the transition between steps as state information.

The GUI may present various visualizations of the data of the system, for example the data objects stored in the database, state information of a data object, or the result of analyses performed on the data objects by the system. For example, the GUI may present a series of nodes, where each node may represent an associated state of a process. A node of the example GUI may be any shape (e.g., a square, circle, triangle, etc.). The shape of the node may be associated with a type of equipment, a type of information associated with the display block, a type of process, a state of a data object, or may be consistent across the GUI. The size or shape of the node may indicate additional information about the state represented by the node, for example the size may be associated with a number of data objects associated with the state represented by the node.

Edges connecting the nodes, representing transitions between states, may also be displayed on the GUI. The edges may comprise dashed lines, solid lines, curved lines, straight lines, lines of varying thicknesses, lines of varying colors, or any other indication of a connection between two display blocks to represent information about the transition associated with the edge. For example, the thickness of an edge may represent the proportion of data objects transitioning between nodes connected by the edge (e.g., an edge representing 80% of transitions out of a first state is thicker than an edge representing 20% of transitions out of the first state). In another example, solid lines may be used to represent expected transitions between states, and dashed or dotted lines may represent unexpected transitions between states. The displayed edges may indicate additional information, for example, that the connection represents an expected transition, an unexpected transition, a percentage likelihood of a transition, a value or cost associated with a transition, a length of time associated with a transition, a probability of a transition, a number of data objects that traverse the transition. Such information may be shown visually in various ways, including with numbers, edge thicknesses, and/or the like. In some implementations, a verb may be associated with a transition, and/or a transition may indicate data object types associated by or linked via the transition. For example, an edge connecting a first state associated with preparing an item for shipping and a second state associated with receiving a shipped item may be assigned the verb "shipping," or an edge connecting a first state associated with an "order" data object and a second state associated with an "invoice" data object that is linked to the "order" data object, may indicate "order to invoice."

As noted above, a transition may be represented by a connection (e.g., an edge of the graph) between process states (e.g., nodes of the graph) displayed in the GUI. Information associated with a transition may be contained in one or more data objects associated with a step of the process, for example the log data associated with a data object may comprise information about the transitions the data object makes through the process. Alternatively, information associated with a transition may comprise a separate data object. The information associated with the transition may, for example, come from the data object representing the initiation of the transition and the data object representing the end of the transition. Multiple data objects may represent the same or related transitions. For example, one data object may contain information associated with the most likely transition from an output of a first step in the process, and a second data object may represent the least likely transition from the output of the first step in the process. Alternatively, a single data object may be used to represent every transition from the output of the first step and the probability of each transition. There may be a plurality of transitions from the first step and each of the plurality of transitions may terminate as the input to each of an associated plurality of subsequent steps.

Figure 7A:
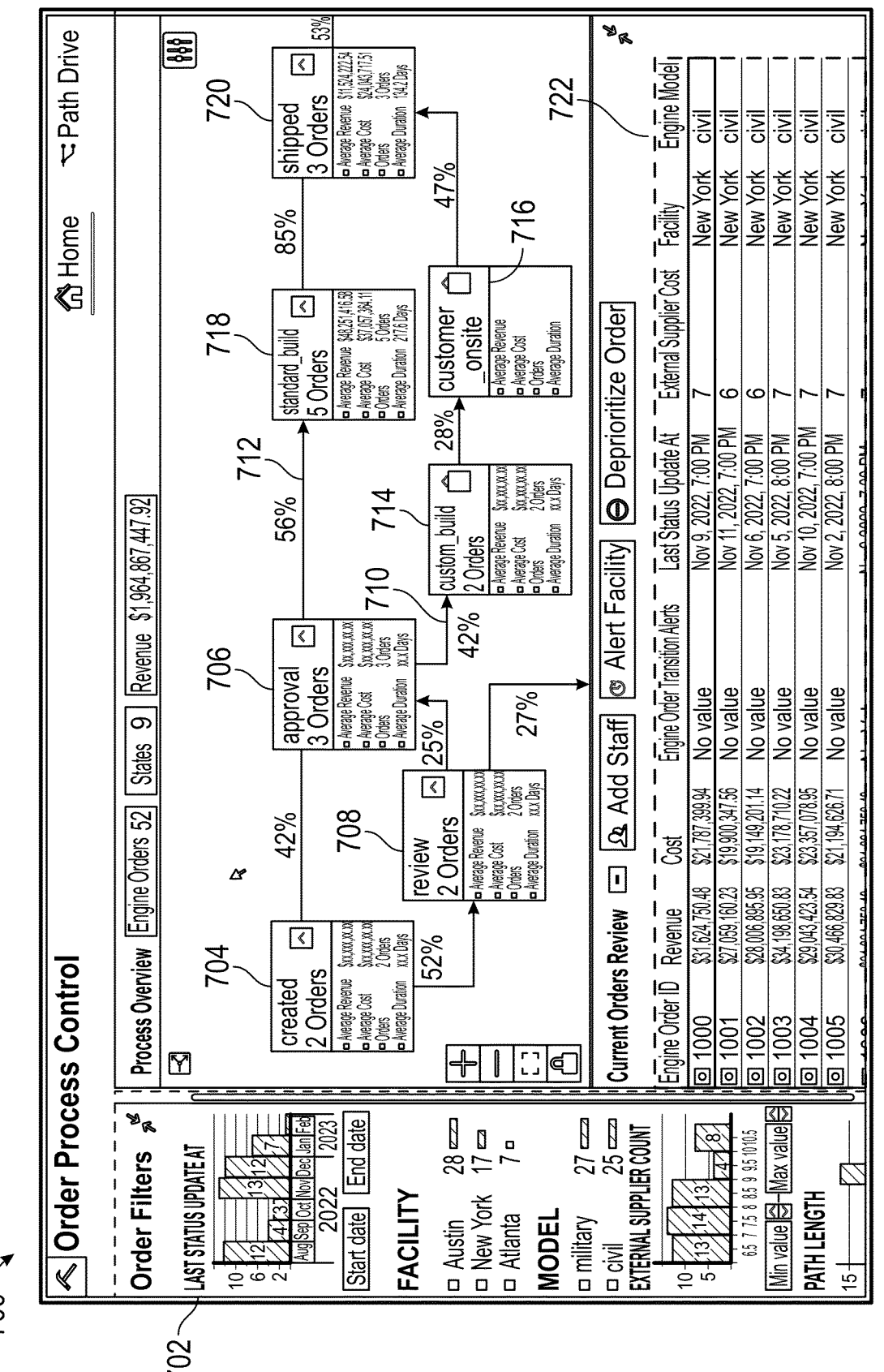
FIGS. 7A-7C depict example user interfaces for requesting and displaying detailed views of a graph-based process visualization.
Figure 7B:
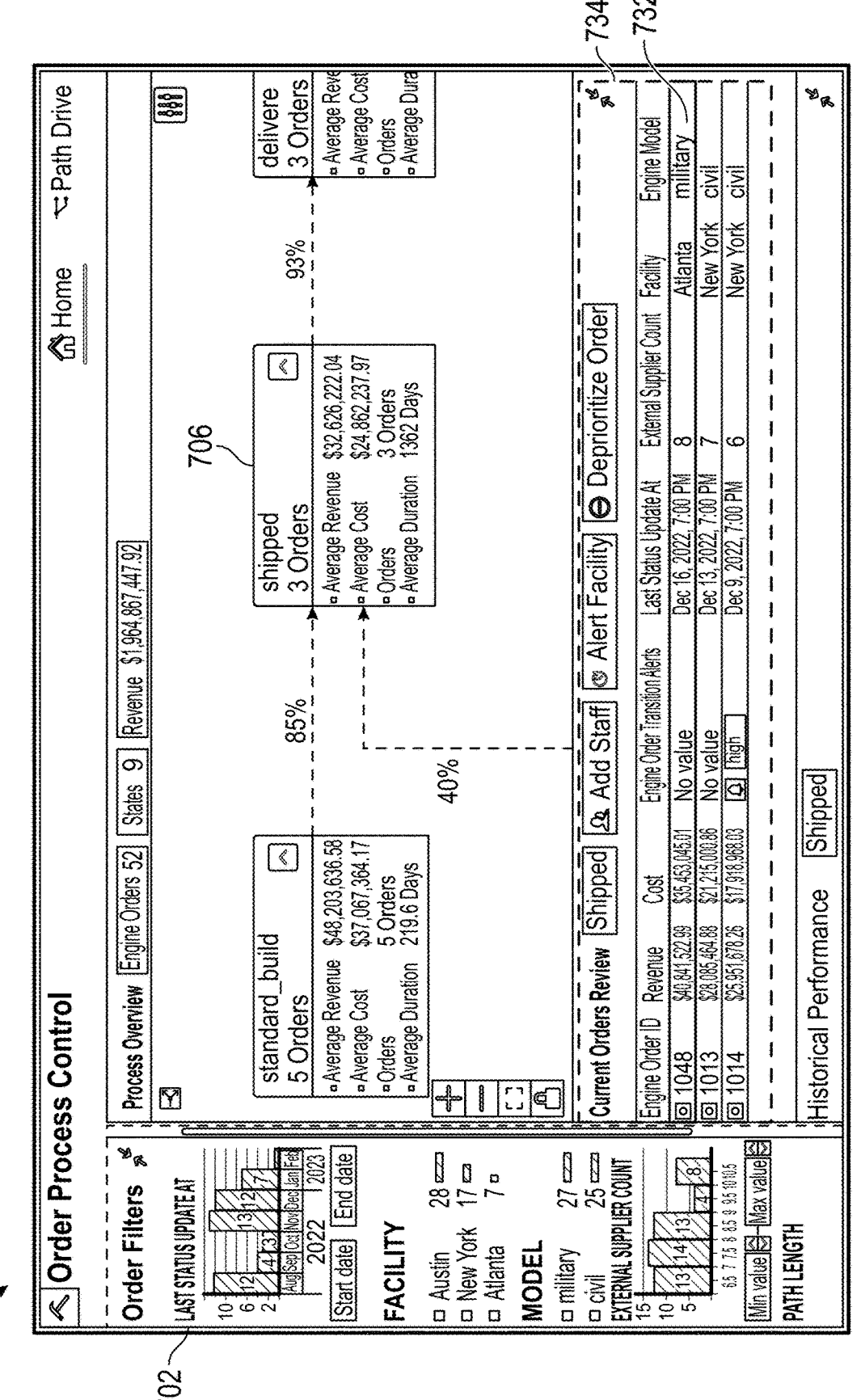
Figure 7C:
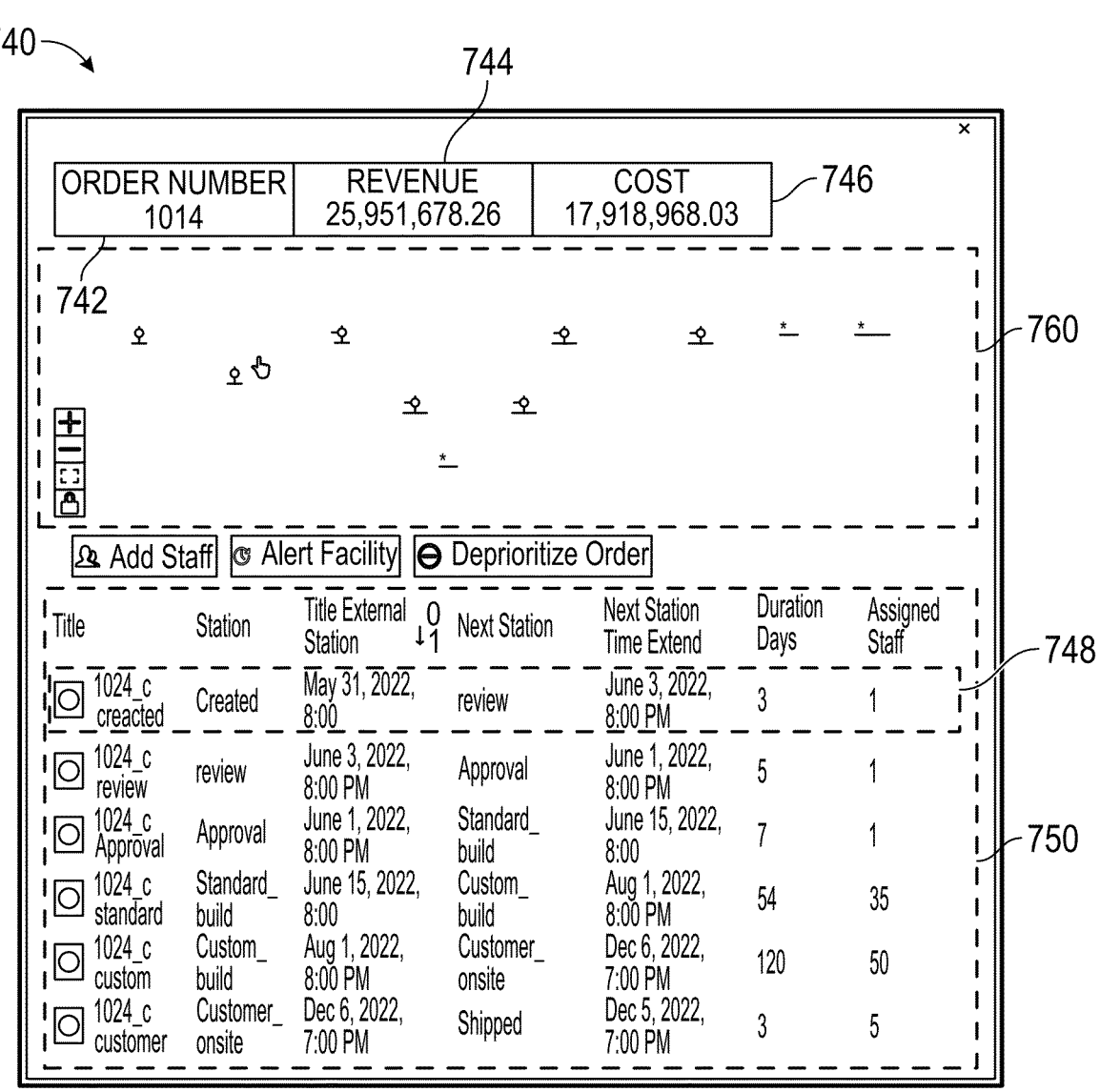

FIGS. 7A-7C illustrate example interactive GUIs including a graph-based visualizations of processes, generated, at least in part, based on a plurality of data objects and associated properties and state information, and the response of the GUI to a set of user interactions.

After the system has organized data objects into associated states and transitions, various information about the states and transitions may be displayed through the GUI. Additionally, metrics may be generated by the system for the states and transitions. Metrics generally comprise information which may be used to determine the functioning of a process. Metrics may include, for example, maximum duration, minimum duration, average revenue, average cost, average duration, and/or the like. The metrics, once determined, may be presented through the GUI, e.g., associated with each of the states of the process. As discussed above, the system may comprise one or more interactive GUIs configured to display information about some, or all of the data objects associated with the process.

FIG. 7A illustrates an example GUI 700 for presenting a graph-based visualization of a process to a user, for example by a display in communication with the user system 170. In some implementations, the GUI 700 may comprise some or all of a filter portion 702 providing information associated with the process data 162, for example the time a last updated process information 120 was received by the graph-based visualization system 150; a process overview comprising the graph-based representation of the process including a first node 704 representing a first state of the process, a plurality of subsequent nodes 708, node 706, node 714, node 716, node 718 each node associated with a state of the process, and terminal node 720 associated with a terminal state of the process, and a plurality of edges such as edge 712 and edge 710 associated with transitions between the states of the process; and a process object portion 722 where various information items associated with the data objects of the process may be displayed, for example a list of orders where the object type is orders. The plurality of nodes may display information about the state associated with each respective node. In the present example of FIG. 7A, where the object type is "Order" node 704 may be associated with the state of the process where orders are created. The node 704 in this example may then display various metrics associated with the creation of order, for example the number of orders currently in the created state, the expected revenue of such orders in the created state, and metrics as described previously herein. Edges of the GUI 700 associated with the transitions of the process, for example edge 712 may indicate, as discussed previously herein, a percentage of data objects associated with the transition, an unexpected status of a transition, or other transition information overlaid on the edge or displayed by an adjustment of the visual presentation of the edge (e.g., a thickness of the edge, a color of the edge, a line style of the edge, etc.). As discussed in relation to FIGS. 2A-2E, a user may provide input to the GUI 700 and the view presented by the GUI 700 may adjust in response to the user input.

The GUI 700 may be interactive and/or adjustable by a user of the system, and the system may receive such requests for adjustment as user interaction data. For example, the system may receive a user interaction data 130 representing a user selecting a node (e.g., node 706) of the GUI 700 to indicate a request to display additional or alternative information. As shown in FIG. 7B, the filter portion 702 and/or the process object portion 722 may update in response to the received user interaction data 130 to provide information relevant to the user input. In another example, the system may receive a user interaction data 130 indicating a click on an edge of the graph (e.g., edge 710) to indicate a request for additional or alternative information. In some examples, the system may receive a user interaction data 130 based on an interaction between the user of the user system 170 and the GUI 700. The user interaction data may indicate, for example, a request to update an existing process, generate a new process, or update a portion of the process (e.g., a first state, a second state, and a transition between the first and second states) by, for example, interacting with one or more nodes or data objects. The system may generate new log data based in part on the data objects associated with the user interaction and the user interaction data. In some cases, a user may interact with the GUI 700 without indicating an adjustment or change to the information, such as by zooming in, adjusting a size of a display block, moving a display block, zooming out, or clicking on a display block to highlight the block. The system may receive such an interaction and adjust the GUI 700 display according to the user interaction as described in relation to FIGS. 2A-2E.

In some examples, the graph-based visualization system 150 may receive a user interaction data 130 indicating a user request to enter a detailed view, or altered display, of data objects associated with a state (e.g., node 706 associated with the "Shipped" state). In response to the graph-based visualization system 150 receiving such a request for a detailed view of a state, the graph-based visualization system 150 may cause the GUI 700 to be updated to a detailed view display, may cause the GUI 700 to be updated as illustrated by second GUI 730 presenting the detailed view, and/or the second GUI 730 presenting the detailed view may be overlaid on some or all of the GUI 700. In some implementations, the detailed view may be presented as a pop-up window separate from the GUI 700. As illustrated in FIG. 7B, the detailed view may present a listing of data objects in the process object portion 734 associated with the selected state, including detailed information associated with each of the data objects. In an example, the detailed information may include alerts indicating, e.g., that a data object has traversed an unexpected transition.

In some examples, such as that shown in FIG. 7C, the graph-based visualization system 150 may receive a user interaction data 130 indicating a user request to enter a detailed view, or altered display, of a data object associated with the previously selected state, such as by selecting data object 732 from the process object portion 734. In response to the graph-based visualization system 150 receiving such a request for a detailed view of a state, the graph-based visualization system 150 may cause the GUI 700 and/or the second GUI 730 to be updated to a detailed view display, may cause the GUI 700 and/or second GUI 730 to be replaced by a third GUI 740 presenting the detailed view, or the third GUI 740 presenting the detailed view may be overlaid on some or all of the GUI 700 and/or the second GUI 730. The detailed view may present a listing of states 750 of the process associated with the data object indicating, for example, a time the data object entered and/or exited a state, the next state the data object moved to, the personnel associated with the data object in the state, a title of the data object, and other information of the graph-based visualization system 150 associated with the selected data object 732. The detailed view may additionally present detailed information (e.g., first information item 742, second information item 744, and third information item 746) associated with the selected data object 732. The third GUI 740 may, in some examples, display a simplified process view 760 indicating the movement of the selected data object 732 through the process. The simplified process view 760 may, in additional examples, be a miniature version of a process view (e.g., the process represented by the nodes and edges 704-720 of the GUI 700) including states associated with the user request in the user interaction data 130 received by the graph-based visualization system 150.

Figure 8A:
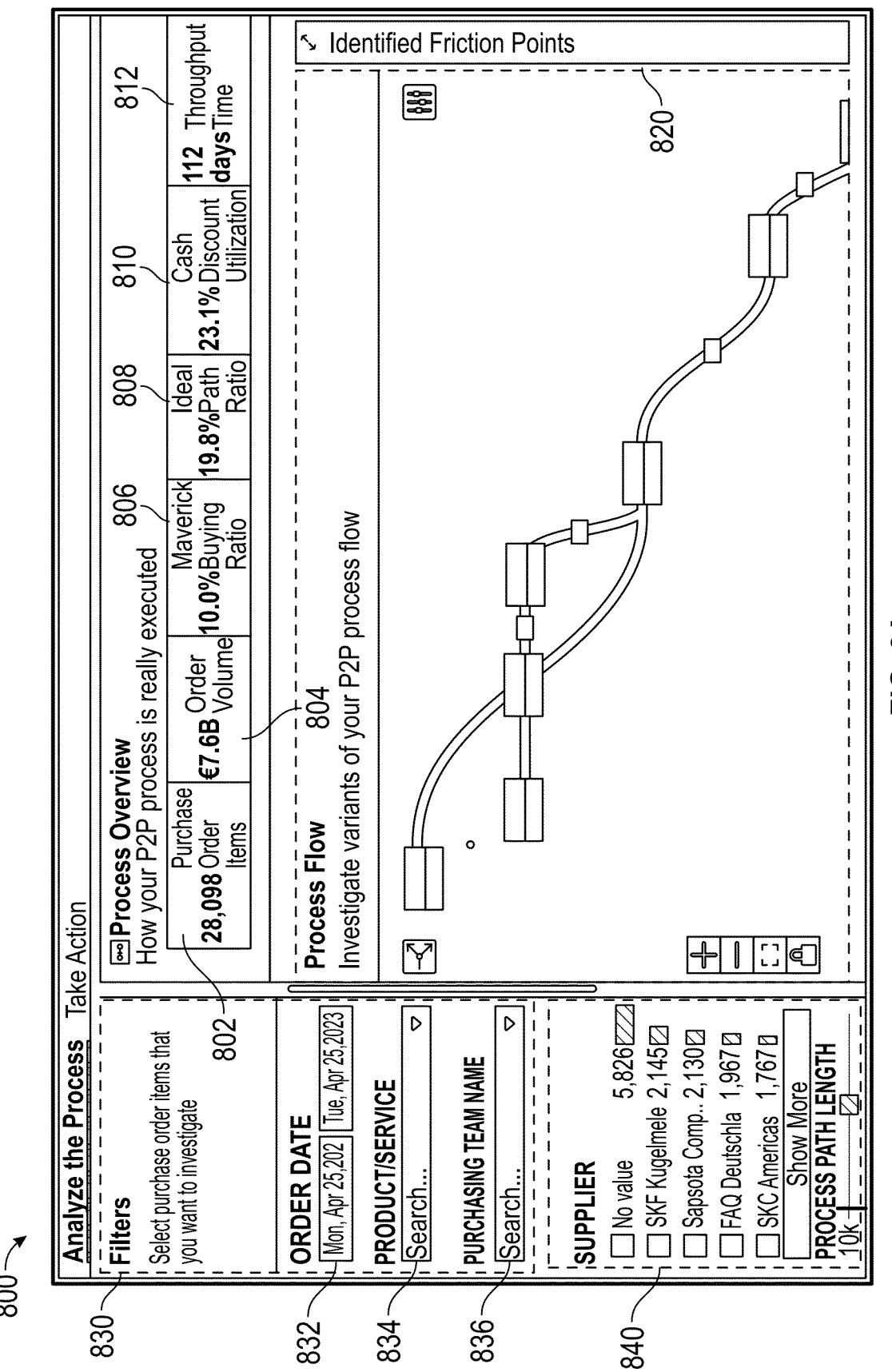
FIGS. 8A-8B depict example user interfaces for filtering a view of a graph-based process visualization.
Figure 8B:
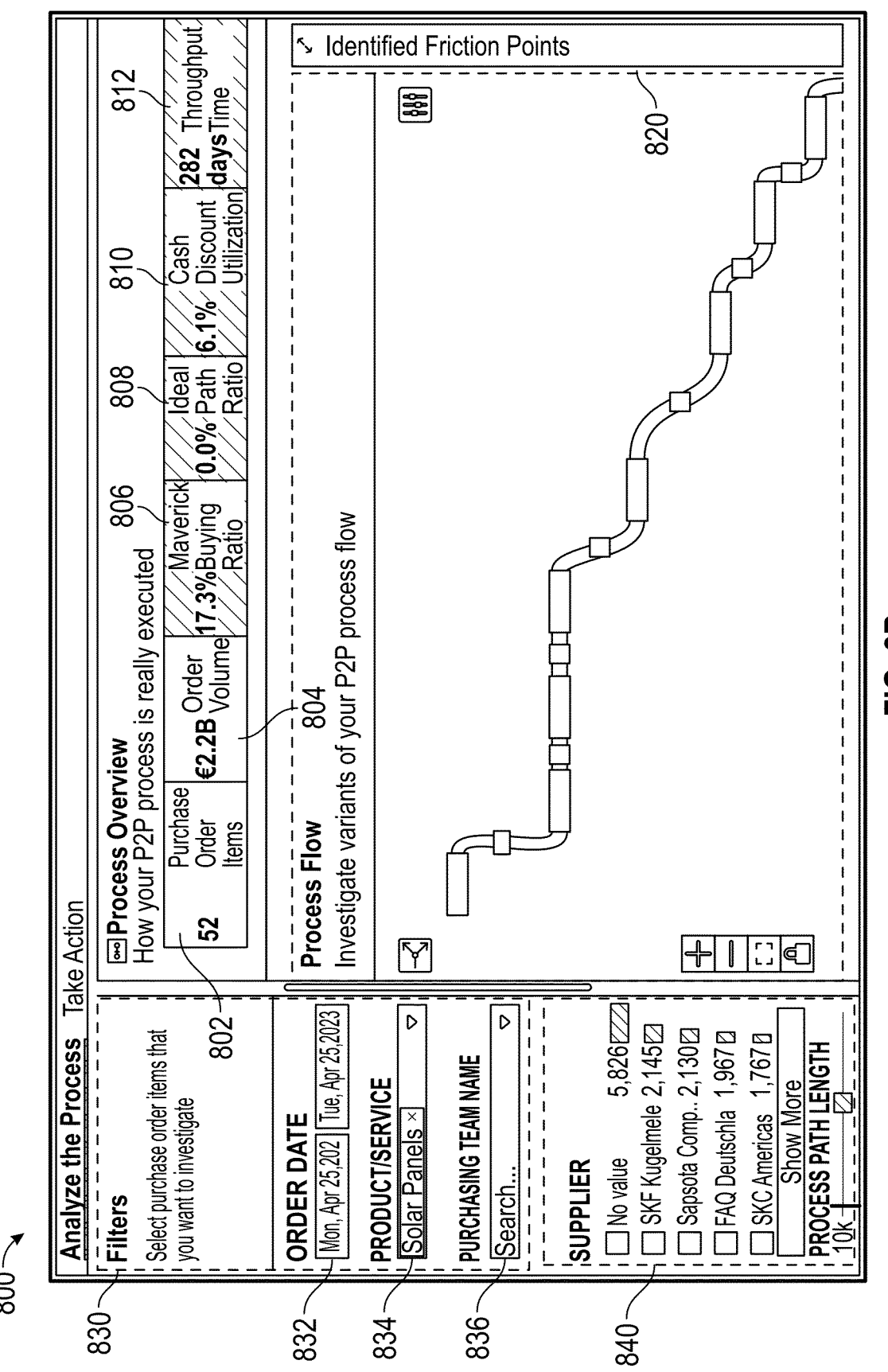

FIGS. 8A-8B illustrate example interactive GUIs 800 including graph-based visualizations of processes. As shown, the process may be represented by nodes representing states, and edges representing transitions of data objects between states. A plurality of metrics, calculated based on data objects associated with the various states, may be determined and displayed with an associated node. Additionally, overall metrics associated with the process (e.g., all of the states and/or all of the data objects of the process) may be determined and displayed for example first metric 802, second metric 804, third metric 806, fourth metric 808, fifth metric 810, sixth metric 812, or any number of additional metrics. Additionally, due to the object-based nature of the system, the data objects used for generating the graph-based visualization advantageously may be filtered based on various criteria, including data object type. The interactive GUI 800 may present to the user a set of user adjustable filters 830. For example, a date filter 832, a data object type 834, a data object element 836, and/or a plurality of filter options 840 associated with an information associated with the plurality of data objects of the process.

When data objects are filtered, the system can re-determine the graph-based visualization, the state-specific metrics, and/or the overall metrics, based on the filtered set of data object. FIG. 8B is an example interactive GUI 800 including such a filtering of data objects based on a data object type 834 (e.g., "solar panels") selected from the GUI 800 of FIG. 8A. Various aspects of the interactive GUI 800 may be updated, for example first metric 802, the second metric 804, the third metric 806, the fourth metric 808, the fifth metric 810, and/or the sixth metric 812. Each of these metric displays may be updated individually or as a group. The process 820 may also be updated to display a version of the process associated with the selected data object type 834. The system can thus, advantageously, identify areas for process improvement associated with particular data object types that would otherwise not be visible when considering all data objects of a process together.

VII. Further Example Aspects Related to Unexpected Transitions and Transition/Node Display Thresholds As discussed previously herein, in some cases an unexpected transition in the process may occur. The system may process information associated with one or more states and the one or more transitions associated with each state to identify all transitions occurring with the process. In some implementations, the system may first identify a transition as a candidate transition. A candidate transition may then be determined automatically by the system to be, for example, an expected transition, an undesirable transition, or an unexpected transition. In some cases, an undesirable transition may be the same as an unexpected transition. In some implementations, the system may request, or may otherwise receive, user input information indicating a candidate transition is an unexpected transition. In some implementations, the system may request a user identify all unexpected or undesirable transitions from the candidate transitions, and the remainder of the transitions may be designated as expected transitions. Additionally, when the system has identified the transitions of the process, the system may then recommend transitions to a user, such as when one of a plurality of transitions is a most efficient transition for the process.

Figure 9:
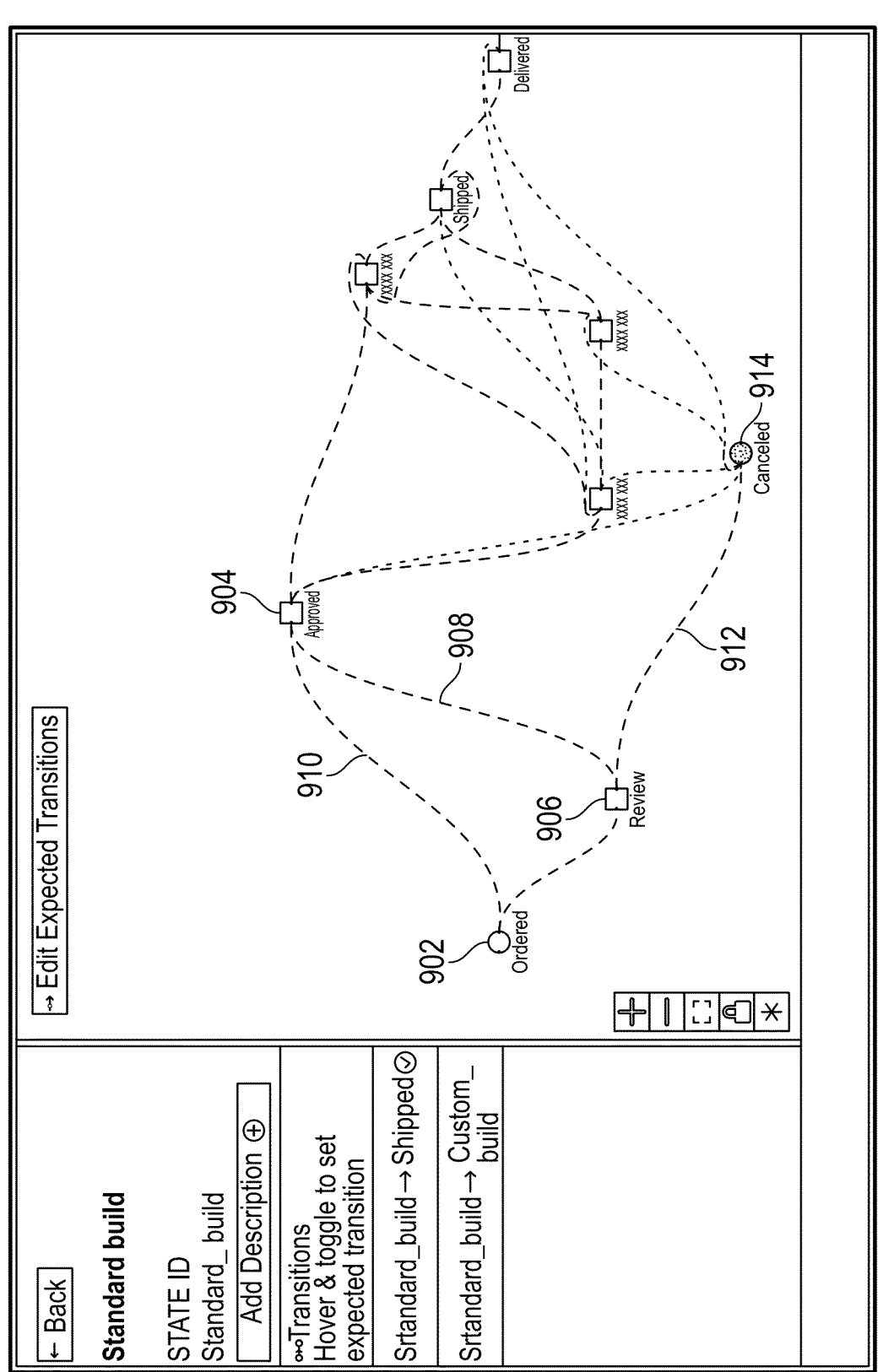
FIG. 9 depicts an example user interface for identifying unexpected transitions.

FIG. 9 illustrates an example interactive GUI 900 in which a user may input selections of unexpected transitions for an initial determined set of states and candidate transitions as described with relation to FIG. 2A. The interactive GUI 900 presents a set of nodes, first node 902, second node 904, third node 906, and fourth node 914 among other nodes. The interactive GUI 900 additionally presents edges representing transitions between the states associated with the set of nodes, for example first edge 910, second edge 908, and third edge 912. The user may then select from among the edges a number of edges associated with unexpected transitions. For example, the user may select via the user system 170 the third edge 912 as an unexpected transition between third node 906 and fourth node 914. The system may then determine that second edge 908 and for example first edge 910 are expected transitions.

In some implementations, the system may receive a user input information associated with a user request to view detailed information associated with an unexpected transition. In response to the user request to view detailed information of the unexpected transition, the GUI may be updated to display the portion of the unexpected transition. Such detailed information may include, for example, an absolute number of data objects associated with the unexpected transition, an average time a data object takes to move from an initial state of the unexpected transition to a final state of the unexpected transition, a percentage of total data objects associated with the unexpected transition, information indicating a cause of a data object becoming associated with the unexpected transition, and the like.

In some implementations, the system may receive a user interaction data, based on a user interaction with the GUI 1000, indicating a request to view some but not all of the possible transitions in the process. For example, the user interaction data may comprise a request to set a threshold for displaying transitions on the GUI 1000, such as transitions which occur over 10% of the time the process occurs. Thresholds may be used, for example, to hide less frequent or unexpected transitions to provide a simplified, or more readable, view of the process to a user. Thresholds for displaying transitions may be based on any metric associated with a transition, for example the total number of data objects associated with the transition, a length of time of a transition, a termination of the process following the transition, etc. In another example, the user interaction data may comprise a request to only view expected transitions. In some implementations, the system may generate an alert that an unexpected transition occurs between two or more process states. The alert may be presented to the user by an update to the GUI 1000, or by a notification separate from the GUI 1000.

Figure 10:
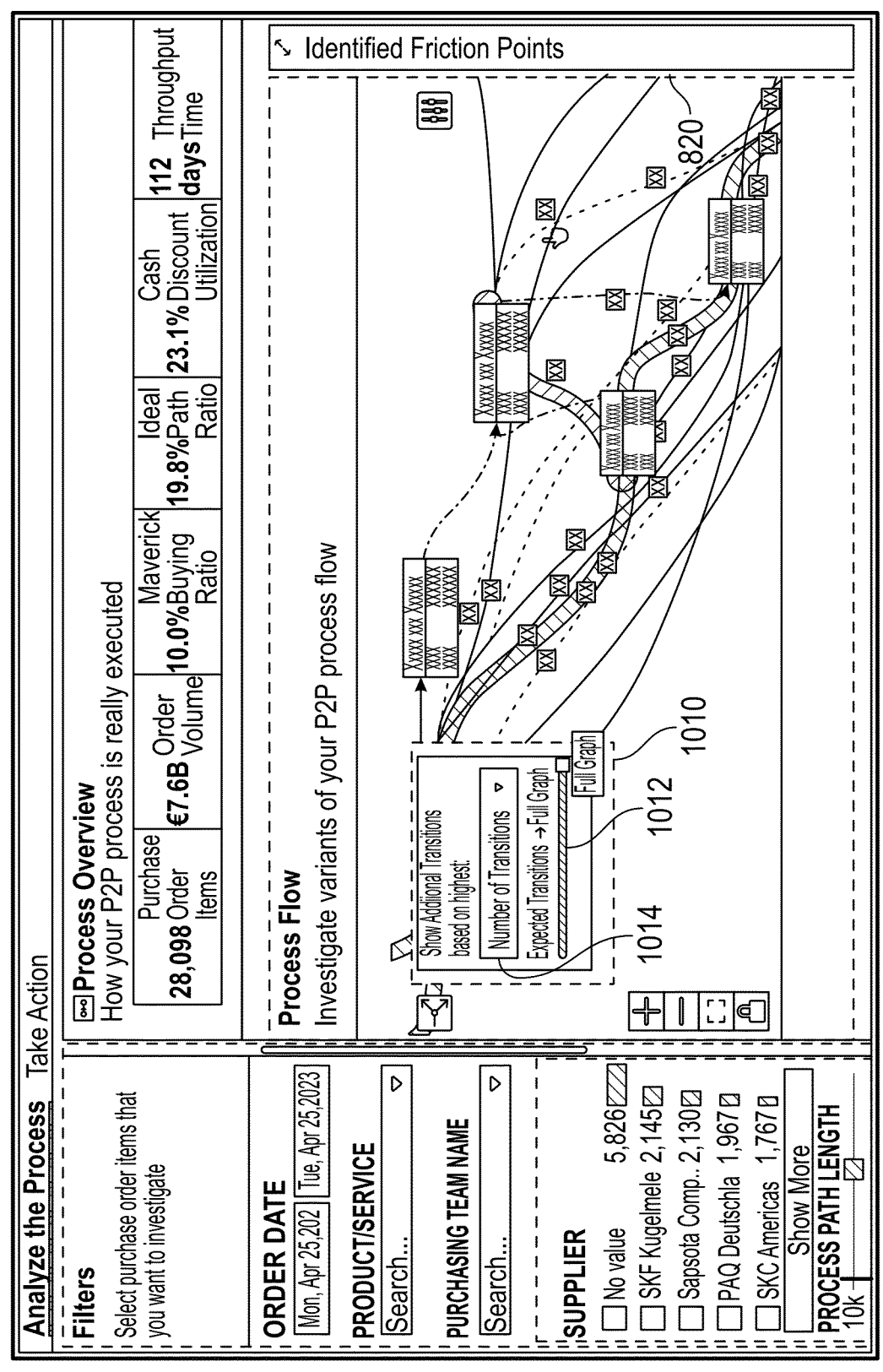
FIG. 10 depicts an example user interface for filtering the displayed transitions.

FIG. 10 illustrates an example interactive GUI 1000 including a graph-based visualization of a process in which a user has adjusted a threshold for displaying transitions. In some implementations, the user may adjust the threshold by interacting with elements inside a transition view selection box 1010. In the implementation shown here, the slide 1012 can be adjusted from showing only expected transitions with high probabilities of data object transitions, to showing all expected transitions, to additionally showing some or all unexpected transitions (e.g., "full graph"). As shown, unexpected transitions can be shown using a different coloring or other distinctive indication such that they may be easily identified by the user. As shown, the user can also indicate a thresholding criterion 1014, such as "number of transitions", "transition percentage", and/or the like, that can then be used when setting a threshold amount.

VIII. Further Example Aspects Related to Custom Expectations and Rules

In some implementations, the system may allow a user to input custom expectations, or rules, for the GUI. In some implementations, rules may be based on metrics associated with data objects. For example, a user interaction data received by the system from the GUI may indicate a user has defined a rule for the color of nodes displayed in the graph view. In this example, a user may be presented with a window embedded in the GUI into which custom expectations may be entered. The user may then enter a custom expectation that, for example, process states which require over five hours to complete should be colored red, and process states which require five or less hours to complete should be colored green. The system may receive this custom expectation as user input information and based on an evaluation of the custom expectation update the GUI such that process states (e.g., nodes of the graph) are colored according to the custom expectation. In some implementations, the custom expectation may indicate a situation in which an alert should be presented to the user by the system, such as by displaying an alert in the GUI. The system may evaluate the custom expectation at automatically determined, or user defined, intervals and generate a notification based on the evaluation of the custom expectation.

In some implementations, a rule may be associated with a data object and/or a data object type, e.g., in the object ontology. The system may then evaluate the rule associated with the data object (or data objects of the data object type), and a state change may be triggered (e.g., and added to the data object(s)) based on the rule. In response to the state change triggered by the rule, the state information associated with the first data object may be updated by the system. In some implementations, a rule may be received by the system as user input information. The rule may then be applied to one or more states or transitions of the process. The system may generate a notification, based on the evaluation of the rule, where the notification is associated with the first state.

Figure 11A:
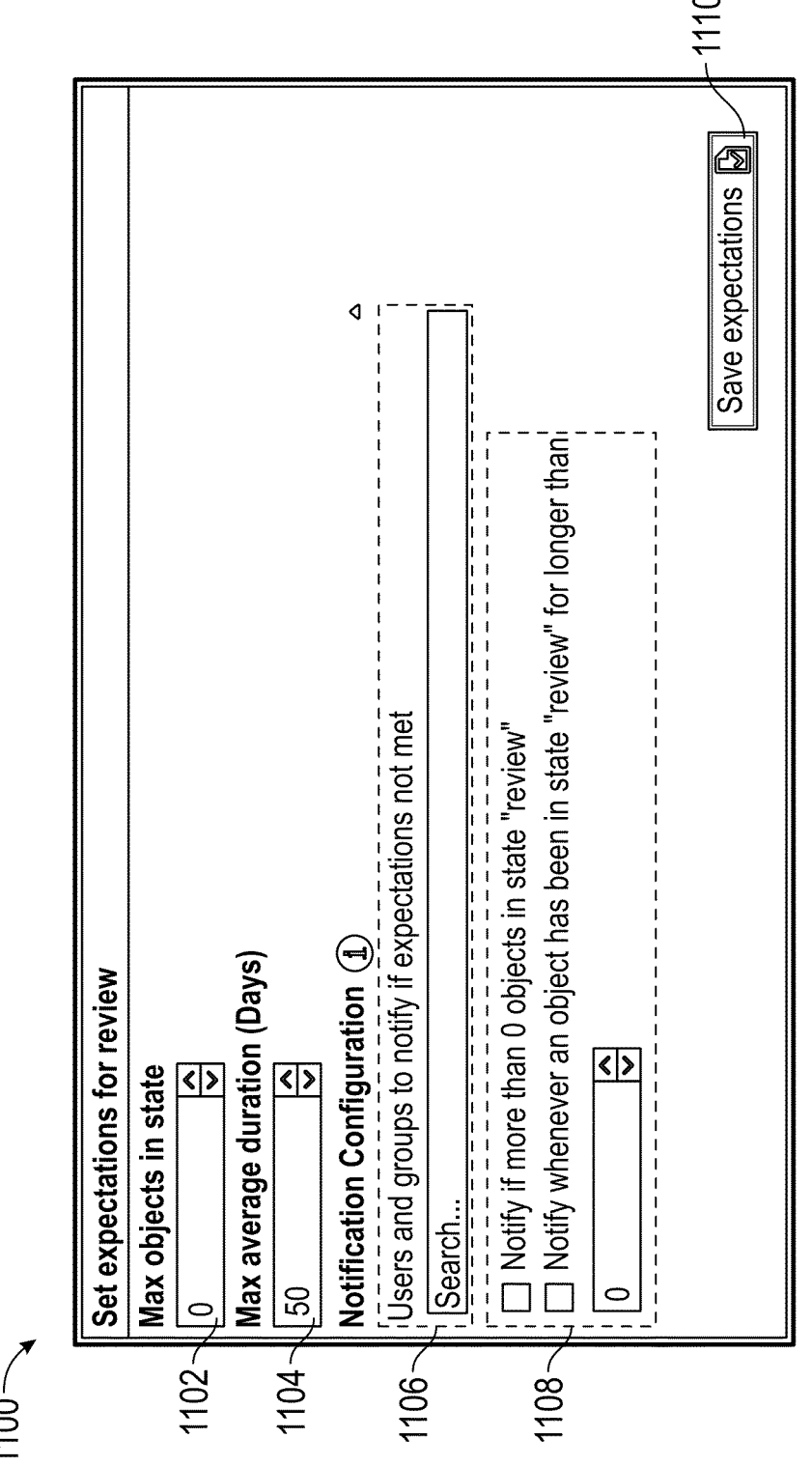
FIG. 11A-11C depict example user interfaces for setting a custom expectation or rule.
Figure 11B:
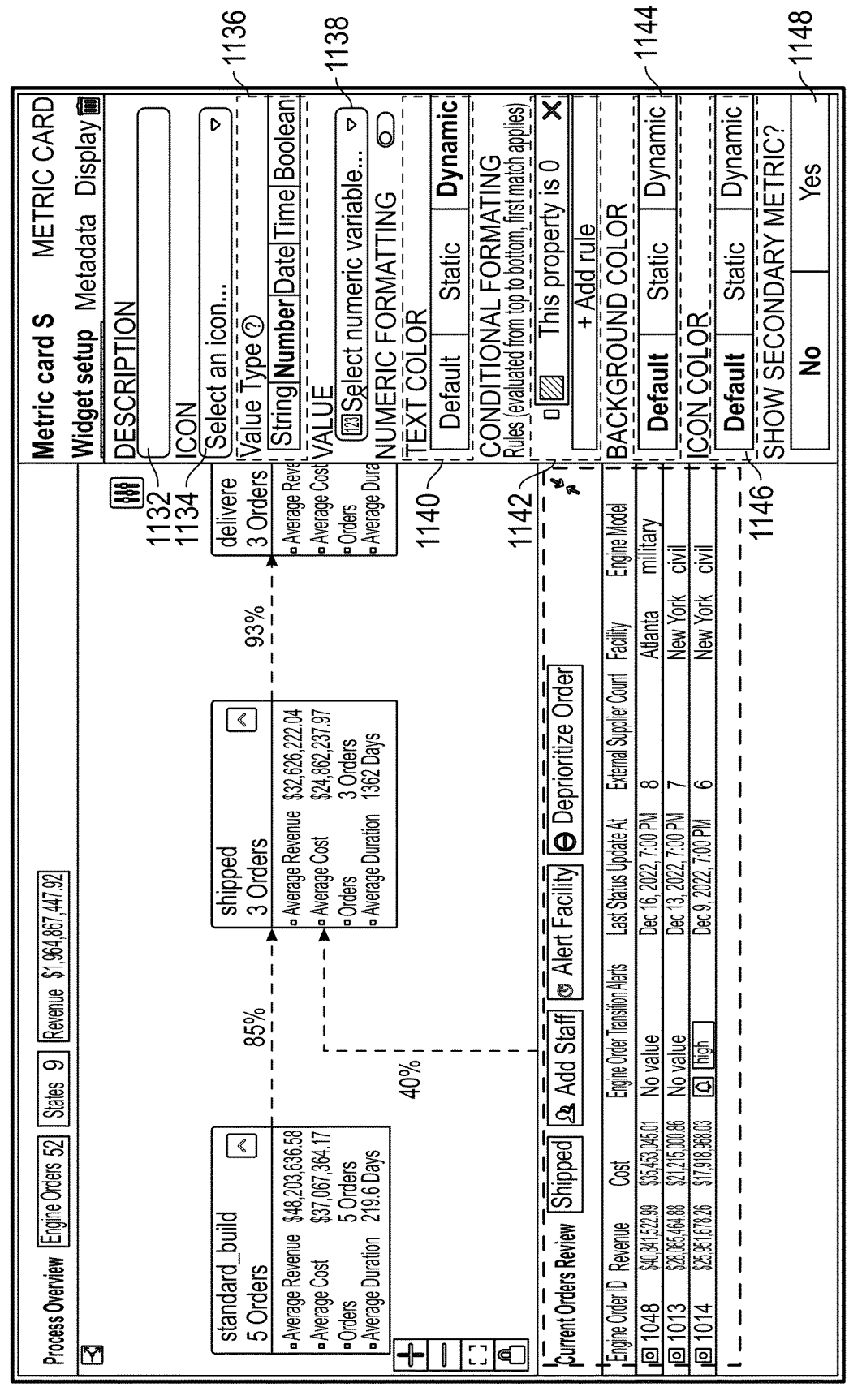
Figure 11C:
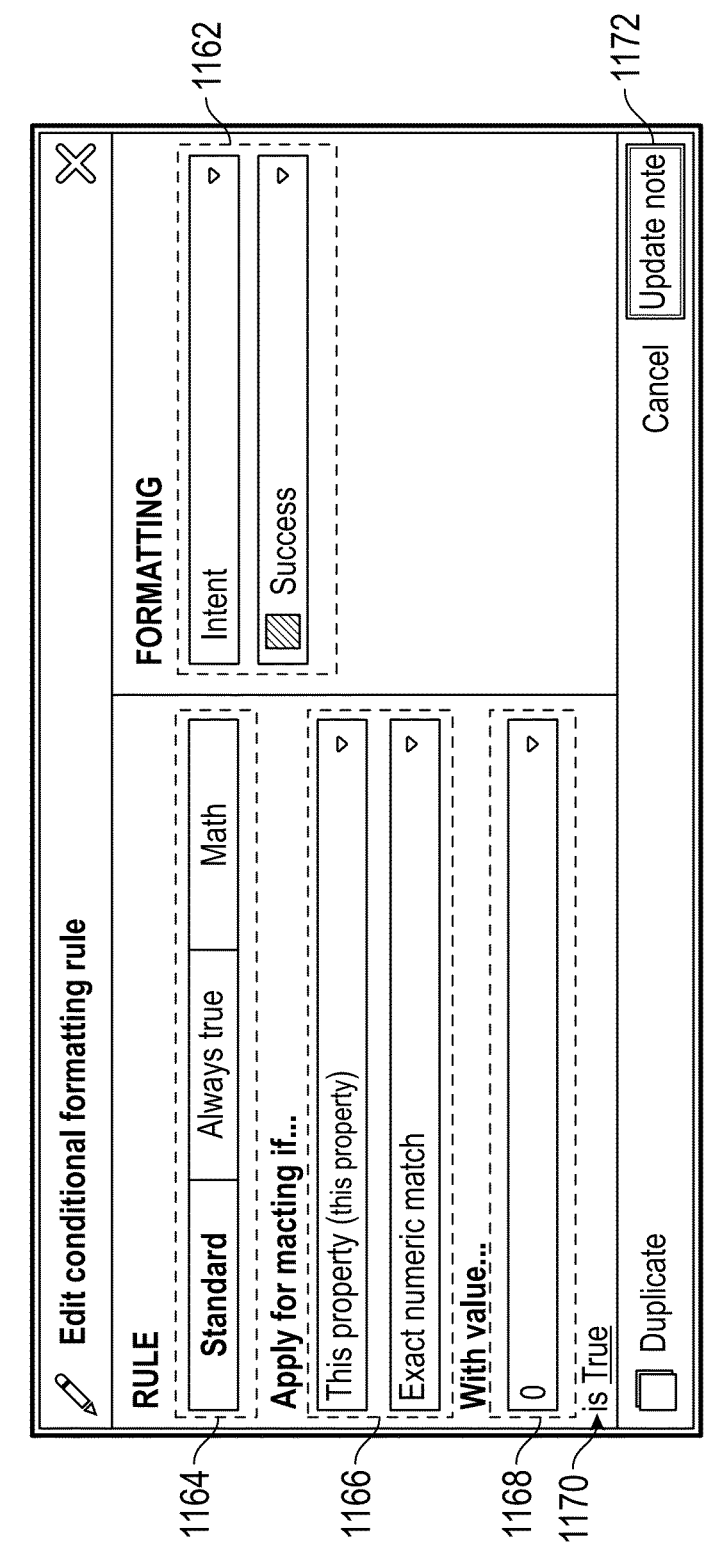

FIGS. 11A-11C illustrate example interactive GUIs in which a user may define one or more rules for setting custom expectations, metrics to be evaluated by the graph-based visualization system, and/or alerts for one or more states. In some embodiments, the system may receive a user interaction defining of the one or more rules, the metrics, and/or the alerts and adjust the interactive GUIs according to the user interaction as described in relation to FIG. 2E previously herein.

FIG. 11A illustrates an example interactive GUI 1100 for setting a rule of the graph-based visualization system 150 to be applied to a process. For example, a maximum number of objects 1102, or an average duration of a state 1104 may be set by the user. Additionally, the user may indicate one or more users in a user selection box 1106 to be alerted if an expectation defined by a rule is not met. In the present example GUI 1100, additional criteria 1108 may be set for when users should be notified, for example when no data objects are in a selected state, or when a data object is in a state for longer than a defined period of time.

FIG. 11B illustrates an example interactive GUI 1130 where a metric definition window is provided as a portion of the interactive GUI 1130. The user may be presented with various options to define a custom metric to be evaluated by the graph-based visualization system 150. The user may be allowed to name the metric by providing a description 1132 and/or an icon associated with the metric using icon selection list 1134. A value type of the metric to be evaluated may be defined from a selection of value types 1136. A list of values 1138 may, in some implementations, be presented to the user based on the selected value type from the list of value types 1136. Additional display elements associated with the custom metric may also be defined by the user, for example a text color change based on a user indication provided by interaction with the text color type selection area 1140. For example, a conditional formatting rule may be associated with the metric, defining different formatting selections based on the value of the metric. The conditional formatting rule may, in some implementations, be defined in a separate GUI 1160 displayed in response to a user interacting with the add rule portion 1142 of the interactive GUI 1130, as discussed below in relation to FIG. 11C. The user may in some implementations select a background color of the metric from a background color list 1144. The background color may be a default background color, a static color defined by the user, or a dynamic set of colors defined by the graph-based visualization system 150 or the user. The user may in some implementations select an icon color of the metric from an icon color list 1146. The icon color may be a default icon color, a static color defined by the user, or a dynamic set of colors defined by the graph-based visualization system 150 or the user. In some implementations, a user may select whether to show a secondary metric from a secondary metric selection 1148.

FIG. 11C illustrates an example GUI 1160 for setting a conditional formatting rule associated with a user-defined metric, for example a metric defined by a user using interactive GUI 1130. The user may select a rule option from a rule option list 1154, for example whether the formatting rule is standard, always trye, or based on a mathematical operation. The user may additionally define when to apply formatting using formatting application selections 1156. In some implementations, the user may define a value using a value definition input 1158, such that when the metric evaluates to the number the conditional formatting is applied. In some implementations, the user may select from a true/false option 1170 whether the conditional formatting rule applies when the rule applies to true or false. When the user has completed defining the conditional formatting rule, the user may save or update the rule on the user system 170 by pressing a selection button 1162, at which point the user system 170 may transmit the conditional formatting rule to the graph-based visualization system 150.

IX. Further Example Aspects Related to Process Analysis and Improvement

Figure 12A:
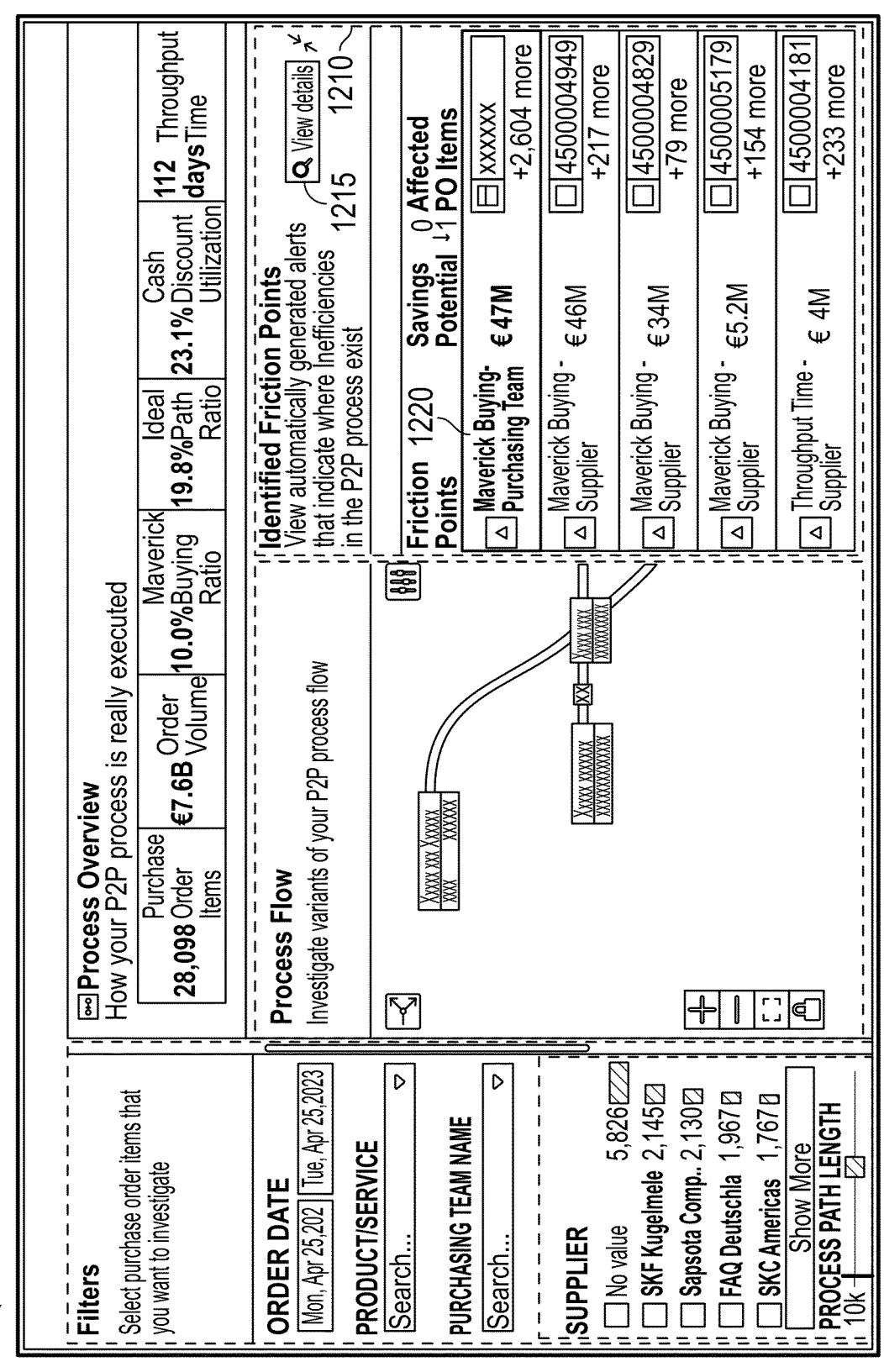

The system can advantageously identify "friction points" of a process for potential efficiency improvements. For example, such friction points may include particular types of objects where various metrics are low, portions or states of the process where various metrics are low, and/or the like. FIG. 12A illustrates an example interactive GUI 1200 in which the system may display various such identified "friction points" as a friction point list 1210. Such "friction points" can be displayed in order based on an impact assessment, such as points with the greatest efficiency or savings potential impact. In some implementations, the user may select a friction point 1220 from the friction point list 1210. In response to the user selecting the friction point 1220, the interactive GUI 1200 may automatically update to provide additional information, or the user may indicate a request to view more details by interacting with selection button 1215. In some implementations, the interactive GUI 1200 may display a portion of the process in a process display window 1230.

In response to selection of a particular friction point 1220 from the friction point list 1210, the system may update the GUI 1200 to present GUI 1250 of FIG. 12B. The system may display details of the reasons for the assessment, such as a plain language explanation 1252, and enable the user to take immediate action (e.g., contacting or alerting a user with authority to take action, blocking certain actions by the process, and/or the like) to mitigate the "friction point" to improve the process. In some implementations, the GUI 1250 may present a list of data objects 1260 associated with the friction point. The user may, in some implementations, be able to select a data object 1262 of the list of data objects 1260 to view a process flow 1264 representing the process steps taken by the data object 1262.

Figure 13:
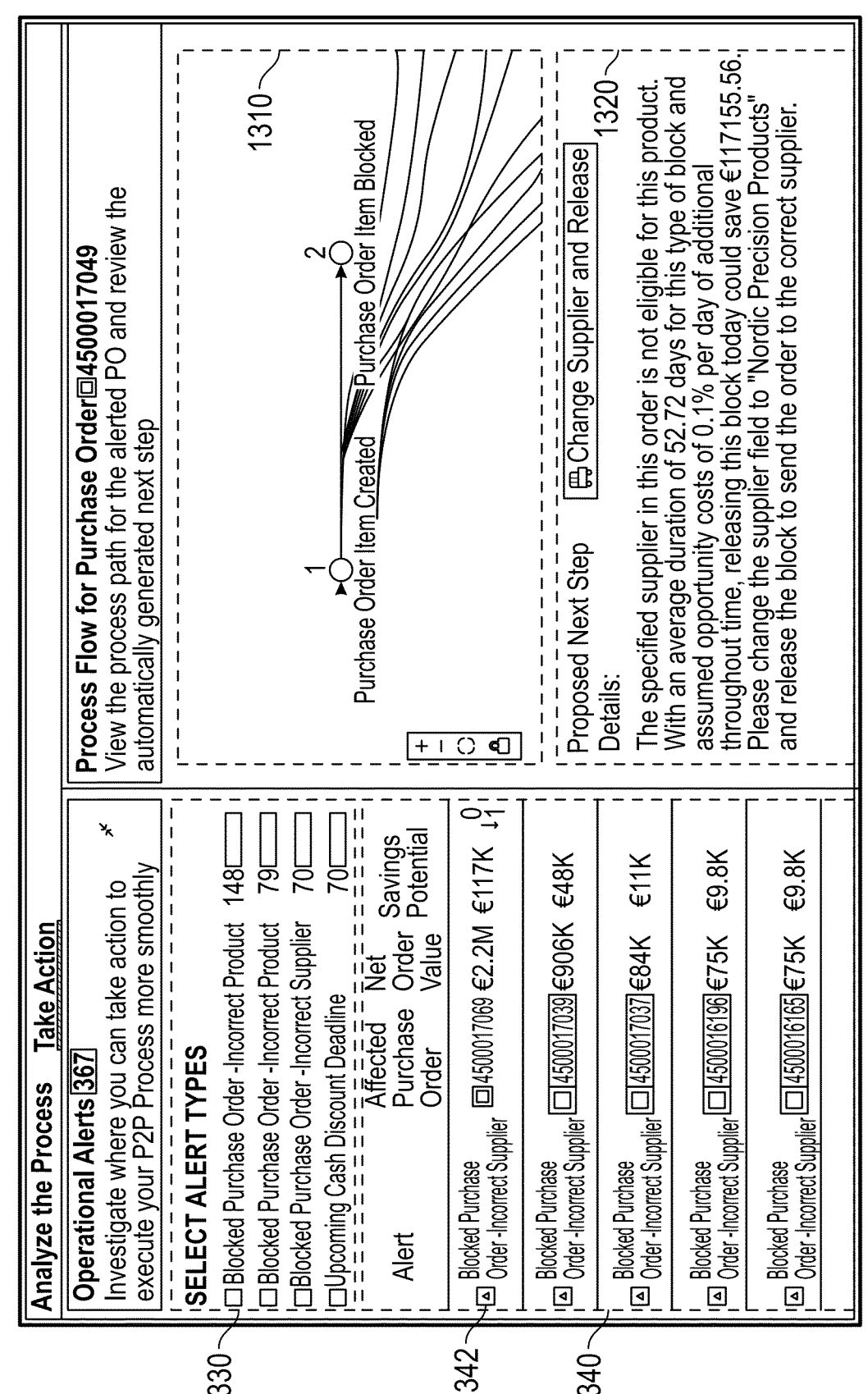
FIG. 13 depicts an example user interface for interacting with alerts associated with a graph-based process visualization.

Via such GUIs and functionality, the system can additionally display details associated with specific data objects and/or types of data objects that may be selected by the user. FIG. 13 illustrates an example interactive GUI 1300 by which a user may view various operational alerts associated with the process, and may view details associated with the alerts (including navigating a graph-based visualization 1310 of process states and transitions specific to the particular objects and/or a list of data objects 1340 that are associated with the alert). In some implementations, the interactive GUI 1300 may present a list of alert types 1330 the user may select from to filter the alerts displayed by the interactive GUI 1300.

The graph-based visualization system 150 can include machine learning and/or other AI models to provide recommendations for process changes to mitigate the reasons for the alerts, such as in a recommendation portion 1320 of the interactive GUI 1300. The graph-based visualization system 150 can then enable the user to take immediate action based on the recommendations. The recommendation may, in some examples, be based on a selection of a data object 1342.

X. Further Example Aspects Related to Multi Object Process Exploration

While various references herein have been made to a single data object type associated with a process, in some implementations data objects of two or more distinct types may be used as input to the system from which a graph-based view may be generated. Each data object type may be associated with a respective set of properties and respective set of state information. The system may determine, based on the respective state information associated with two or more distinct object types and/or linking information associated with the data object types, relationships between the two or more data object types. The system may then use the properties, state information, and/or data object type for each of the data objects to determine a plurality of states associated with a process. The system may then analyze this multi-object process to provide additional insights which may not have been available from an analysis of the process associated with each data object type individually.

For example, the system may receive a first plurality of data objects of a first data object type, and a second plurality of data objects of a second data object type. The system may determine, for example, that the first data object type is "order data" associated with a process, based on the properties and state information associated with the data object representing the first data object type. The system may further determine, for example, that the second data object type is "invoice data" associated with the process. The system may then generate a set of states associated with the process including the first data object type and the second data object type, and determine the steps in the process where the first data object type and the second data object type interact (e.g., when an invoice is generated based on an order status). Additionally, the system may display the states associated only with each data object type, for example a state of receiving an order may not be associated with the invoice. Such information may be useful, for example, for determining that a manufacturing process has a bottleneck associated with a stage of construction causing delays between when an order is placed and when an invoice is generated. This insight may not have been available without the ability to view process steps associated with each data object type and the combined analysis of the first data object type and the second data object type in the same process.

In some implementations, an initial process may first be generated based on a first data object type. The system may then receive user interaction data indicating a first state to be selected. The system may then determine, based on the user interaction data and the data objects associated with the first state that a subsequent state is to be added to the process. The system may then update the process to incorporate the subsequent state, and update the GUI to indicate that the subsequent state has been added. Updating the GUI may further comprise updating one or more edges of the graph-based visualization, such as to indicate an updated number of data objects transitioning between states connected by the one or more edges. In some implementations, the initial process may have been generated for data objects of a first data object type. The system may then receive user interaction data, and/or access information, indicating a link from a first data object of the first data object type to a second data object of a second data object type, the second object type different from the first data object type. The system may then determine, based on state information associated with the first data object or the second data object, an additional state (e.g., a subsequent state or a prior state of either the first data object or the second data object) associated with a first state of the first data object. The system may then update the graph-based visualization to include the additional state, and at least a transition between the first state and the additional state. In this way, users may interact with the system to add additional states to the process, where those additional states may be associated with object types already included in the initial process or object types not yet included in the initial process, but which interact with the initial process (e.g., the object type is an input, output, or blocking event for a step of the process).

Figure 14B:
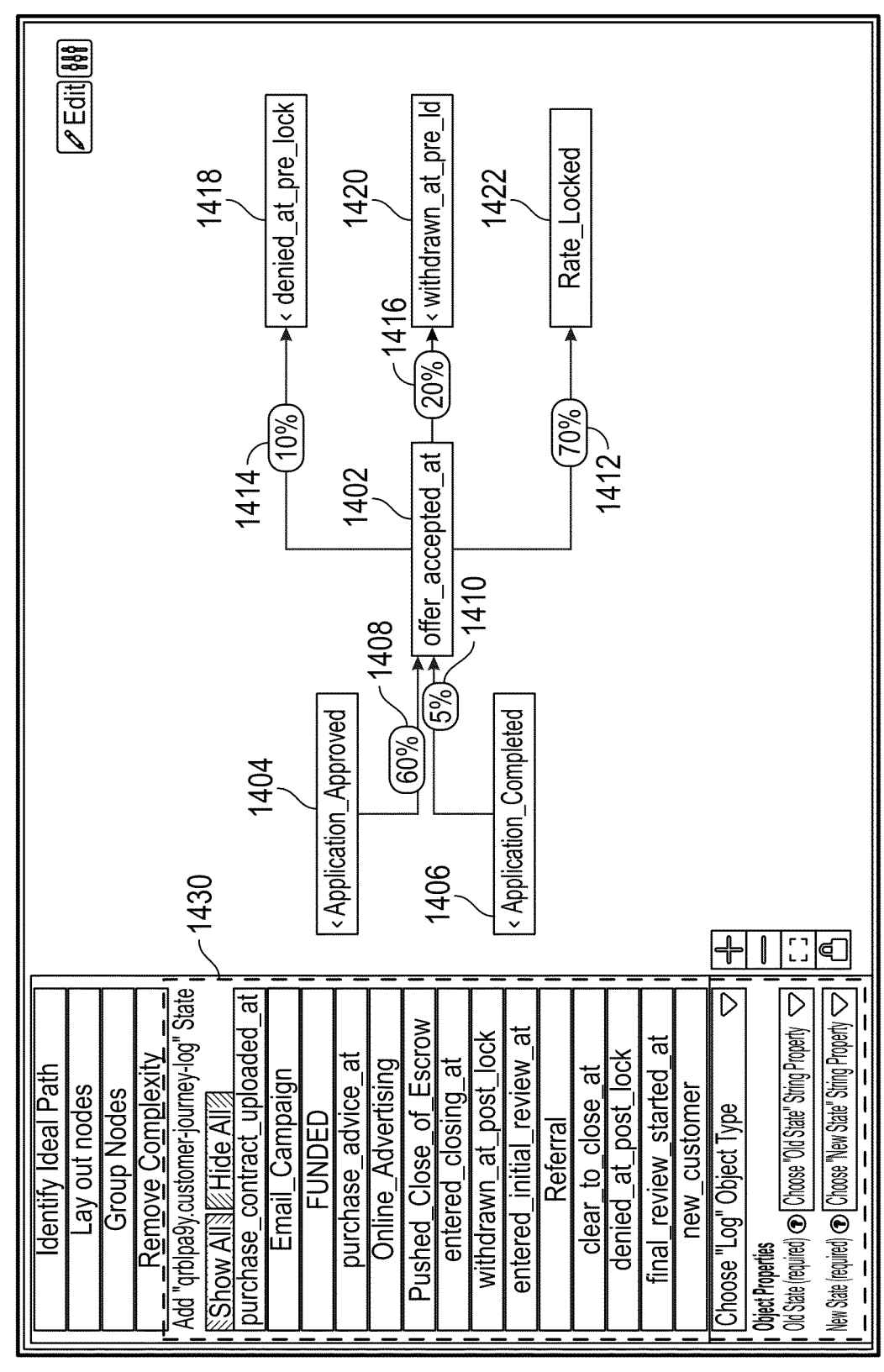
Figure 14C:
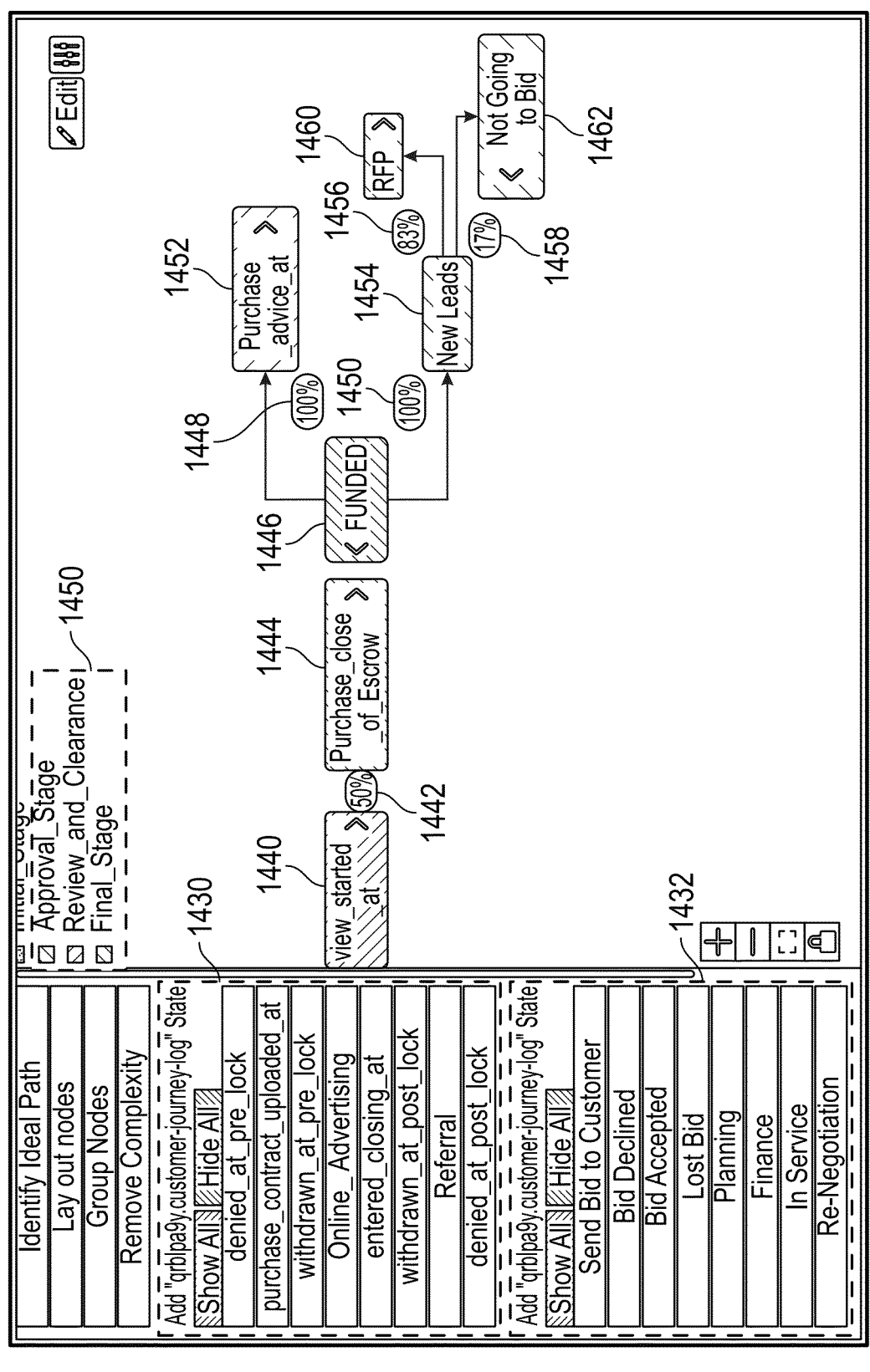

FIGS. 14A-14C illustrate example interactive GUIs in which the system may dynamically add sequential nodes to the graph-based visualization, based on user inputs and/or determinations of related data objects of different types. FIG. 14A illustrates an example GUI 1400 for allowing a user to indicate associations between a first object type and second object type as described previously in relation to FIGS. 2F-2G. As shown, the GUI 1400 allows a user to select a state, for example by selecting a node (e.g., selected node 1402) and presents a list of additional states 1430 the user may select to associate with the selected state. As shown in FIG. 14B, the GUI 1400 may be updated in response to one or more user inputs indicating additional states to be associated, where each state may be associated with two or more object types. The graph-based visualization system 150 may then determine connections between the selected node 1402 and the additional nodes, for example first node 1404, and second node 1406 connected to the selected node 1402 by first edge 1408 and second edge 1410. The graph-based visualization system 150 may, in some examples, determine values for the transition percentages between the added nodes and the selected node 1402, for example first node 1404 and second node 1406, and display the transition percentages on the associated edges.

FIG. 14C illustrates an updated example interactive GUI 1400 where states associated with various object types are connected by edges into a single process graph. The list of additional states 1430 associated with log data of a first type and the second state menu 1432 associated with log data of a second object type may allow a user to add additional states to the process flow of the GUI 1400. In some implementations, a legend 1450 may indicate a color associated with each object type and used for the various nodes of the GUI 1400.

In FIGS. 14A-14C, the different shading of illustrated states represent states with data objects that are of a different object grouping. The transitions between these states can be determined based on a link between different data objects of different data object types, state information associated with the data objects, and/or timestamp information associated with the data objects.

XI. Further Example Aspects Related to Large Language Model Process Features

In some implementations, the system may further comprise one or more language models (e.g., an LLM 175) to allow for more flexible interaction, such as through receiving natural language instructions, with a user of the system. In some implementations, the system may receive a request from a user to generate a new process. The request may be in natural language form. The system may then apply the request to the LLM 175 to generate a new process. In some implementations, generating a new process may additionally comprise receiving incomplete log information (e.g., log information where the states are not named, log information where state transitions are omitted, etc.) and an instruction from the user indicating a request to update the process to hide incomplete information. The LLM 175 may then generate a graph-based visualization of the process, determine incomplete log information (e.g., identifying a data object moving from the first process step to the final process step immediately), and hide the visual representation of incomplete log information in the GUI.

In some implementations, the system may receive a request from a user (e.g., a prompt from the user), comprising a natural language description of a notional process. The system may then, using the LLM 175, generate the notional process comprising one or more states and one or more transitions. The system may then present the notional process by the GUI using a graph-based visualization. In some implementations, the system may receive a request from the user in natural language form and requesting the system to group existing process states into a simplified process view. The system may then, by applying the request and information associated with the existing process states to the LLM 175, generate a set of groupings, where each grouping comprises one or more existing process states. The system may additionally, based on the output of the LLM 175, assign a name to each of the grouped process states. In some implementations, the system may receive a request from the user, in the form of a natural language request, to provide an insight into the process. For example, the user may request the system display a preferred path, identify outliers in the object data, or recommend an adjustment to the process. The system may then apply the request and the information associated with the process to the LLM 175 to generate a result. The system may then update the GUI, such as by generating a pop-up notification, additional dialogue box, or updating the graph-based view to provide a response to the user request based on the generated result of the LLM 175. In some implementations, the system may receive a user request to assign a verb to one or more transitions of the process represented be a respective edge of the graph-based visualization. The system may then apply the information associated with the process and the user request to the LLM 175 to generate a set of verbs, each verb associated with a transition. The system may then display the verb associated with each transition, for example by overlaying the verb on the associated edge of the graph-based visualization. In various additional implementations, the system may submit process information (e.g., indicative of a plurality of states and transitions), along with prompt information, to the LLM 175 to receive, from the LLM 175, one or more of: a preferred path through one or more states of the plurality of states of the process, a spatial layout of one or more states of the plurality of states of the process, a grouping of one or more states of the plurality of states of the process, a combining of one or more states of the plurality of states of the process, an identification of outliers of one or more states of the plurality of states or at least one transition of the one or more transitions of the process, and/or one or more insights or recommendations associated with the process. In the various examples and implementations mentioned above, the system can then parse the output from the LLM and update the dynamic graph-based visualization to provide a representation based on the output.

Figure 15:
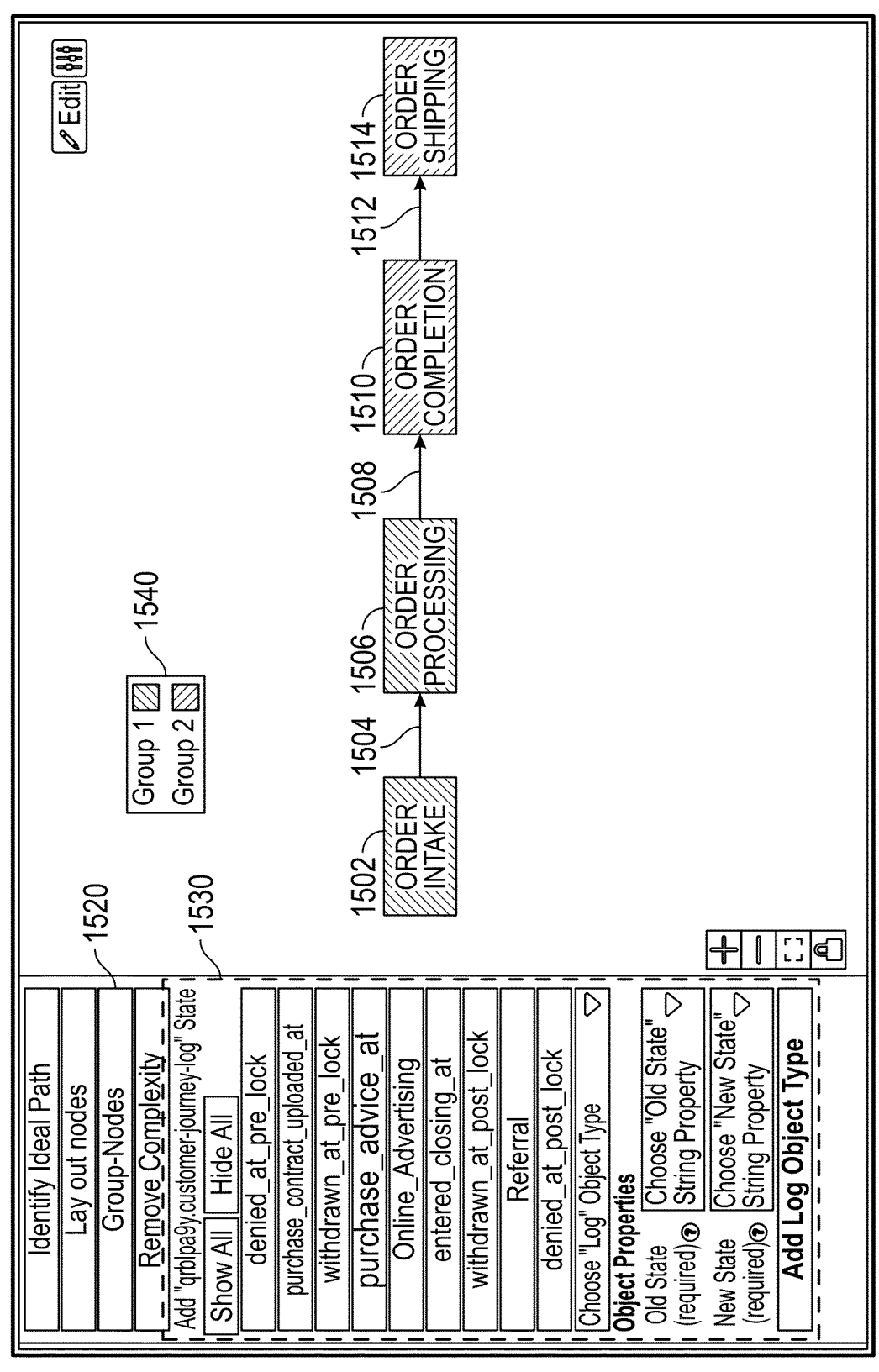
FIG. 15 depicts an example user interface for grouping nodes of a process using a large language model.
Figure 16:
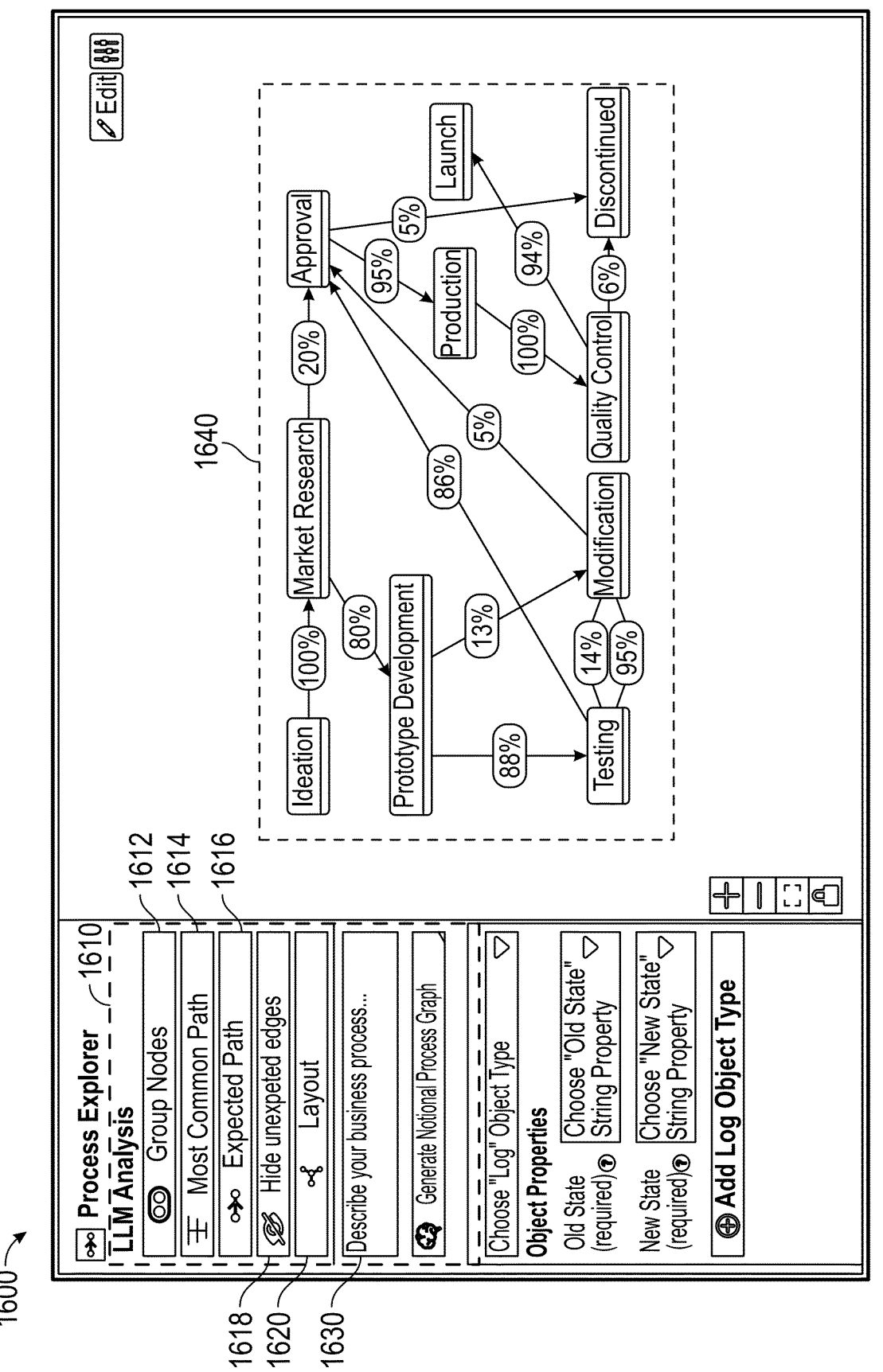
FIG. 16 depicts an example user interface for generating and modifying a process using a large language model.

FIG. 15, and FIG. 16 illustrate example interactive GUIs in which the system may employ an LLM to determine, e.g., groupings of nodes/states, and/or a notional process graph based on a prompt such as "product research and development for soft drink."

FIG. 15 illustrates an example interactive GUI 1500 where a user may select a group nodes button 1520 to indicate a request to the graph-based visualization system 150 that the large language model service 152 generate groupings of nodes associated with various states. In some implementations, the grouping of nodes may be performed as described in reference to FIG. 3 previously herein. In response, the large language model service 152 may, for example, provide node grouping names associated with the grouped nodes and generate grouped nodes for display. For example, order intake node 1502, order processing node 1506, and order completion node 1510 may be determined to be appropriate groupings for the nodes of the process based on input provided from the log data 158, user interaction data 130, process data 162, and any other information available to the graph-based visualization system 150 and provided to the large language model service 152. The GUI may then update the displayed process to indicate the grouped nodes and generated edges representing the transitions between the grouped nodes. The grouped nodes, order intake node 1502, order processing node 1506, and order completion node 1510, order shipping node 1514, and the generated edges (e.g., first edge 1504, second edge 1508, and third edge 1512) may then be represent a simplified or "grouped" view of the process.

In some examples, some or all of the grouped nodes 1502, 1506, 1510, and 1514 may be displayed with a color, shading, or other visual indication of a process stage or grouping. For example, order intake node 1502 and order processing node 1506 may be displayed with a first shading and grouped as "group 1", where "group 1" may be replaced by a word or phrase generated (e.g., by the LLM) or received, to indicate the process phase that order intake 1502 and order processing 1506 occur in. Continuing this example, nodes representing order completion 1510 and order shipping 1514 of the process may be given a second shading and grouped as "group 2", where "group 2" may be replaced by a word or phrase generated (e.g., by the LLM) or received, to indicate the process phase that order completion 1510 and order shipping 1514 occur in. The names of these groupings or process phases and the associated shading style, coloring, or other visual indication may be presented to a user via the interactive GUI 1500, such as by a legend 1540.

FIG. 16 illustrates an example interactive GUI 1600 for generating a notional process 1640 using the large language model service 152 of the graph-based visualization system 150. In some implementations, the generation of a notional process may be performed as described in reference to FIG. 3 previously herein. The user may, as described above herein, provide a plain language description of the process in the text entry box 1630 from which the large language model service 152 may generate the notional process 1640. Additional options for interaction with the process via the large language model service 152 may also be presented to the user. For example, the ability to group nodes using a group node button 1612 discussed in relation to FIG. 15, an option to request a most common path through the process using a selection button 1614, an option to request an expected path using a selection button 1616, an option to hide unexpected edges using selection button 1618, and an ability to request an analysis of the layout using selection button 1620. Some or all of the evaluation required to present the result of selecting the options provided in the LLM Analysis potion 1610 may be performed by the large language model service 152 based on data provided by the graph-based visualization system 150, the process information aggregator 104, and/or the user system 170.

XII. Example Routines Implementing State Automations

The example routines below illustrate various implementations of aspects of the graph-based visualization system 150. The blocks of the routines illustrate example implementations, and in various other implementations various blocks may be rearranged, and/or rendered optional. Further, various blocks may be omitted from and/or added to the example routines below, and blocks may be moved between the various example routines. In various implementations, the example operations of the system illustrated in FIGS. 17A-17B may be implemented, for example, by one or more of the aspects of the graph-based visualization system 150, various other aspects of the example computing environment 100, and/or the like.

FIG. 17A illustrates an example routine 1700 for causing the generation of one or more proposals for modifying a data object associated with a process, based at least in part on an automation associated with a state of the process. At block 1702, a representation of a process is received or determined, for example by the process service 154 of the graph-based visualization system 150. In some implementations, the representation may be received, for example from the process information aggregator 104. In some implementations, the representation may be generated by the graph-based visualization system 150 based on existing or received information. In some implementations, the representation may be accessed from a location storing one or more representations of one or more processes. The representation may comprise a plurality of states associated with the process, and one or more transitions between states of the plurality of states of the process. The representation may be stored, for example, as process data 162.

At block 1704, a plurality of data objects, for example data objects 160, are received or accessed. For example, the plurality of data objects may be accessed by the graph-based visualization system 150 from another system in communication with the graph-based visualization system 150, and/or accessed from a component of the graph-based visualization system 150 by another component therein. In some implementations, the data objects 160 are determined and/or stored by the graph-based visualization system 150 based on the process information 120 received from the process information aggregator 104. The plurality of data objects may be associated with various real-world objects as described previously herein.

At block 1706, the graph-based visualization system 150 determines state information and metrics associated with the plurality of data objects, for example by the process service 154 of the graph-based visualization system 150. In some embodiments, the state information and metrics may be accessed and/or received from a system in communication with the graph-based visualization system 150. In some embodiments, the state information and metrics may be determined, for example based on accessed and/or received process information 120. The state information and metrics may, in some implementations, be stored as process data 162. For example, state information may be associated with one or more of the data objects 160. The state information may comprise a state of the associated data objects 160 in the process, for example a state of "polishing" may be associated with data objects 160 representing real-world objects which are polished as part of the process being represented herein. Additionally at block 206, metrics associated with the data objects 160 may be determined by, for example, a component of the graph-based visualization system 150 and stored as process data 162. Metrics generally comprise information which may be used to determine the functioning of a process. Metrics may include, for example, maximum duration, minimum duration, or average duration.

At block 1708, the prompt generation service 164 accesses an automation associated with at least a first state, for example an automation stored in the automation store 166. The automation may provide information useful for generating a prompt for a machine learning model to cause the machine learning model to make a determination associated with a data object. The automation may indicate one or more rules, steps, or other determinations, which may be used to propose a modification of a data object in a first state using a machine learning model. The automation may indicate that whenever a change occurs to a data object associated with a state, that an action should be performed. For example, the automation may provide information which allows the machine learning model (e.g., the LLM) to determine whether a data object should be moved to a different state in a process (e.g., by altering metadata associated with the data object, or data of the data object indicating a current state), or should stay in a current state (e.g., until a user can provide additional information, or make a determination related to the data object). The modification of the data object may cause a current association between the data object and the first state to be modified such that the data object is currently associated with a second state different from the first state. The second state with which the data object is to be currently associated may be determined based on the determinations of the automation. The modification, as described further below herein, may be proposed by the LLM 175 based on the automation and additional information provided as part of a prompt transmitted from the prompt generation service 164 to the LLM 175.

At block 1710, the graph-based visualization system 150 determines data objects associated with the first state. For example, the graph-based visualization system 150 may determine for one or more data objects of the plurality of data objects associated with the process, data objects comprising information indicating and association between the data object and the first state.

At block 1712, for each of the data objects associated with the first state, the prompt generation service 164 generates a prompt for the LLM 175 based on the automation. For example, the prompt generation service 164 may receive an automation as input. The prompt generation service 164 may further receive, or access, information for the data objects determined to be associated with the first state with which the automation is associated. Additionally, the prompt generation service 164 may access any additional information available to the graph-based visualization system 150, for example additional information associated with the state and/or the process. Based on at least a portion of the automation, data object information, and/or additional information available to the graph-based visualization system 150, the prompt generation service 164 may generate the prompt. The prompt may be a plain language prompt configured to cause the LLM 175 to generate a proposal to modify a data object. The prompt may include additional information configured to cause the LLM 175 to generate the intended proposal, which may be known as prompt engineering. For example, the prompt generation service 164 may include a description of the input information, a context for the generation of the proposal, an output configuration, a process by which the LLM 175 is to reason in the generation of the proposal, information indicating the purpose of the automation, and/or the like. Advantageously, supplementing the prompt with additional information may cause the LLM 175 to generate response to the prompt that are more useful (e.g., more relevant, accurate, and/or complete).

At block 1714, the large language model service 152 submits the generated prompts to the LLM 175 to cause the LLM 175 to generate at least one proposal. The generated prompts may be submitted to the LLM 175 serially. Alternatively, the LLM 175 may comprise a plurality of LLMs, and the large language model service 152 may submit at least a portion of the generated prompts to the plurality of LLMs in parallel.

At block 1716, the graph-based visualization system 150 receives at least one proposal for modifying at least one of the data objects associated with the first state from the LLM 175, which the LLM 175 generated in response to the at least one prompt submitted to the LLM 175 by the large language model service 152. The at least one proposal proposes modifying at least one of the data objects associated with the first state. The proposal may propose modifying a current state of one or more data objects. Modifying the current state of one or more data objects may cause the data objects to be associated with a second state, different from the first state. For example, a data object may be associated with a first state of "Assembly Blocked". The "Assembly Blocked" state may, based on the process information, be followed by a second state of "Assembly In Progress" and a third state of "Assembly Complete". The proposal may then propose modifying the data object such that the data object will be associated with the third state, "Assembly Complete," based on the determination made by the LLM 175 based on the automation.

FIG. 17B illustrates an example routine 1750 for modifying a data object based on a proposal generated by an LLM 175 in response to a prompt associated with an automation, generated by the prompt generation service 164.

Sub-routine 1770 includes blocks 1752 through 1760. Sub-routine 1770 is an optional sub-routine which describes the use of further automations following the implementation of a proposal received at block 1716 of routine 1700.

At block 1752, the prompt generation service 164 accesses a second automation associated with at least a second state. The second state can be a state with which a data object previously associated with a first state is currently associated based on the acceptance of a proposal generated by the LLM 175 to modify the data object. The graph-based visualization system 150 may automatically accept the proposal, associated the data object with the second state. Alternatively, the graph-based visualization system 150 may assume the proposal has been, or will be, accepted, and determine to access the second automation based on the proposal being accepted. In another alternative, a user may have accepted the proposal, and the prompt generation service 164 may access the second automation in response to the user accepting the proposal. The prompt generation service 164 can access the second automation from the automation store 166 as described previously herein with respect to block 1708.

At block 1754, the graph-based visualization system 150 determines data objects associated with the second state, as described previously herein with respect to the first state at block 1710.

At block 1756, for each of the data objects associated with the second state, the prompt generation service 164 generates prompts for the LLM 175 based on the second automation, as described previously herein with respect to the automation at block 1712.

At block 1758, the prompt generation service 164 submits the generated prompts to the LLM 175, as described previously herein with respect to block 1714.

At block 1760, the graph-based visualization system 150 receives at least one proposal for modification of at least one of the data objects associated with the second state from the LLM 175, that the LLM 175 generated in response to the prompts submitted at block 1758. Receiving the at least one proposal can occur as described previously herein with respect to block 1716.

At block 1762, the graph-based visualization system 150 can generate a user interface based on the proposal. The user interface may be provided for presentation to a user, for example as visualization information 140 transmitted to the user system 170. The user interface may include a graph-based visualization of the process, as described previously herein. The user interface can include an indication in the graph-based visualization that a state is associated with an automation. For example, a display element representing the state in the graph-based visualization can be altered (e.g., by changing a shape, presenting an alert, presenting a reasoning, a color, a texture, an image, or other visual element of the state's representation in the graph-based visualization) to indicate that an automation has been determined to be associated with the state. As discussed below herein with respect to FIGS. 18-21, additional information can be presented by the user interface. For example, the user interface may present a textual, image, or multimodal representation of the proposal, a reasoning provided by the LLM 175 associated with the proposal, a plurality of proposals, an option for the user to accept or reject the proposal, a summary of the proposal, one or more determinations associated with the proposal, or any other information which may be useful to the user when deciding whether to accept or reject the proposal. Further, the user interface may include presentation of a simulation indicating the result of accepting, rejecting, or modifying the proposal. Additionally, the user interface can provide for presentation of a simulation resulting from accepting, rejecting, or modifying the proposal. The simulation can occur, for example, in a virtual layer generated from the process information and the information associated with one or more data objects. The simulation can then be updated based on user interaction to present various results based on the proposal, which may include a state associated with a data object based on accepting, rejecting, or modifying the proposal. It should be understood that block 1762 is optional, and the graph-based visualization system 150 may not generate a user interface based on the proposal, for example where the graph-based visualization system 150 automatically determines whether a proposal will be accepted.

At block 1764, the graph-based visualization system 150 can receive user input, for example as user interaction data 130 received from the user system via the user interface generated at block 1762. The user input may indicate, for example, acceptance, rejection, or modifications to a proposal presented to the user by the user interface generated by the graph-based visualization system 150. It should be understood that block 1764 is optional, for example where the implementation of a proposal by the graph-based visualization system 150 is automated and user input is not necessary to determine whether to accept the proposal.

At block 1766, the graph-based visualization system 150 modifies at least one of the data objects in accordance with the proposal received at block 1716 of routine 1700. Modifying at least one data object may include modifying a state with which the data object is associated, for example where the data object is associated with a first state, modifying the data object may cause the data object to be associated with a second state. For example, modifying the data object may refer to modifying properties of the data object indicating a state associated with the data object, or modifying metadata associated with the data object indicating a state associated with the data object. Additionally, the graph-based visualization system 150 may provide for simulating the modification of at least one of the data objects, for example in a virtual layer simulating a resulting process following acceptance, rejection, or modification of the proposal. In such situations, a data object may be modified in the virtual layer separately from the same data object in the process.

In some examples, the data object may be associated with a real-world object. The system may be coupled to a real-world system, such as machinery of a production pipeline. Causing the data object to move from a first state to a second state may cause a process to be initiated on the associated real-world object in the real-world system.

XIII. Example Aspects Related to Automations

FIGS. 18-21 illustrate example interactive GUIs for presenting, and allowing for interaction with, a proposal generated by the LLM 175 based on an automation associated with a state of a process. In some implementations, the system may allow for the presentation of an interactive graphical user interface ("GUI") configured to display information associated with a proposal generated by the LLM 175, and/or a graph-based visualization of a process for which the proposal was generated. In some implementations, the GUI can provide options to a user to accept, reject, modify, or otherwise interact with a proposal. Additionally, the GUI can be configured to present two or more proposals for consideration by the user. Further, the GUI can present a reasoning associated with a proposal, an indication of a result of accepting a proposal, an indication of a state associated with a proposal, a simulation of a result of accepting a proposal, and other information associated with a proposal which may be useful to a user in understanding the proposal or deciding whether to accept the proposal.

Figure 18:
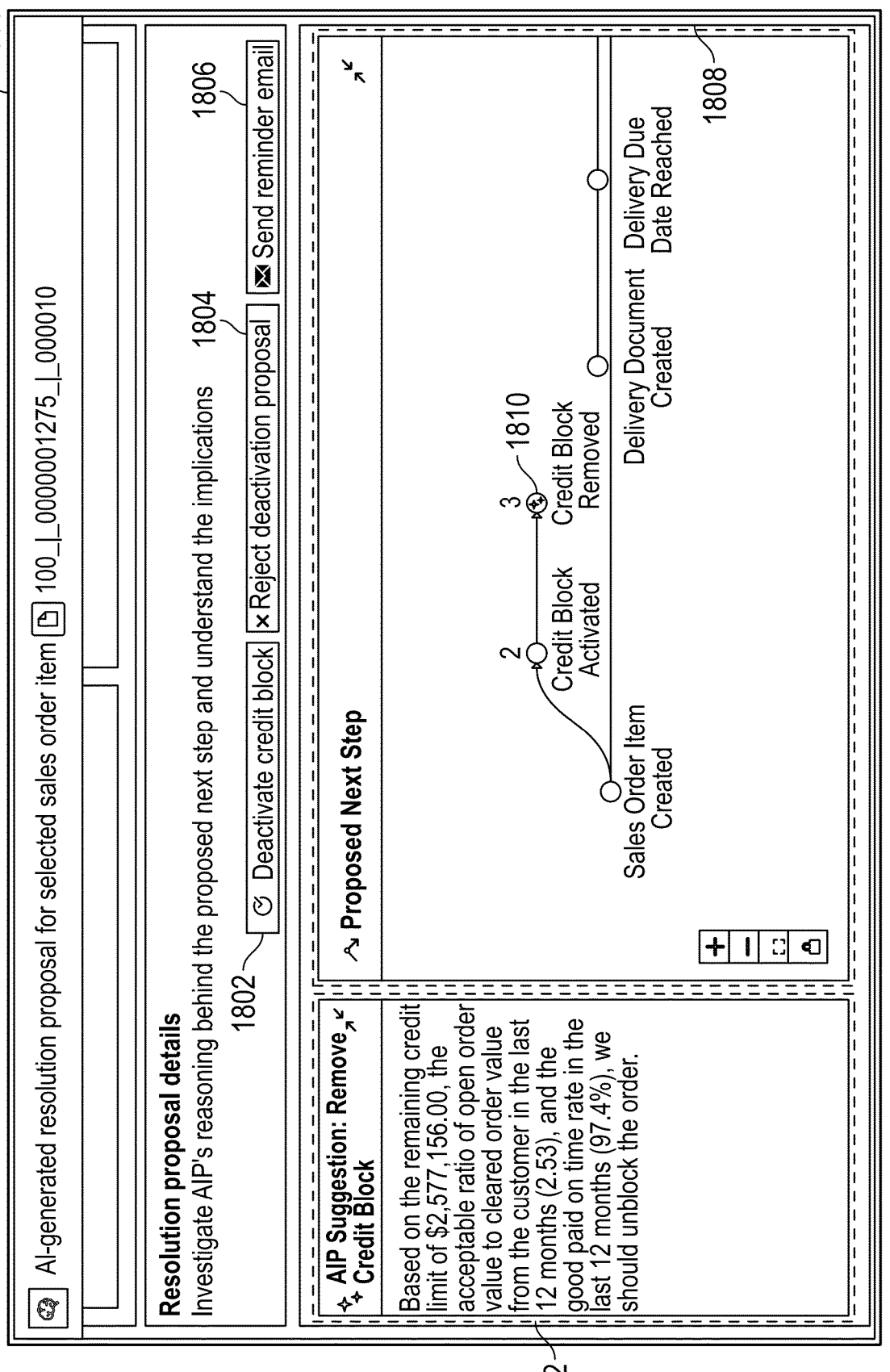
FIG. 18 depicts an example user interface for presenting a proposal to modify a data object based on an automation.

FIG. 18 illustrates an example interactive GUI 1800 where a graph-based visualization of a process 1808, a proposal 1812, an option to accept the proposal 1802, an option to reject the proposal 1804, and an option to send a reminder email 1806 are provided as portions of the interactive GUI 1800. The user may be presented with the proposal 1812 in a text format. The proposal 1812 may be the proposal received from the LLM 175, or may be a modified version of the proposal received from the LLM 175 which has been modified, for example, to improve the ability of a user to understand the proposal. The user may select any of the options proposal 1802, proposal 1804, or reminder email 1806, which may then cause the graph-based visualization system 150 to perform an action based on the user's selection. For example, if the user selects proposal 1804, the graph-based visualization system 150 may respond by not modifying a data object associated with the proposal, or by causing generation and/or presentation of an alternative proposal. The graph-based visualization of the process 1808 may include a visual indication 1810 of the state associated with the proposal, and an indication of a result of accepting the proposal (e.g., by indicating the state to which a data object would move if the proposal was accepted). Further, in some implementations two or more proposals may be chained, such that the result of implementing a first proposal causes a data object to move to a second state associated with a second automation. The graph-based visualization system 150 may then generate a second proposal for the data object based on the second automation and the second state associated with the data object based on implementation of the first proposal. The interactive GUI 1800 may indicate chained proposals, for example, by applying numeric indicators to the associated states, changing a color of the associated states, applying an image to the associated states, or otherwise visually marking the associated states as being related to a chain of proposals. Additionally, the graph-based visualization of the process 1808 may be a simulated version of the process which may allow the user to understand the effect of accepting or rejecting the proposal 1812.

FIG. 19 illustrates an example interactive GUI 1900 for presenting one or more reasoning steps used by the LLM 175 in the generation of the proposal based on an automation. The interactive GUI 1900 can, for example, present a series of calculations, logical determinations, considerations, or other process steps performed by the LLM 175 during generation of the proposal. It should be noted that while this illustrative interactive GUI 1900 presents textual information, images, video, audio, or multimodal information may additionally or alternatively be presented to the user.

FIG. 20 illustrates an example interactive GUI 2000 for presenting a proposal 2004 to modify at least one data object associated with graph-based visualization 2002. The proposal 2004 may be presented as described previously herein. Additionally, the interactive GUI 2000 presents at least a portion of a reasoning 2006 based on which the LLM 175 generated the proposal 2004.

Figure 21:
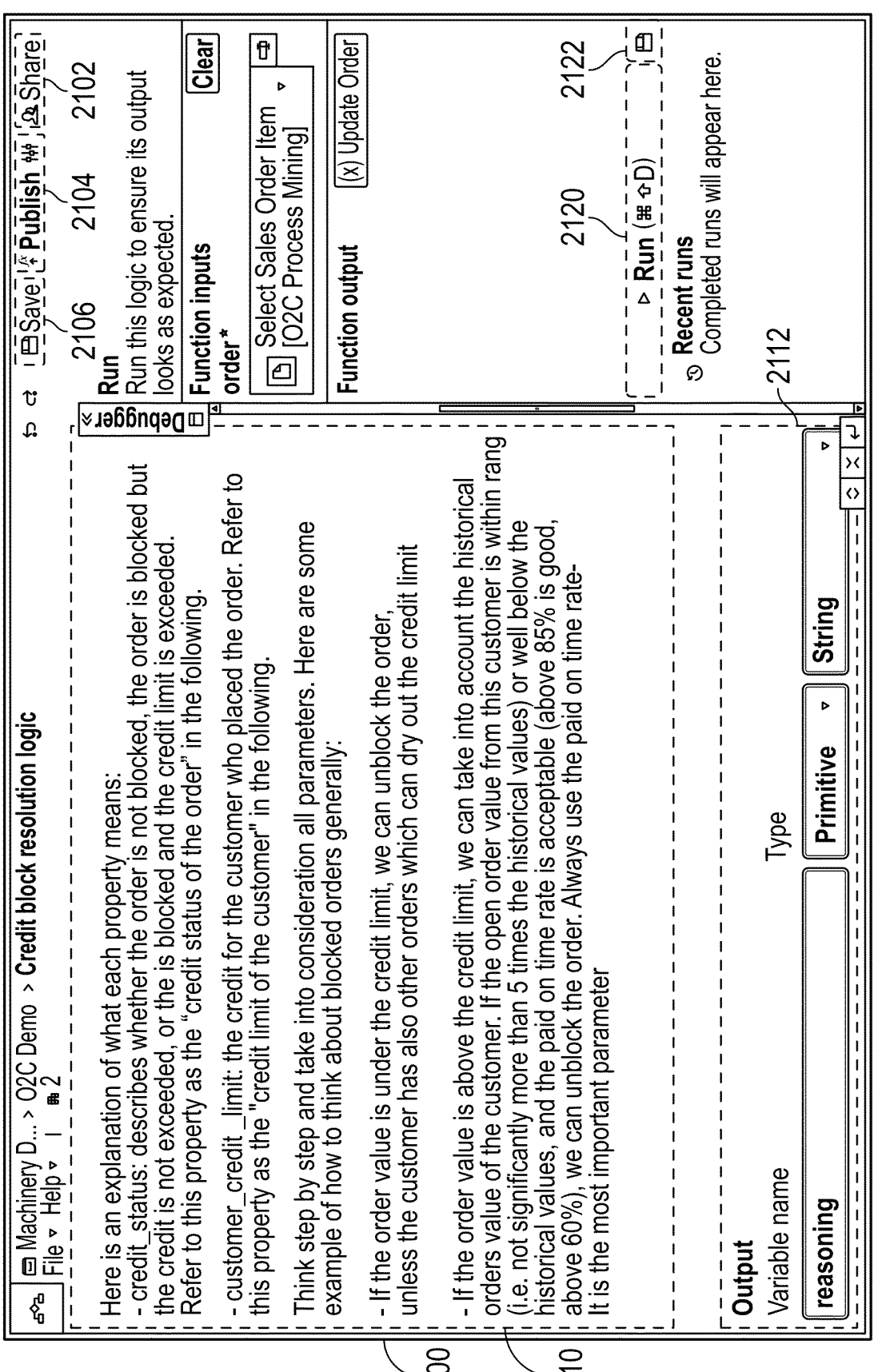
FIG. 21 depicts an example user interface for preparing a prompt to cause a large language model to generate a proposal.

FIG. 21 illustrates an example interactive GUI 2100 for allowing a user to interact with logic used at least in part for the generation of a prompt for the LLM 175 by the prompt generation service 164. The interactive GUI 2100 includes a display area 2110 displaying a textual description of at least a portion of the reasoning information generated by the LLM 175 when generating a proposal based on an automation. The reasoning information can include a rule, threshold, logic, definition, or other information item used by the LLM 175 to generate the proposal, and the manner in which the information item was used. In some implementations, the display area 2110 may include at least a portion of the automation information, and/or the prompt information. Further, the interactive GUI 2100 includes an output option area 2112 comprising options for the display of the proposal. The interactive GUI 2100 can also allow a user to save an output 2106 displayed by the display area 2110, an option to publish the output 2104, and an option to share the output 2102. Further, the interactive GUI 2100 includes an option to run 2120, which can cause the graph-based visualization system 150 to generate a prompt based on an automation and a selected or determined data object, and provide the prompt to the LLM 175 causing the LLM 175 to return the reasoning and/or the proposal. The interactive GUI 2100 can also include an option to save a current output 2122 displayed by the display area 2110.

XIV. Example Routine Implementing Path Visualization Alteration

The example routine below illustrates an implementation of aspects of the graph-based visualization system 150. The blocks of the routines illustrate example implementations, and in various other implementations various blocks may be rearranged, and/or rendered optional. Further, various blocks may be omitted from and/or added to the example routines below, and blocks may be moved between the various example routines. In various implementations, the example operations of the system illustrated in FIG. 22 may be implemented, for example, by one or more of the aspects of the graph-based visualization system 150, various other aspects of the example computing environment 100, and/or the like.

Additionally, the system may comprise one or more interactive GUIs configured to display information about some or all of the data objects associated with the process. The GUI may display the information in the form of a graph-based visualization. The GUI may be presented by a display to a user. The GUI may present various visualizations of the data of the system, for example the data objects stored in the database, state information of a data object, or the result of analyses performed on the data objects by the system. For example, the GUI may present a series of nodes, where each node may represent an associated state of a process. The GUI may further present one or more paths taken by objects through the process, for example as an ordered list based on a number of objects which have taken each path through the process. The user may filter the process displayed by the GUI by selecting one or more paths from the ordered list. Additionally, the GUI may present an option to view a number of objects at each process node of the displayed process. The GUI may then allow a user to select a view of the process path which includes an indication of the number of objects currently at a node of the process, but which have not yet reached an end of the process. Further, the user may be presented with an option to assign colors to nodes of the process, where the colors are based on a number of objects currently in the process node, or a number of objects which have passed through the process node (e.g., a heat map). Such a display may be useful for indicating to the user the frequency with which objects reach a process node and/or proceed through particular paths in the process, and for assisting in the identification of potential bottlenecks in the process.

FIG. 22 illustrates an example routine 2200 for updating a graph-based visualization presented by a graphical user interface (GUI) to a user.

At block 2202, the graph-based visualization system 150 can determine a plurality of paths indicating a plurality of transitions of data objects through a plurality of states that represent a process, as described previously herein. A path may represent a plurality of states and transitions of the process through which a data object has moved. The plurality of states and transitions through which the data object has moved may be indicated, for example, by log data associated with the process, information of the data object, or metadata associated with the data object. The graph-based visualization system 150 may then generate path information from the log data, data object information, and/or metadata, and store the path information for one or more of the data objects associated with the process in order to determine the plurality of paths and numbers of data objects associated with each path.

At block 2204, the graph-based visualization system 150 receives a user input selecting at least one of the plurality of paths via a graph-based visualization. For example, the user system 170 can receive, from the user, the user input via the GUI presenting the graph-based visualization, and transmit the user input as user interaction data 130 to the graph-based visualization system 150. The user input can represent a user interaction with a graph-based visualization, or with another display element of the GUI (e.g., a button, a text box, an alert, a pop-up window, etc.). In some implementations, the GUI may present a list of paths, determined based on the plurality of paths determined at block 2202, which a data object may follow through the process represented by the graph-based visualization. The plurality of paths in the list of paths may be ordered, for example, based on a ranking of the paths determined from historical data indicating on a number of data objects which have followed each path through the process. An ordering of the plurality of paths may be determined such that a first path associated with a highest number of data objects following the path relative to the remaining paths of the plurality of paths is presented first, and where each path following the first path is displayed in an order based on having a next highest number of data objects following the path.

At block 2206, the graph-based visualization system 150 updates the graph-based visualization to display one or more states and transitions associated with the selected at least one path. For example, the graph-based visualization system 150 can initially provide visualization information 140 for an entire process comprising a plurality of nodes representing states and edges representing transitions to be displayed as a graph-based visualization. Based on the user interaction, the graph-based visualization system 150 can then provide visualization information 140 for only states and transitions associated with the selected at least one path, causing states and transitions not associated with the selected at least one path to no longer be presented to the user by the GUI.

At block 2208, the graph-based visualization system 150 receives second user input, for example from the user system 170, selecting to view a current process representation. The current process representation may incorporate live data, or a most recent data, indicating a current number of objects associated with at least a portion of the states of the process represented by the graph-based visualization.

At block 2210, the graph-based visualization system 150 updates the graph-based visualization to display current numbers of data objects associated with each currently displayed state (e.g., associated with the selected paths) based on the current state information of the plurality of data objects associated with the currently displayed states. For example, the graph-based visualization system 150 may update the graph-based visualization to present a current number of data objects associated with a state of the process. Additionally, the graph-based visualization system 150 may present an updated set of paths of the plurality of paths. For example, where no data objects are associated with a path of the plurality of paths, the path with no associated data objects may no longer be displayed to the user, or may be presented in a modified form (e.g., having a different color, altered to be no longer selectable, or otherwise indicated as not being associated with a current data object). Additionally, the graph-based visualization system 150 may update the ranking of the plurality of paths displayed to the user by the GUI based on the current number of data objects associated with each path. The graph-based visualization system 150 may then cause the GUI to display the updated ranking of paths.

Figure 24:
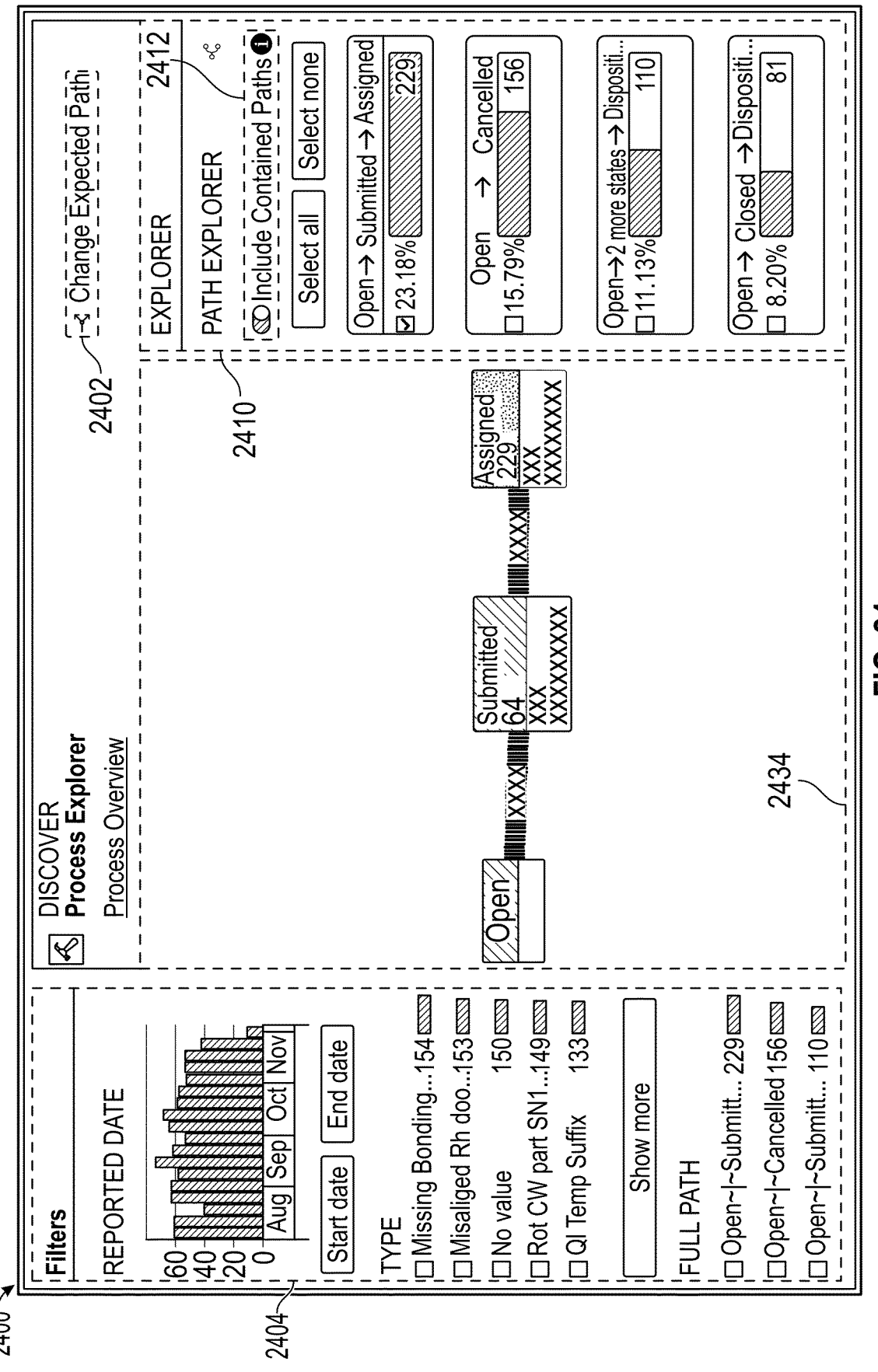
FIG. 24 depicts an example user interface for modifying a graph-based visualization of a process.

FIG. 24 illustrates an example interactive GUI 2400 for presenting a graph-based visualization 2434, a plurality of process filters 2404, and a path explorer 2410 for a plurality of paths associated with a process. The plurality of process filters 2404 can include options to set a timeframe from which data objects are to be selected, one or more types of state and/or data object, one or more paths associated with the process, or other options associated with the process. The path explorer 2410 can include a visual display of a plurality of paths associated with the process. The display of the plurality of paths may indicate a percentage of data objects which have followed a path, a total number of data objects which have followed a path, a plurality of states associated with a path, and/or additional path information. Additionally, the path explorer 2410 may include an option 2412 to include a current process representation which may incorporate live, or most recent, data associated with the process (represented here by the contained paths option 2412). The option 2412, when active, can cause the graph-based visualization to display a current number of data objects in each currently displayed state of the plurality of states associated with a currently displayed path (e.g., determined as described above in references to at least blocks 2208 and 2010 of FIG. 22). Additionally, the option 2412 may cause the graph-based visualization system 150 to present an updated set of paths of the plurality of paths. For example, where no data objects are associated with a path of the plurality of paths, the path with no associated data objects may no longer be displayed to the user, or may be presented in a modified form (e.g., having a different color, altered to be no longer selectable, or otherwise indicated as not being associated with a current data object). Additionally, the graph-based visualization system 150 may update the ranking of the plurality of paths displayed to the user by the GUI based on the current number of data objects associated with each path. The graph-based visualization system 150 may then cause the GUI to display the updated ranking of paths.

When the option 2412 is inactive, the graph-based visualization can be updated to display a number of data objects in a final state associated with a path (e.g., a state which is associated with an edge from which data objects enter the state, but not with a second edge from which data objects would exit the state) based on historical data. The interactive GUI 2400 may additionally allow a user to select an option to change an expected path of at least one data object associated with the process. Further, one or more states of the graph-based visualization 2434 can be provided with a visual indication (e.g., a color, shading, image, text, etc.) indicating that the state is associated with an expectation as defined previously with respect to FIG. 23 herein, a filter of the plurality of process filters 2404, or a selected path of the list of paths in the path explorer 2410.

FIG. 23 illustrates an example interactive GUI 2300 for setting expectation values associated with a state of a process. Setting an expectation associated with the state can cause a notification to be generated by the graph-based visualization system 150. The notification can be transmitted from the graph-based visualization system 150 to the user system 170. The interactive GUI 2300 can include various expectation values which may be adjusted by a user, for example an option to select a maximum number of objects associated with a state 2302, and/or a maximum average duration during which objects remain in the state 2304. The graph-based visualization system 150 can then be configured to generate a notification when the maximum number of objects in the state 2302, and/or the maximum average duration of objects remaining in the state 2304 is exceeded. When the user has completed adjusting the adjustable values of the interactive GUI 2300 and the notification configuration, the user can use the save button 2306 to save the expectation and associated it with the state, such that the notification is generated for the state when an expectation value is exceeded.

XV. Additional Features, Aspects, Examples, and Implementations

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some implementations, the computer system may be a cloud-based computing system whose processing resources are shared by multiple distinct business entities or other users.

Depending on the implementation, certain acts, events, or functions of any of the processes or algorithms described herein can be performed in a different sequence, can be added, merged, or left out altogether (e.g., not all described operations or events are necessary for the practice of the algorithm). Moreover, in certain implementations, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the implementations disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the implementations disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another implementation, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the implementations disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without other input or prompting, whether these features, elements and/or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it can be understood that various omissions, substitutions, and changes in the form and details of the devices or algorithms illustrated can be made without departing from the spirit of the disclosure. As can be recognized, certain implementations described herein can be embodied within a form that does not provide all of the features and benefits set forth herein, as some features can be used or practiced separately from others. The scope of certain implementations disclosed herein is indicated by the appended claims rather than by the foregoing description. All changes which come within the meaning and range of equivalency of the claims are to be embraced within their scope.

XVI. Example Clauses

Examples of implementations of the present disclosure can be described in view of the following example clauses.

The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A computer-implemented method for generating a visualization of a process, the computer implemented method comprising, by one or more hardware processors executing program instructions: determining, receiving, or accessing a representation of a process, wherein the representation of the process includes: a plurality of states, and one or more transitions among states of the plurality of states; determining, receiving, or accessing a plurality of data objects, wherein each of the data objects is associated with a respective set of properties; determining, receiving, or accessing, for each of the plurality of data objects, respective state information associated with the data objects; and causing generation of an interactive graphical user interface including: a graph-based visualization of at least a portion of the plurality of states and the one or more transitions, wherein the graph-based visualization is generated based at least in part on at least a portion of the plurality of data objects and associated properties and state information.

Clause 2. The computer-implemented method of Clause 1 further comprising, by the one or more hardware processors executing program instructions: determining, for each of the plurality of states, and based on (a) at least some of the properties of the sets of properties and (b) the state information associated with the data objects, one or more metrics associated with the states, wherein the interactive graphical user interface further includes: for each of the plurality of states, indications of the one or more metrics associated with the states.

Clause 3. The computer-implemented method of any of Clauses 1-2 further comprising, by the one or more hardware processors executing program instructions: determining, for a combination of the plurality of states, and based on properties and/or the state information associated with the data objects, one or more overall metrics associated with the process, wherein the interactive graphical user interface further includes: indications of the one or more overall metrics associated with the process.

Clause 4. The computer-implemented method of any of Clauses 2-3 further comprising, by the one or more hardware processors executing program instructions: receiving a selection of an object type; re-determining, based on a filtered set of the plurality of data objects that match the object type, at least one of: the one or more metrics associated with the states, the one or more overall metrics associated with the process, or the portion of the plurality of states and the one or more transitions in the graph-based visualization; and updating the interactive graphical user interface to include indications of at least one of: the re-determined one or more metrics associated with the states, the re-determined one or more overall metrics associated with the process, or the re-determined portion of the plurality of states and the one or more transitions in the graph-based visualization.

Clause 5. The computer-implemented method of any of Clauses 2-4, wherein the one or more metrics and/or the one or more overall metrics include at least one of: average revenue, average cost, or average duration.

Clause 6. The computer-implemented method of any of Clauses 1-5, wherein the state information includes at least one of: a history of states associated with the data objects, log data associated with items represented by the data objects, or live data associated with items represented by the data objects.

Clause 7. The computer-implemented method of any of Clauses 1-6 further comprising, by the one or more hardware processors executing program instructions: determining, for each of the plurality of states, and based on the state information associated with the data objects, respective quantities of data objects associated with the states, wherein the interactive graphical user interface further includes: for each of the plurality of states, indications of the respective quantities of data objects associated with the states.

Clause 8. The computer-implemented method of Clauses 7, wherein the respective quantities of data objects associated with the states are indicative of current or live states of the data objects.

Clause 9. The computer-implemented method of any of Clauses 1-8, wherein the plurality of data objects are associated with an object ontology.

Clause 10. The computer-implemented method of any of Clauses 1-9 further comprising, by the one or more hardware processors executing program instructions: determining, for each of the one or more transitions, and based on the state information associated with the data objects, respective portions of data objects that have transitioned along the transitions, wherein the graph-based visualization includes: edges between respective states that are indicative of transitions of the one or more transitions, and for each of the edges, indications of the respective portions of data objects that have transitioned along the transitions.

Clause 11. The computer-implemented method of any of Clauses 1-10 further comprising, by the one or more hardware processors executing program instructions: in response to receiving a first user input, via the interactive graphical user interface, selecting a first state of the plurality of states: causing the interactive graphical user interface to be updated to display a detailed view of one or more data objects associated with the first state.

Clause 12. The computer-implemented method of Clause 11 further comprising, by the one or more hardware processors executing program instructions: determining, for a first data object of the one or more data objects, an unexpected transition, wherein the unexpected transition comprises a transition, different from the one or more transitions, to or from the first state; and causing the interactive graphical user interface to be updated to display an alert of the unexpected transition.

Clause 13. The computer-implemented method of Clause 11 further comprising, by the one or more hardware processors executing program instructions: in response to receiving a second user input, via the interactive graphical user interface, selecting a first data object of the one or more data objects: causing the interactive graphical user interface to be updated to display a detailed view of events associated with the first data object.

Clause 14. The computer-implemented method of Clause 13, wherein the detailed view of the events associated with the first data object includes, based on state information associated with the first data object, at least a simplified graph-based visualization of states and transitions traversed by the first data object.

Clause 15. The computer-implemented method of Clause 14, wherein the states and transitions traversed by the first data object include an unexpected transition.

Clause 16. The computer-implemented method of any of Clauses 1-15, wherein each of the plurality of states is stored as a data object.

Clause 17. The computer-implemented method of any of Clauses 1-16 further comprising, by the one or more hardware processors executing program instructions: determining, receiving, or accessing one or more unexpected transitions associated with the process, wherein the one or more unexpected transitions comprise transitions different from the one or more transitions; and in response to receiving a third user input, via the interactive graphical user interface, selecting to view at least a portion of the one or more unexpected transitions: causing the interactive graphical user interface to be updated to display, in the graph-based visualization, at least the portion of the one or more unexpected transitions.

Clause 18. The computer-implemented method of Clause 17, wherein the third user input comprises an indication of a threshold, and wherein the computer-implemented method further comprises, by the one or more hardware processors executing program instructions: determining the portion of the one or more unexpected transitions based at least in part on quantities of data objects that have transitioned along the one or more unexpected transitions.

Clause 19. The computer-implemented method of any of Clauses 17-18 further comprising, by the one or more hardware processors executing program instructions: determining a plurality of candidate transitions associated with the process; receiving, from a user, designation of the one or more unexpected transitions from among the plurality of candidate transitions; and designating a remainder of the plurality of candidate transitions as the one or more transitions.

Clause 20. The computer-implemented method of any of Clauses 17-18 further comprising, by the one or more hardware processors executing program instructions: determining a plurality of candidate transitions associated with the process; automatically determining the one or more unexpected transitions from among the plurality of candidate transitions; and designating a remainder of the plurality of candidate transitions as the one or more transitions.

Clause 21. The computer-implemented method of any of Clauses 1-20 further comprising, by the one or more hardware processors executing program instructions: receiving, from a user and via the interactive graphical user interface, one or more user inputs including at least a first rule for to be applied to a first state of the plurality of states; and based on an evaluation of the first rule, generate a notification associated with the first state.

Clause 22. The computer-implemented method of Clause 21, wherein the notification includes at least one of: a coloring of the first state in the graph-based visualization, an emphasis or differentiating feature of the first state in the graph-based visualization, or an alert displayed to a user.

Clause 23. The computer-implemented method of any of Clauses 1-22 further comprising, by the one or more hardware processors executing program instructions: determining, receiving, or accessing a state change associated with a first data object of the plurality of data objects, wherein the state change is triggered based on a rule associated with the first data object; and in response to the state change, updating the state information associated with the first data object.

Clause 24. The computer-implemented method of Clause 23, wherein the rule is user defined and associated with the first data object via an object ontology associated with the plurality of data objects.

Clause 25. The computer-implemented method of any of Clauses 1-24 further comprising, by the one or more hardware processors executing program instructions: determining a plurality of paths indicating a plurality of transitions of data objects through the plurality of states of the graph-based visualization; determining a ranking of the plurality of paths based in part on historical data representing a number of data objects that have followed each path of the plurality of paths through the process; and causing the interactive graphical user interface to be updated to display selectable indications of at least a portion of the plurality of paths, wherein the selectable indications of the plurality of paths are displayed based on the ranking.

Clause 26. The computer-implemented method of Clause 25, wherein the ranking of the plurality of paths is ordered such that a first path of the plurality of paths is associated with a highest number of data objects following the first path relative to each of the remaining plurality of paths, and wherein each path of the plurality of paths following the first path in the ranking has a next highest number of data objects.

Clause 27. The computer-implemented method of any of Clauses 25-26 further comprising, by the one or more hardware processors executing program instructions: in response to receiving a user input, via the interactive graphical user interface, selecting to view at least one of the plurality of paths: causing the interactive graphical user interface to be updated to display, in the graph-based visualization, one or more states associated with the selected at least one of the plurality of paths, and transitions associated with the selected at least one of the plurality of paths.

Clause 28. The computer-implemented method of any of Clauses 25-27 further comprising, by the one or more hardware processors executing program instructions: in response to receiving a user input, via the interactive graphical user interface, selecting to view a current process representation: determining current state information for the plurality of data objects; causing the interactive graphical user interface to be updated to display, in the graph-based visualization, at least current numbers of data objects associated with each state based on the current state information of the plurality of data objects.

Claus 29. The computer-implemented method of Clause 28 further comprising, by the one or more hardware processors executing program instructions: updating the ranking of the plurality of paths based on the current state information for the plurality of data objects.

Clause 30. The computer-implemented method of Clause 29 further comprising, by the one or more hardware processors executing program instructions: causing the interactive graphical user interface to be updated to display the updated ranking of the plurality of paths.

Clause 31. A system comprising: one or more computer-readable storage mediums having program instructions embodied therewith; and one or more processors configured to execute the program instructions to cause the system to perform the computer-implemented method of any of Clauses 1-30.

Clause 32. A computer program product comprising a computer-readable storage medium having program instructions embodied therewith, the program instructions executable by one or more processors to cause the one or more processors to perform the computer-implemented method of any of Clauses 1-30.

Clause 33. A computer-implemented method for generating a visualization of a process, the computer implemented method comprising, by one or more hardware processors executing program instructions: determining, receiving, or accessing a plurality of data objects, wherein each of the data objects is associated with: a respective object type, a respective set of properties, and respective state information; determining, receiving, or accessing, based on state information associated with the plurality of data objects, a plurality of states; and in response to receiving a selection or indication of at least a first state of the plurality of states: causing updating of an interactive graphical user interface to include: a dynamic graph-based visualization including an indication of at least the first state.

Clause 34. The computer-implemented method of Clause 33 further comprising, by the one or more hardware processors executing program instructions: determining, receiving, or accessing, for at least the first state, data objects associated with at least the first state; wherein the interactive graphical user interface further includes: an indication based on properties and/or state information associated with the data objects associated with the first state.

Clause 35. The computer-implemented method of any of Clauses 33-34 further comprising, by the one or more hardware processors executing program instructions: in response to one or more user inputs: determining, receiving, or accessing, based on state information associated with data objects associated with at least the first state, one or more prior or subsequent states of the data objects associated with the first state; and causing the interactive user interface to be updated to include: in the dynamic graph-based visualization, an indication of a second state of the plurality of states, wherein the second state comprises a prior or subsequent state of the data objects associated with the first state; and in the dynamic graph-based visualization, at least a first transition between the first state and the second state.

Clause 36. The computer-implemented method of any of Clauses 33-35 further comprising, by the one or more hardware processors executing program instructions: in response to one or more user inputs: determining, receiving, or accessing a link from a first data object, associated with the first state, to a second data object, wherein the first data object and the second data object are of different object types; determining, receiving, or accessing, based on state information associated with the first data object and/or second data object, one or more prior or subsequent states of the second data object as compared to the first state of the first data object; and causing the interactive user interface to be updated to include: in the dynamic graph-based visualization, an indication of a third state of the plurality of states, wherein the third state comprises a state of the second data object that is a prior or subsequent state of the first state of the first data object; and in the dynamic graph-based visualization, at least a first transition between the first state and the third state.

Clause 37. The computer-implemented method of Clause 36, wherein the determining, receiving, or accessing the one or more prior or subsequent states of the second data object as compared to the first state of the first data object is further based on timestamp information associated with the first and second data objects.

Clause 38. The computer-implemented method of Clause 37, wherein the timestamp information is associated with states associated with the first and second data objects.

Clause 39. The computer-implemented method of any of Clauses 36-38, wherein the determining, receiving, or accessing the one or more prior or subsequent states of the second data object as compared to the first state of the first data object is further based on an object ontology and/or properties associated with the plurality of data objects.

Clause 40. The computer-implemented method of any of Clauses 33-39 further comprising, by the one or more hardware processors executing program instructions: determining, receiving, or accessing, based on state information associated with the plurality of data objects and links among the plurality of data objects, a plurality of transitions among states associated with the plurality of data objects, wherein the plurality of data objects are associated with a plurality of different object types, and wherein the dynamic graph-based visualization includes: edges between respective states that are indicative of transitions of the plurality of transitions.

Clause 41. The computer-implemented method of Clause 40, wherein the determining, receiving, or accessing the plurality of transitions among states associated with the plurality of data objects is further based on timestamp information associated with the plurality of data objects.

Clause 42. The computer-implemented method of Clause 41, wherein the timestamp information is associated with states associated with the associated with the plurality of data objects.

Clause 43. The computer-implemented method of any of Clauses 40-42, wherein the determining, receiving, or accessing the plurality of transitions among states associated with the plurality of data objects is further based on an object ontology and/or properties associated with the plurality of data objects.

Clause 44. The computer-implemented method of any of Clauses 33-43 further comprising, by the one or more hardware processors executing program instructions: determining, receiving, or accessing, based on state information associated with the plurality of data objects, one or more transitions among states of the plurality of states, wherein the plurality of states and the one or more transitions are indicative of a process; submitting, to a large language model ("LLM"), at least information indicative of the plurality of states and information indicative of the one or more transitions; receiving, from the LLM, an output indicative of at least one of: a preferred path through one or more states of the plurality of states of the process, a spatial layout of one or more states of the plurality of states of the process, a grouping of one or more states of the plurality of states of the process, a combining of one or more states of the plurality of states of the process, an identification of outliers of one or more states of the plurality of states or at least one transition of the one or more transitions of the process, or one or more insights or recommendations associated with the process; and parsing the output and updating the dynamic graph-based visualization to provide a representation based on the output.

Clause 45. The computer-implemented method of Clause 33 further comprising, by the one or more hardware processors executing program instructions: submitting, to a large language model ("LLM"), at least a prompt comprising a natural language description of a notional process; receiving, from the LLM, an output indicative of the notional process including one or more states and one or more transitions among the states; and parsing the output and causing display of a graph-based visualization of the notional process.

Clause 46. A system comprising: one or more computer-readable storage mediums having program instructions embodied therewith; and one or more processors configured to execute the program instructions to cause the system to perform the computer-implemented method of any of Clauses 33-45.

Clause 47. A computer program product comprising a computer-readable storage medium having program instructions embodied therewith, the program instructions executable by one or more processors to cause the one or more processors to perform the computer-implemented method of any of Clauses 33-45.

Clause 48. A computer-implemented method for process management and automation via interactions with a large language model ("LLM"), the computer implemented method comprising, by one or more hardware processors executing program instructions: determining, receiving, or accessing a representation of a process, wherein the representation of the process includes: a plurality of states, and one or more transitions among states of the plurality of states; determining, receiving, or accessing a plurality of data objects, wherein each of the data objects is associated with a respective set of properties; determining, receiving, or accessing, for each of the plurality of data objects, respective state information associated with the data objects; determining, receiving, or accessing, an automation with at least a first state of the plurality of states; and generating, based at least in part on the automation, a prompt for a large language model ("LLM"), wherein the prompt includes at least: an indication of the first state, and indications of one or more data objects, of the plurality of data objects, associated with the first state.

Clause 49. The computer-implemented method of Clause 48, wherein the prompt further includes an instruction to generate proposals for modification of the one or more data objects.

Clause 50. The computer-implemented method of any of Clauses 48-49, wherein the prompt further includes properties associated with the one or more data objects.

Clause 51. The computer-implemented method of Clause 50, wherein the prompt further includes explanations of meanings of the properties associated with the one or more data objects.

Clause 52. The computer-implemented method of any of Clauses 48-51 further comprising, by the one or more hardware processors executing program instructions: causing generation of an interactive graphical user interface including: a graph-based visualization of at least a portion of the plurality of states and the one or more transitions, wherein the graph-based visualization is generated based at least in part on at least a portion of the plurality of data objects and associated properties and state information.

Clause 53. The computer-implemented method of any of Clauses 48-52 further comprising, by the one or more hardware processors executing program instructions: submitting, to the LLM, the prompt; and receiving, from the LLM, an output indicative of at least: a proposal for modification of at least one of the one or more data objects associated with the first state.

Clause 54. The computer-implemented method of Clauses 50-53 further comprising, by the one or more hardware processors executing program instructions: displaying the proposal in an interactive graphical user interface; and in response to receiving a user input, via the interactive graphical user interface, indicating acceptance of the proposal, modifying the one of the one or more data objects in accordance with the proposal.

Clause 55. The computer-implemented method of Clause 54, wherein modifying the one of the one or more data objects includes modifying at least one property associated with the one of the one or more data objects.

Clause 56. The computer-implemented method of any of Clauses 54-55, wherein displaying the proposal includes displaying a graph-based visualization of updates to the process and/or the one of the one or more data objects that would result from implementation of the proposal.

Clause 57. The computer-implemented method of Clause 53 further comprising, by the one or more hardware processors executing program instructions: automatically modifying the at least one of the one or more data objects in accordance with the proposal.

Clause 58. The computer-implemented method of any of Clauses 53-57 further comprising, by the one or more hardware processors executing program instructions: generating a virtual layer configured to simulate the proposal, wherein simulating the proposal comprises modifying, in the virtual layer, at least one of the set of properties associated with the one of the one or more data objects; and simulating, in the virtual layer, the process including the modifying the at least one of the set of properties associated with the one of the one or more data objects.

Clause 59. The computer-implemented method of Clause 58 further comprising, by the one or more hardware processors executing program instructions: causing an interactive graphical user interface to be updated to display, in a graph-based visualization, one or more portions of the simulation of the process.

Clause 60. The computer-implemented method of any of Clauses 52-59 further comprising, by the one or more hardware processors executing program instructions: causing the interactive graphical user interface to be updated to display, in the graph-based visualization, an indication that at least the first state of the plurality of states is associated with the automation.

Clause 61. The computer-implemented method of Clause 60, wherein the indication is at least one of: an alert, a change of a color of the first state displayed in the graph-based visualization, or a reasoning associated with the automation.

Clause 62. The computer-implemented method of Clause 48, wherein the indication of the first state comprises state information associated with the first state, and wherein the state information comprises log data associated with items represented by the data objects.

Clause 63. The computer-implemented method of any of Clauses 48-62 further comprising, by the one or more hardware processors executing program instructions: determining, receiving, or accessing, a second automation associated with at least a second state of the plurality of states; generating, based at least in part on the second automation, a second prompt for the LLM, wherein the second prompt includes at least: an indication of the second state, and indications of one or more data objects, of the plurality of data objects, associated with the second state.

Clause 64. The computer-implemented method of Clause 63 further comprising, by the one or more hardware processors executing program instructions: submitting, to the LLM, the second prompt; and receiving, from the LLM, a second output indicative of at least: a second proposal for modification of at least one of the one or more data objects associated with the second state.

Clause 65. The computer-implemented method of any of Clauses 48-53 further comprising, by the one or more hardware processors executing program instructions: determining, receiving, or accessing, a second automation associated with at least a second state of the plurality of states;

and wherein the prompt generated for the LLM is based at least in part on the second automation, and wherein the prompt further includes at least an indication to choose between the automation and the second automation.

Clause 66. The computer-implemented method of any of Clauses 48-53 further comprising, by the one or more hardware processors executing program instructions: determining, receiving, or accessing, a second automation associated with the first state of the plurality of states; generating, based at least in part on the second automation, a second prompt for a second LLM, wherein the second prompt includes at least: an indication of the first state, and indications of one or more data objects, of the plurality of data objects, associated with the first state.

Clause 67. The computer-implemented method of Clause 66 further comprising, by the one or more hardware processors executing program instructions: submitting, to the second LLM, the second prompt; and receiving, from the second LLM, an output indicative of at least: a second proposal for modification of at least one of the one or more data objects associated with the first state.

Clause 68. The computer-implemented method of Clause 67 further comprising, by the one or more hardware processors executing program instructions, at least one of: in response to receiving the proposal and the second proposal, causing the interactive graphical user interface to be updated to display the first proposal and the second proposal; or in response to receiving the proposal and the second proposal, automatically determining to implement either the first proposal or the second proposal.

Clause 69. The computer-implemented method of any of Clauses 48-68, wherein the automation comprises a procedure for processing data objects that reach a first process node to advance the data objects to a second process node.

Clause 70. A system comprising: one or more computer-readable storage mediums having program instructions embodied therewith; and one or more processors configured to execute the program instructions to cause the system to perform the computer-implemented method of any of Clauses 48-69.

Clause 71. A computer program product comprising a computer-readable storage medium having program instructions embodied therewith, the program instructions executable by one or more processors to cause the one or more processors to perform the computer-implemented method of any of Clauses 48-69.

What is claimed is:

1. A computer-implemented method for generating a visualization of a process, the computer-implemented method comprising, by one or more hardware processors executing program instructions:
determining a representation of a process, wherein the representation of the process includes: a plurality of states, and one or more transitions among states of the plurality of states;
accessing a plurality of data objects, wherein each of the data objects is associated with a respective set of properties;
accessing, for each of the plurality of data objects, respective state information associated with the data objects;
determining, for at least a first transition of the one or more transitions, and based on the state information associated with the plurality of data objects, a first portion of the plurality of data objects that has transitioned along the first transition;
causing generation of an interactive graphical user interface including:

a graph-based visualization of at least a portion of the plurality of states and the one or more transitions, wherein the graph-based visualization is generated based at least in part on at least a portion of the plurality of data objects and associated properties and state information, wherein the graph-based visualization includes edges between respective states that are indicative of transitions of the one or more transitions;
receiving a selection of a first state of the plurality of states; and
updating the interactive graphical user interface to cause display of a view of one or more data objects of the plurality of data objects associated with the first state.

2. The computer-implemented method of claim 1 further comprising, by the one or more hardware processors executing program instructions:
determining, for each of the plurality of states, and based on (a) at least some of the properties of the sets of properties and (b) the state information associated with the data objects, one or more metrics associated with the states,
wherein the interactive graphical user interface further includes:
for each of the plurality of states, indications of the one or more metrics associated with the states.

3. The computer-implemented method of claim 1 further comprising, by the one or more hardware processors executing program instructions:
determining, for a combination of the plurality of states, and based on properties and/or the state information associated with the data objects, one or more overall metrics associated with the process,
wherein the interactive graphical user interface further includes:
indications of the one or more overall metrics associated with the process.

4. The computer-implemented method of claim 3 further comprising, by the one or more hardware processors executing program instructions:
receiving a selection of an object type;
re-determining, based on a filtered set of the plurality of data objects that match the object type, at least one of: the one or more metrics associated with the states, the one or more overall metrics associated with the process, or the portion of the plurality of states and the one or more transitions in the graph-based visualization; and
updating the interactive graphical user interface to include indications of at least one of: the re-determined one or more metrics associated with the states, the re-determined one or more overall metrics associated with the process, or the re-determined portion of the plurality of states and the one or more transitions in the graph-based visualization.

5. The computer-implemented method of claim 1 further comprising, by the one or more hardware processors executing program instructions:
determining, for each of the plurality of states, and based on the state information associated with the data objects, respective quantities of data objects associated with the states,
wherein the interactive graphical user interface further includes:
for each of the plurality of states, indications of the respective quantities of data objects associated with the states.

6. The computer-implemented method of claim 1 further comprising, by the one or more hardware processors executing program instructions:

determining, for each of the one or more transitions, and based on the state information associated with the data objects, respective portions of data objects that have transitioned along the transitions, wherein the graph-based visualization includes:

for each of the edges, indications of the respective portions of data objects that have transitioned along the transitions.

7. The computer-implemented method of claim 1 further comprising, by the one or more hardware processors executing program instructions:

determining, based on state information associated with the plurality of data objects, one or more transitions among states of the plurality of states, wherein the plurality of states and the one or more transitions are indicative of a process;

submitting, to a large language model ("LLM"), at least information indicative of the plurality of states and information indicative of the one or more transitions;

receiving, from the LLM, an output indicative of at least one of:

a preferred path through one or more states of the plurality of states of the process, a spatial layout of one or more states of the plurality of states of the process, a grouping of one or more states of the plurality of states of the process, a combining of one or more states of the plurality of states of the process, an identification of outliers of one or more states of the plurality of states or at least one transition of the one or more transitions of the process, or one or more insights or recommendations associated with the process; and parsing the output and updating the graph-based visualization to provide a representation based on the output.

8. A system comprising:

one or more computer-readable storage mediums having program instructions embodied therewith; and one or more processors configured to execute the program instructions to cause the system to:

determine a representation of a process, wherein the representation of the process includes: a plurality of states, and one or more transitions among states of the plurality of states;

access a plurality of data objects, wherein each of the data objects is associated with a respective set of properties;

access, for each of the plurality of data objects, respective state information associated with the data objects;

determine, for at least a first transition of the one or more transitions, and based on the state information associated with the plurality of data objects, a first portion of the plurality of data objects that has transitioned along the first transition;

cause generation of an interactive graphical user interface including:

a graph-based visualization of at least a portion of the plurality of states and the one or more transitions, wherein the graph-based visualization is generated based at least in part on at least a portion of the plurality of data objects and associated properties and state information, wherein the graph-based visualization includes edges between respective states that are indicative of transitions of the one or more transitions;

receive a selection of a first state of the plurality of states; and updating the interactive graphical user interface to cause display of a view of one or more data objects of the plurality of data objects associated with the first state.

9. The system of claim 8, wherein the program instructions, when executed by the one or more processors, further cause the system to:

in response to receiving a first user input, via the interactive graphical user interface, select a first state of the plurality of states:

cause the interactive graphical user interface to be updated to display a detailed view of one or more data objects associated with the first state.

10. The system of claim 9 wherein the program instructions, when executed by the one or more processors, further cause the system to:

in response to receiving a second user input, via the interactive graphical user interface, select a first data object of the one or more data objects:

cause the interactive graphical user interface to be updated to display a detailed view of events associated with the first data object.

11. The system of claim 10, wherein the detailed view of the events associated with the first data object includes, based on state information associated with the first data object, at least a simplified graph-based visualization of states and transitions traversed by the first data object.

12. The system of claim 11, wherein the states and transitions traversed by the first data object include an unexpected transition.

13. The system of claim 11 wherein the program instructions, when executed by the one or more processors, further cause the system to:

determining, for a first data object of the one or more data objects, an unexpected transition, wherein the unexpected transition comprises a transition, different from the one or more transitions, to or from the first state; and causing the interactive graphical user interface to be updated to display an alert of the unexpected transition.

14. A computer program product comprising a computer-readable storage medium having program instructions embodied therewith, the program instructions executable by one or more processors to cause the one or more processors to:

determine a representation of a process, wherein the representation of the process includes: a plurality of states, and one or more transitions among states of the plurality of states;

access a plurality of data objects, wherein each of the data objects is associated with a respective set of properties;

access, for each of the plurality of data objects, respective state information associated with the data objects;

determine, for at least a first transition of the one or more transitions, and based on the state information associated with the plurality of data objects, a first portion of the plurality of data objects that has transitioned along the first transition;

cause generation of an interactive graphical user interface including:

a graph-based visualization of at least a portion of the plurality of states and the one or more transitions, wherein the graph-based visualization is generated based at least in part on at least a portion of the plurality of data objects and associated properties and state information, wherein the graph-based visualization includes edges between respective states that are indicative of transitions of the one or more transitions;

receive a selection of a first state of the plurality of states; and updating the interactive graphical user interface to cause display of a view of one or more data objects of the plurality of data objects associated with the first state.

15. The computer program product of claim 14, wherein each of the plurality of states is stored as a data object.

16. The computer program product of claim 14, wherein the plurality of data objects are associated with an object ontology.

17. The computer program product of claim 14, wherein the state information includes at least one of: a history of states associated with the data objects, log data associated with items represented by the data objects, or live data associated with items represented by the data objects.

18. The computer program product of claim 14, wherein the program instructions further cause the one or more processors to:

submitting, to a large language model ("LLM"), at least a prompt comprising a natural language description of a notional process;

receiving, from the LLM, an output indicative of the notional process including one or more states and one or more transitions among the one or more states; and parsing the output and causing display of a graph-based visualization of the notional process.

19. The computer program product of claim 14, wherein the program instructions further cause the one or more processors to:

determine, for a combination of the plurality of states, and based on properties and/or the state information associated with the data objects, one or more overall metrics associated with the process, wherein the interactive graphical user interface further includes:

indications of the one or more overall metrics associated with the process.

20. The computer program product of claim 19, wherein the program instructions further cause the one or more processors to:

receive a selection of an object type;

re-determine, based on a filtered set of the plurality of data objects that match the object type, at least one of: the one or more metrics associated with the states, the one or more overall metrics associated with the process, or the portion of the plurality of states and the one or more transitions in the graph-based visualization; and update the interactive graphical user interface to include indications of at least one of: the re-determined one or more metrics associated with the states, the re-determined one or more overall metrics associated with the process, or the re-determined portion of the plurality of states and the one or more transitions in the graph-based visualization.

\* \* \* \* \*